(12) United States Patent
Zheng

(10) Patent No.: US 8,218,469 B2
(45) Date of Patent: Jul. 10, 2012

(54) WIRELESS RELAY COMMUNICATION SYSTEM AND METHOD

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1007 days.

(21) Appl. No.: 12/058,451

(22) Filed: Mar. 28, 2008

(65) Prior Publication Data

US 2008/0219229 A1 Sep. 11, 2008

Related U.S. Application Data

(63) Continuation of application No. PCT/CN2006/002575, filed on Sep. 29, 2006.

(30) Foreign Application Priority Data

| Sep. 30, 2005 | (CN) | 2005 1 0106291 |
| Oct. 26, 2005 | (CN) | 2005 1 0114596 |
| Oct. 31, 2005 | (CN) | 2005 1 0117477 |
| Oct. 31, 2005 | (CN) | 2005 1 0117478 |
| Nov. 1, 2005 | (CN) | 2005 1 0117222 |
| Nov. 11, 2005 | (CN) | 2005 1 0115917 |
| Nov. 11, 2005 | (CN) | 2005 1 0115918 |

(51) Int. Cl.
- *H04B 7/14* (2006.01)
- *H04B 7/212* (2006.01)
- *H04J 1/10* (2006.01)
- *H04J 3/08* (2006.01)
- *H04W 4/00* (2009.01)

(52) U.S. Cl. .................. 370/315; 370/321; 370/330

(58) Field of Classification Search ............ 370/321
See application file for complete search history.

(56) References Cited

U.S. PATENT DOCUMENTS 6,161,014 A * 12/2000 Girardeau et al. .......... 455/436

(Continued)

FOREIGN PATENT DOCUMENTS

CN 1252650 A 5/2000

(Continued)

OTHER PUBLICATIONS

Deng et al., "Recommendation on Design 802.16 TGe PMP Mode Backward Compatible Frame Structure," *IEEE*, C802.16MMR-05/004, 0-4 (Sep. 9, 2005) http://www.ieee802.org/16/sg/mmr/contrib./C80216mmr-05_004.pdf [retrieved on Jun. 3, 2009].

(Continued)

*Primary Examiner* — Jeffrey Pwu
*Assistant Examiner* — Shaq Taha
(74) *Attorney, Agent, or Firm* — Leydig, Voit & Mayer, Ltd.

(57) ABSTRACT

A wireless relay communication system and method are provided. The system includes a BS, at least one RS and subscriber terminals. The method includes: configuring a downlink relay zone and an uplink relay zone in downlink sub-frame and uplink sub-frame of physical layer frame structure of a BS, respectively, configuring a downlink relay zone and an uplink relay zone in uplink sub-frame and downlink sub-frame of physical layer frame structure of an RS, respectively, to define one or more combinations of OFDMA symbols and relay subchannels or relay timeslots for communication between the RS and BS; performing relay communication between the BS, the RS and a subscriber station. In the invention, an advanced relay mode is supported, i.e. an MSS/SS may access BS via the relay of RS, thereby broadening the effective coverage of BS, and improving the throughput of MSS/SS.

9 Claims, 32 Drawing Sheets

U.S. PATENT DOCUMENTS

| | | |
|---|---|---|
| 7,095,722 B1 | 8/2006 | Walke et al. |
| 7,386,036 B2 * | 6/2008 | Pasanen et al. ............... 375/211 |
| 2003/0125067 A1 * | 7/2003 | Takeda et al. ................ 455/522 |
| 2004/0105406 A1 * | 6/2004 | Kayama et al. ............... 370/322 |
| 2005/0141593 A1 | 6/2005 | Pasanen et al. |
| 2005/0186982 A1 * | 8/2005 | Chen et al. .................... 455/522 |
| 2007/0058577 A1 * | 3/2007 | Rubin ........................... 370/328 |

FOREIGN PATENT DOCUMENTS

| | | |
|---|---|---|
| CN | 1377542 A | 10/2002 |
| JP | 2000-134143 A | 5/2000 |
| WO | 2005/067225 A1 | 7/2005 |

OTHER PUBLICATIONS

Fang-Ching et al., Recommendation on PNP Mode Compatible TDD Frame Structure, *IEEE*, 802.16MMR-05/027R1, 1-16 http://www.ieee802.org/16/sg/mmr/contrib./C80216mmr-05_027.pdf.

Written Opinion of the International Searching Authority in corresponding PCT Application No. PCT/CN2006/002575 (Feb. 8, 2007).

International Search Report in corresponding PCT Application No. PCT/CN2006/002575 (Feb. 8, 2007).

$1^{st}$ Office Action in corresponding Chinese Application No. 200510115917.7 (Jul. 14, 2010).

$1^{st}$ Office Action in corresponding Chinese Application No. 200510115918.1 (Jul. 7, 2010).

$2^{nd}$ Office Action in corresponding Chinese Application No. 200510115918.1 (Mar. 3, 2011).

$1^{st}$ Office Action in corresponding Chinese Application No. 200510117478.3 (Aug. 14, 2009).

$1^{st}$ Office Action in corresponding Korean Application No. 10-2008-7010164 (Nov. 25, 2009).

* cited by examiner

WIRELESS RELAY COMMUNICATION SYSTEM AND METHOD

CROSS-REFERENCE TO RELATED APPLICATIONS

This application is a continuation of International Patent Application No. PCT/CN2006/002575, filed Sep. 29, 2006, which claims priority to Chinese Patent Application Nos. 200510106291.3, 200510114596.9, 200510117477.9, 200510117478.3, 200510117222.2, 200510115918.1, and 200510115917.7, filed Sep. 30, 2005, Oct. 26, 2005, Oct. 31, 2005, Oct. 31, 2005, Nov. 1, 2005, Nov. 11, 2005, and Nov. 11, 2005, respectively, all of which are hereby incorporated by reference in their entirety.

FIELD OF THE INVENTION

The invention relates to the field of wireless communications, and in particular, to a wireless relay communication system and method.

BACKGROUND OF THE INVENTION

The broadband wireless access standard IEEE 802.16 mainly includes two versions, i.e., a fixed broadband wireless access standard IEEE 802.16-2004 and a mobile broadband wireless access standard IEEE 802.16e. 802.16-2004 defines two types of network elements, i.e. Base station (BS) and Subscriber station (SS). Similarly, 802.16e also defines two types of network elements, i.e. Base station (BS) and Mobile Subscriber station (MSS, or Mobile Station, MS).

Currently, a BS communicates with a subscriber terminal (e.g. an SS or MSS) directly to exchange information with the subscriber terminal. The entire coverage of a network is limited because of the limited coverage of base stations (BSs). Furthermore, one BS is required to process information from a large number of subscribers simultaneously because each subscriber terminal communicates with the BS directly. This may bring adverse affect on the information processing performance for the subscriber stations, thereby resulting in a decrease in the throughput of the subscriber stations, and an adverse affect on the communication performance of the entire network.

SUMMARY OF THE INVENTION

The invention is to provide a wireless relay communication system and method, to implement the relay communication between a BS and a subscriber terminal (e.g. an SS or MSS), to thereby broaden the coverage of the BS and the throughput of the subscriber terminal.

A wireless relay communication system is provided. The system includes: a Base Station (BS), a subscriber station and a Relay Station (RS). The BS is provided with an interface for communicating with the RS, the RS is provided with interfaces for communicating with the subscriber station and the BS, the subscriber station is provided with an interface for communicating with the RS; the BS, the RS, and the subscriber station communicate with each other by using the interfaces.

Optionally, the wireless relay communication system may include the following features:

The BS may be further provided with an interface for communicating with the subscriber station, and the subscriber station may be further provided with an interface for communicating with the BS, the BS and the subscriber station directly communicate with each other by using the interfaces.

The BS, the RS, and the subscriber station may communicate with each other over a same frequency, and the BS communicates with the subscriber station and the RS via an uplink sub-frame and a downlink sub-frame respectively, the RS communicates with the subscriber station and the BS via a downlink sub-frame and an uplink sub-frame respectively.

If Time Division Duplexing (TDD) technique is employed for communication between the BS, the RS, and the subscriber station, each of the BS, the RS, and the subscriber station is provided with a TDD radio transmitter physical layer unit and a TDD radio receiver physical layer unit; each TDD radio transmitter physical layer unit is provided with a communication interface for communicating with a TDD radio receiver physical layer unit of other entity, each TDD radio receiver physical layer unit is provided with a communication interface for communicating with a TDD radio transmitter physical layer unit of other entity, or the RS is provided with a first TDD radio transceiver and a second TDD radio transceiver, the first TDD radio transceiver includes a TDD radio receiver physical layer unit and a TDD radio transmitter physical layer unit, the TDD radio receiver physical layer unit and the TDD radio transmitter physical layer unit of the first TDD radio transceiver operate at a same first frequency, correspond to the TDD radio transmitter physical layer unit of the BS and the TDD radio receiver physical layer unit of the subscriber station and keep frame synchronization with the TDD radio transmitter physical layer unit of the BS and the TDD radio receiver physical layer unit of the subscriber station in transmission and reception, the second TDD radio transceiver includes a TDD radio receiver physical layer unit and a TDD radio transmitter physical layer unit, the TDD radio receiver physical layer unit and the TDD radio transmitter physical layer unit of the second TDD radio transceiver operate at a same second frequency, correspond to the TDD radio transmitter physical layer unit of the subscriber station and the TDD radio receiver physical layer unit of the BS and keep frame synchronization with the TDD radio transmitter physical layer unit of the subscriber station and the TDD radio receiver physical layer unit of the BS in transmission and reception, Alternatively, if Time Division Multiplexing/Time Division Multiple Access-Frequency Division Duplexing (TDM/TDMA-FDD) technique is employed for communication between the BS, the RS, and the subscriber station, the RS is provided with a first TDM/TDMA-FDD radio transceiver and a second TDM/TDMA-FDD radio transceiver, a TDM-FDD radio transmitter physical layer unit and a TDMA-FDD radio receiver physical layer unit included in the first TDM/TDMA-FDD radio transceiver of the RS correspond to a TDM-FDD radio receiver physical layer unit and a TDMA-FDD radio transmitter physical layer unit of the subscriber station and keep frame synchronization with the TDM-FDD radio receiver physical layer unit and the TDMA-FDD radio transmitter physical layer unit of the subscriber station in transmission and reception, a TDMA-FDD radio transmitter physical layer unit and a TDM-FDD radio receiver physical layer unit included in the second TDM/TDMA-FDD radio transceiver of the RS correspond to a TDMA-FDD radio receiver physical layer unit and a TDM-FDD radio transmitter physical layer unit of the BS and keep frame synchronization with the TDMA-FDD radio receiver physical layer unit and the TDM-FDD radio transmitter physical layer unit of the BS in transmission and reception, Alternatively, if Orthogonal Frequency Division Multiple Access—Frequency Division Duplexing (OFDMA-FDD)

technique is employed for communication between the BS, the RS, and the subscriber station, the RS is provided with a first OFDMA-FDD radio transceiver and a second OFDMA-FDD radio transceiver, a first OFDMA-FDD radio transmitter physical layer unit and a first OFDMA-FDD radio receiver physical layer unit included in the first OFDMA-FDD radio transceiver of the RS correspond to an OFDMA-FDD radio receiver physical layer unit and an OFDMA-FDD radio transmitter physical layer unit of the subscriber station and keep frame synchronization with the OFDMA-FDD radio receiver physical layer unit and an OFDMA-FDD radio transmitter physical layer unit of the subscriber station in transmission and reception, a second OFDMA-FDD radio transmitter physical layer unit and a second OFDMA-FDD radio receiver physical layer unit included in the second OFDMA-FDD radio transceiver of the RS correspond to an OFDMA-FDD radio receiver physical layer unit and an OFDMA-FDD radio transmitter physical layer unit of the BS and keep frame synchronization with the OFDMA-FDD radio receiver physical layer unit and an OFDMA-FDD radio transmitter physical layer unit of BS in transmission and reception, Alternatively, if Frequency Division Duplexing (FDD) technique is employed for communication between the BS, the RS, and the subscriber station, each of the RS and the BS is provided with an FDD radio transceiver, each FDD radio transceiver includes an FDD radio transmitter physical layer unit and an FDD radio receiver physical layer unit, the RS communicates wirelessly with the BS and the subscriber station by FDD, a same frequency is employed for uplink of the FDD radio transceiver of the RS and downlink of the FDD radio transceiver of the BS, and a same frequency is employed for downlink of the FDD radio transceiver of the RS and uplink of the FDD radio transceiver of the BS; or the RS includes an FDD radio transceiver, a same frequency is employed for uplink of the FDD radio transceiver of the RS and downlink of the FDD radio transceiver of the BS, and a same frequency is employed for downlink of the FDD radio transceiver of the RS and uplink of the FDD radio transceiver of the BS, a first FDD radio transmitter physical layer unit and a first FDD radio receiver physical layer unit included in a first FDD radio transceiver of the subscriber station correspond to the FDD radio receiver physical layer unit and the FDD radio transmitter physical layer unit of BS, and a second FDD radio transmitter physical layer unit and a second FDD radio receiver physical layer unit included in a second FDD radio transceiver of the subscriber station correspond to the FDD radio receiver physical layer unit and the FDD radio transmitter physical layer unit of RS.

Each of the RS, the BS, and the subscriber station may be further provided with a data link layer unit communicating with the physical layer units of each of the RS, the BS, and the subscriber station, and the BS is further provided with a wired transmission processing unit, for communicating with an upper stage arrangement and exchanging information with an upper stage device or base stations.

The BS may be further provided with an interface for communicating with the subscriber station, the BS is adapted to directly transmit Preamble, Frame Control Header FCH, Downlink-MAP DL-MAP, Uplink-MAP UL-MAP information to the subscriber station via the interface by using a predetermined channel encoding and modulation mode, or by employing a predetermined transmission power.

A wireless relay communication method is also provided. The method includes:

configuring a downlink relay zone and an uplink relay zone in a downlink sub-frame and an uplink sub-frame of physical layer frame structure of a Base Station (BS), respectively, configuring a downlink relay zone and an uplink relay zone in an uplink sub-frame and a downlink sub-frame of physical layer frame structure of a Relay Station (RS), respectively, to define one or more combinations of Orthogonal Frequency Division Multiple Access (OFDMA) symbols and relay subchannels or relay timeslots for communication between the RS and BS;

performing relay communication between the BS, the RS and a subscriber station based on the configured downlink and uplink sub-frames of the BS and RS Optionally, the invention may include the following technical features:

The downlink relay zone and the uplink relay zone in the downlink sub-frame and the uplink sub-frame of physical layer frame structure of a BS are configured by Time Division Multiplexing (TDM) respectively When the RS is provided with two Time Division Multiplexing/Time Division Multiple Access-Frequency Division Duplexing (TDM/TDMA-FDD) or Orthogonal Frequency Division Multiple Access—Frequency Division Duplexing (OFDMA-FDD) radio transceivers, a downlink relay zone and an uplink relay zone are respectively arranged in an uplink sub-frame and a downlink sub-frame of physical layer frame structures of the TDM/TDMA-FDD or OFDMA-FDD radio transceivers of the RS corresponding to the BS, to define relay timeslots between the BS and the RS, or to define combinations of OFDMA symbols and relay subchannels;

When the RS is provided with two FDD transceivers, a downlink relay zone and an uplink relay zone are respectively arranged in an uplink sub-frame of physical layer frame structure of a first FDD radio transceiver and a downlink sub-frame of physical layer frame structure of a second FDD radio transceiver of the RS, to define combinations of OFDMA symbols and relay subchannels for exchanging information between the BS and the RS;

When the RS is provided with and FDD radio transceiver, a downlink relay zone is arranged in an uplink sub-frame of physical layer frame structure of the FDD radio transceiver of the RS, to define relay timeslots for receiving the downlink relay zone of the BS by the RS, or to define combinations of OFDMA symbols and relay subchannels of the downlink relay zones of the BS and the RS; configuring an uplink relay zone in a downlink sub-frame of physical layer frame structure of the FDD radio transceiver of the RS, to define relay timeslots for receiving the uplink relay zone of the BS by the RS, or to define combinations of OFDMA symbols and relay subchannels of the uplink relay zones of the BS and the RS.

In the method, when the RS is provided with a single FDD radio transceiver, a subscriber station within coverage of the BS does not arrange any transmitting timeslot or combination of OFDMA symbols and transmitting subchannels during a time period of the uplink relay zone of the BS, and a subscriber station within coverage of the RS does not arrange any transmitting timeslot or combination of OFDMA symbols and transmitting subchannels during a time period of the downlink relay zone of the BS;

when the RS is provided with two OFDMA-FDD radio transceivers, during the time period of the uplink relay zone of the BS, a subscriber station does not arrange any combination of OFDMA symbols and transmitting subchannels, and the RS does not arrange any combination of OFDMA symbols and receiving subchannels; during the time period of the downlink relay zone of the BS, the RS does not arrange any combination of OFDMA symbols and transmitting subchannels;

when the RS is provided with a single TDD radio transceiver, during a time period corresponding to the uplink relay zone and the downlink relay zone in the physical layer frame structure of the BS, a subscriber station does not arrange any receiving or transmitting timeslot or any combination of OFDMA symbols and subchannels, and if the RS transfers information via relay timeslots, timeslots of the uplink relay zone and the downlink relay zone in the physical layer frame structure of the BS correspond to timeslots of the uplink relay zone and the downlink relay zone in the physical layer frame structure of the RS;

when the RS is provided with two TDM/TDMA-FDD transceivers, the downlink relay zone of the BS corresponds to the downlink relay zone of one TDM/TDMA-FDD transceiver corresponding to the BS in timeslot and frequency, the uplink relay zone of the BS corresponds to the uplink relay zone of one TDM/TDMA-FDD transceiver corresponding to the BS in timeslot and frequency; and during a time period corresponding to the uplink relay zone of the BS, a subscriber station does not arrange any transmitting timeslot, and the RS does not arrange any receiving timeslot;

when the RS is provided with two TDD radio transceivers, during a time period corresponding to the uplink relay zone of the BS, subscriber stations within coverage of the BS and the RS do not arrange any combination of OFDMA symbols and transmitting subchannels, and the RS does not arrange any combination of OFDMA symbols and receiving subchannels.

In the method, when there are at least two RSs, the at least two RSs share the uplink or downlink relay zones by using different TDM manners or through different combinations of OFDMA symbols and subchannels;

and when sharing the uplink or downlink relay zones through different combinations of OFDMA symbols and subchannels, each RS transmits relay data of the BS in only corresponding combination of OFDMA symbols and subchannels in the down relay zone, and does not transmit the relay data of the BS in other combinations of OFDMA symbols and subchannels for other RSs, and FDD radio receiver of each RS receives relay data of the BS in only the corresponding combination of OFDMA symbols and subchannels in the down relay zone, and does not receive the relay data of the BS in other combinations of OFDMA symbols and subchannels for other RSs.

In the invention, when the RS is provided with two radio transceivers, if there are at least two RSs, the at least two RSs share the uplink or downlink relay zones by using different TDM manners or through different combinations of OFDMA symbols and subchannels, via radio transceivers corresponding to the BS.

The method may further include:

configuring a downlink relay broadcast subchannel or a downlink relay broadcast timeslot in the downlink sub-frame of the physical layer frame structure of the BS, to define downlink timeslots or combinations of OFDMA symbols and downlink subchannels to be broadcasted by BS to the RS;

configuring a downlink relay broadcast subchannel or a downlink relay broadcast receiving timeslot in the downlink sub-frame of the physical layer frame structure of the RS, to define uplink timeslots or combinations of OFDMA symbols and uplink subchannels for receiving downlink relay broadcast of BS; if the RS is provided with two radio transceivers, configuring a downlink relay broadcast subchannel or a downlink relay broadcast receiving timeslot in the downlink sub-frame of the physical layer frame structure of a radio transceiver corresponding to the BS;

wherein the configured downlink relay broadcast subchannel or downlink relay broadcast timeslot or downlink relay broadcast receiving timeslot of the BS and the RS is selectively configured in each frame.

In the invention, when the RS transfers information through combinations of OFDMA symbols and relay subchannels, the method may further include:

arranging a relay ranging subchannel in the uplink relay zone of the uplink sub-frame of the physical layer frame structure of the BS, to define combinations of OFDMA symbols and BS relay ranging receiving subchannels for initial access ranging, periodic ranging and bandwidth request of the RS, wherein the relay ranging subchannel is selectively used as a ranging subchannel for initial access ranging, periodic ranging and bandwidth request of a subscriber station;

arranging a relay ranging subchannel in the downlink relay zone of the physical layer frame structure of the RS, to define combinations of OFDMA symbols and RS relay ranging transmitting subchannels for initial access ranging, periodic ranging and bandwidth request of the RS, wherein if the RS is provided with two radio transceivers, the relay ranging subchannel is configured in the physical layer frame structure of a radio transceiver corresponding to the BS;

the relay ranging subchannels of the RS and the BS have a one-to-one correspondence with each other in time and frequency, keep synchronized with each other, and are selectively configured in each frame.

The method may further include:

arranging a ranging subchannel in the uplink sub-frame of the physical layer structure of the BS, to define combinations of OFDMA symbols and BS ranging receiving subchannels for initial access ranging, periodic ranging, and bandwidth request of a subscriber station;

when the BS can not communicate with a subscriber station within coverage of the RS, configuring a ranging subchannel in the uplink sub-frame of the physical layer structure of the FDD radio transceiver of the RS, to define combinations of OFDMA symbols and BS ranging receiving subchannels for initial access ranging, periodic ranging, and bandwidth request of the subscriber station; wherein if the RS is provided with two radio transceivers, the ranging subchannel is configured in the physical layer structure of a radio transceiver corresponding to the subscriber station.

In the invention, when the RS transfers data via relay timeslots as subchannels, the method may further include:

arranging a downlink interference timeslot in the downlink sub-frame of the physical layer frame structure of each of the BS and RS, to define downlink data timeslots within respective coverage of the BS and the RS, wherein the respective coverage includes an overlapping region in coverage of the BS and RS, or includes non-overlapping regions in coverage of the BS and RS, as well as regions covered by only the BS or RS; if the RS is provided with two radio transceivers, the downlink interference timeslot is arranged in the physical layer frame structure of a radio transceiver corresponding to a subscriber station.

The downlink interference timeslot of the BS is not overlapped with that of the RS, and when there are at least two RSs, the at least two RSs share the downlink interference timeslot by using TDM technique, and the downlink interference timeslot is selectively configured in each frame of the BS and the RS.

In the invention, when the RS transfers data via relay timeslots as subchannels, the method may further include:

arranging a downlink or uplink non-interference timeslot in the uplink sub-frame of each of the BS and RS, and/or, defining an uplink or downlink non-interference timeslot in the downlink sub-frame of each of the BS and RS, to define downlink or uplink data timeslots within the respective coverage of the BS and the RS, wherein if the RS is provided with two radio transceivers, the uplink or downlink non-interference timeslot is arranged in the physical layer frame structure of a radio transceiver corresponding to a subscriber station;

the downlink non-interference timeslot of the BS may be overlapped with that of the RS, and the uplink non-interference timeslot of the BS may be overlapped with that of the RS.

The uplink interference timeslots of the BS is not overlapped with that of the RS in time The method may further include:

arranging a downlink header or a downlink header timeslot in the downlink sub-frame of the physical layer structure of the BS or the physical layer structures of the BS and RS, as beginning of the downlink sub-frame, to define timeslots or combinations of OFDMA symbols and subchannels for transmitting user synchronization information and timeslots or combinations of OFDMA symbols and subchannels for transmitting indication information indicating positions and utilization method of OFDMA symbols and subchannels, or positions and utilization method of timeslots, of uplink and downlink frames of the physical layer frame structure of the BS or the physical layer structures of the BS and RS, wherein the downlink header is configured in each frame; the downlink header or downlink header timeslot defined in the downlink sub-frame of the physical layer structure of the RS lags behind the downlink header or downlink header timeslot defined in the downlink sub-frame of the physical layer structure of the BS in time; and during a time period corresponding to the downlink header of the RS, the BS does not arrange any combination of OFDMA symbols and receiving subchannels; the downlink header timeslot of the RS is not overlapped with that of the BS, and is configured within a non-interference timeslot of the uplink sub-frame of the BS; if the RS is provided with two radio transceivers, the downlink header or downlink header timeslot is configured in the physical layer frame structure of a radio transceiver corresponding to a subscriber station;

defining a downlink header receipt or a downlink header receipt timeslot in the physical layer structure of the RS, to define timeslots or combinations of OFDMA symbols and subchannels for receiving the downlink header of the BS; wherein the downlink header receipt or downlink header receipt timeslot has a one-to-one correspondence with the downlink header or downlink header timeslot of the BS in timeslot and frequency, and is entirely synchronized with the downlink header or downlink header timeslot of the BS; if the RS is provided with two radio transceivers, the downlink header receipt or downlink header receipt timeslot is configured in the physical layer frame structure of a radio transceiver corresponding to the BS.

The downlink sub-frame includes: preamble, frame control header burst, downlink-MAP, and/or uplink-MAP In the invention, when there are multiple RSs, a downlink sub-frame of an RS is not overlapped with uplink sub-frames of other RSs;

or a downlink header timeslot of an RS is not overlapped with downlink header timeslots and downlink interference timeslots of other RSs; or downlink header timeslots of different RSs are overlapped with each other entirely and contain same contents, a downlink header timeslot of an RS is not overlapped with downlink interference timeslots of other RSs.

If two radio transceivers provided in the RS employs different frequencies for downlink and uplink communication, the downlink header is configured in the physical layer frame structure of a radio transceiver for transmitting downlink information to a subscriber station.

In the method, when there are at least two RSs, during a time period of the downlink header of an RS, no combination of OFDMA symbols and transmitting subchannels in downlink frames of physical layer frame structures of other RSs; or the downlink header timeslot of the RS is not overlapped with downlink header timeslots or downlink interference timeslots of other RSs;

or, when there are at least two RSs, if downlink headers of different RSs are overlapped and synchronized entirely in time and contain same contents, or if downlink header timeslots of different RSs are overlapped and synchronized entirely in time and contain same contents, downlink header timeslot of an RS is not overlapped with downlink interference timeslots of other RSs.

In the invention, when the RS transfers information via relay timeslots the downlink relay zone of the BS has a one-to-one correspondence with that of the RS in timeslot and frequency, the uplink relay zone of the BS has a one-to-one correspondence with that of the RS in timeslot and frequency, the uplink or downlink relay zones of the BS and the RS are selectively configured in each frame.

In the invention, when the RS transfers information via relay timeslots, the method may further include:

configuring an uplink contention timeslot in the uplink sub-frame of the physical layer frame structure of the BS, wherein the uplink contention timeslot includes an initial ranging contention timeslot and a bandwidth request contention timeslot, and is configured in each frame;

when the BS can not directly communicate with a subscriber station within coverage of the RS, configuring an uplink contention timeslot in the uplink sub-frame of the physical layer frame structure of the RS, wherein the uplink contention timeslot includes an initial ranging contention timeslot and a bandwidth request contention timeslot, if the RS is provided with two radio transceivers, the uplink contention timeslot is configured in physical layer frame structure of a radio transceiver corresponding to a subscriber station.

The method may further include:

configuring an uplink contention transmitting timeslot in the physical layer frame structure of the RS, to define transmitting timeslot of the RS for contending for timeslots within the uplink contention timeslot of the BS, wherein the uplink contention transmitting timeslot of the RS is entirely overlapped and synchronized with the uplink contention transmitting timeslot of the BS, is configured in each frame; if the RS is provided with two radio transceivers, the uplink contention transmitting timeslot is configured in physical layer frame structure of a radio transceiver corresponding to the BS.

In the invention, when the RS has two OFDMA-FDD radio transceivers, in the downlink sub-frame of physical layer frame structure of the BS or an OFDMA-FDD radio transceiver, corresponding to a subscriber station, of the RS, except for the downlink header, the downlink relay zone of the BS and a time period, corresponding to the downlink header, the downlink relay zone of the BS, of the OFDMA-FDD radio transceiver, corresponding to a subscriber station, of the RS, the BS and different RSs share the remaining portion of the downlink sub-frame through different combinations of OFDMA symbols and subchannels; and/or, in the uplink sub-frame of physical layer frame structure of the BS or an OFDMA-FDD radio transceiver, corresponding to a subscriber station, of the RS, except for the uplink relay zone of the BS and a time period, corresponding to the uplink relay zone of the BS, of the OFDMA-FDD radio transceiver, corresponding to a subscriber station, of the RS, the BS and different RSs share the remaining portion of the uplink sub-frame through different combinations of OFDMA symbols and subchannels;

when the RS has two TDD radio transceivers, in the downlink sub-frame of physical layer frame structure of the BS or an TDD radio transceiver, corresponding to a subscriber station, of the RS, except for the downlink header and the downlink relay zone of the BS, the BS and different RSs share the remaining portion of the downlink sub-frame through different combinations of OFDMA symbols and subchannels; and/or, in the uplink sub-frame of physical layer frame structure of the BS or an TDD radio transceiver, corresponding to a subscriber station, of the RS, except for the uplink relay zone of the BS, the BS and different RSs share the remaining portion of the uplink sub-frame through different combinations of OFDMA symbols and subchannels; and the downlink header and ranging subchannel are configured in each frame of the BS and the RS, the downlink relay zone, the uplink relay zone, the downlink relay broadcast subchannel, the relay ranging subchannel, the downlink header receipt are not configured to be in every frame.

An interval having a length of at least a Transmit/Receive Transition Gap (TTG) is reserved from the downlink frame of the BS or RS to the uplink frame of BS, and/or, an interval having a length of at least a Receive/Transmit Transition Gap (RTG) is reserved from the uplink frame of the BS or RS to the downlink frame of BS; and if the BS can directly communicate with a subscriber station; during the TTG of BS, the RS does not arrange any combination of OFDMA symbols and transmitting subchannels, and during the RTG of BS, the RS does not arrange any combination of OFDMA symbols and receiving subchannels.

The BS, the RS and a subscriber station employ FDD or TDD manner to implement wireless relay communication.

Another wireless relay communication method is provided. The method includes:

a downlink relay communication process from a Base Station (BS) to a subscriber station, including:

transmitting, by the BS, data to an Relay Station (RS) in a downlink sub-frame of the BS, and receiving, by the RS, the data via an Frequency Division Duplexing (FDD) radio receiver of the RS;

forwarding, by the RS, the received data to the subscriber station via a downlink sub-frame of an FDD radio transmitter of the RS; and an uplink relay communication process from the subscriber station to the BS, including:

transmitting, by the subscriber station, uplink communication data in a timeslot or a time and frequency zone excluding a time period corresponding to an uplink relay zone of the BS, and receiving, by the RS, the uplink communication data from the subscriber station;

transmitting, by the RS, the uplink communication data to the BS via an uplink relay zone in an uplink sub-frame, and receiving, by the BS, the uplink communication data in the uplink sub-frame.

The transmitting by the BS the data to the RS includes:

transmitting, by the BS, preamble in a downlink header of the downlink sub-frame of the BS, and receiving, by the RS, the preamble via a downlink header receiving subchannel to keep synchronized with the BS;

after transmitting the preamble in the downlink sub-frame of the BS, transmitting, by the BS, Frame Control Header FCH, Downlink-Map DL-MAP, and Uplink-Map UL-MAP information, and receiving, by the RS, the FCH, DL-MAP and UL-MAP information via a downlink header receiving subchannel, to obtain information about positions and utilization method of timeslots or combinations of Orthogonal Frequency Division Multiple Access, OFDMA, symbols and subchannels of uplink and downlink bursts of the BS;

transmitting, by the BS, a broadcast message via a downlink relay broadcast of the downlink relay zone in the downlink sub-frame of the BS, and transmitting downlink relay communication data to the RS in a downlink relay RS of the downlink relay zone in the downlink sub-frame of the BS, receiving, by the RS, the broadcast message via a downlink relay broadcast subchannel, and receiving, by the RS, the downlink relay communication data via a downlink relay zone of the RS.

The forwarding by the RS the received data to the subscriber station via the downlink sub-frame includes:

transmitting preamble in a downlink header of the downlink sub-frame of the RS, and receiving, by the subscriber station, the preamble to keep synchronized with the RS;

transmitting, by the RS, FCH, DL-MAP, and UL-MAP information in the downlink sub-frame of the RS, and receiving, by the subscriber station, the FCH, DL-MAP and UL-MAP information to obtain information about positions and utilization method of timeslots or combinations of OFDMA symbols and subchannels of uplink and downlink bursts of the RS, wherein the FCH, DL-MAP, and UL-MAP information is transmitted to the RS by the BS;

transmitting, by the RS, downlink relay communication data to the subscriber station in a time and frequency zone, excluding the downlink header and downlink relay zone, in the downlink sub-frame of the RS, receiving, by the subscriber station, the downlink relay communication data via a corresponding time and frequency zone, wherein the downlink relay communication data is transmitted to the RS by the BS;

or, receiving, by the subscriber station, the preamble in the downlink header of the downlink sub-frame of the BS, to keep synchronized with the BS;

receiving, by the subscriber station, the FCH, DL-MAP and UL-MAP information in the downlink header of the downlink sub-frame of the BS to obtain information about positions and utilization method of timeslots or combinations of OFDMA symbols and subchannels of uplink and downlink bursts of the BS and the RS;

transmitting, by the RS, downlink relay communication data to the subscriber station in a time and frequency zone, excluding the downlink header and downlink relay zone, in the downlink sub-frame of the RS, and receiving, by the subscriber station, the downlink relay communication data via a corresponding time and frequency zone, wherein the downlink relay communication data is transmitted to the RS by the BS.

The receiving by the RS the uplink communication data from the subscriber station includes:

after receiving by the subscriber station FCH, DL-MAP and UL-MAP information and obtaining the information about positions and utilization method of timeslots or combinations of OFDMA symbols and subchannels of uplink and downlink bursts of the RS, transmitting, by the subscriber station, the uplink communication data to the RS in timeslots or a time and frequency zone, excluding a time period corresponding to the uplink relay zone of the BS, in the uplink sub-frame of the RS, and receiving, by the RS, the uplink communication data via corresponding timeslots or a corresponding time and frequency zone;

or, after receiving by the subscriber station the FCH, DL-MAP and UL-MAP information in the downlink header of the downlink sub-frame of the BS and obtaining the information about positions and utilization method of timeslots or combinations of OFDMA symbols and subchannels of uplink and downlink bursts of the BS and the RS, transmitting, by the subscriber station, the uplink communication data to the RS in timeslots or a time and frequency zone, excluding a time period corresponding to the uplink relay zone of the BS, in the uplink sub-frame of the RS, and receiving, by the RS, the uplink communication data via corresponding timeslots or a corresponding time and frequency zone.

The receiving by the BS the uplink communication data in the uplink sub-frame includes:

receiving, by the RS, FCH, DL-MAP and UL-MAP information transmitted in a downlink header of the downlink sub-frame of the BS, to obtain information about positions and utilization method of timeslots or combinations of Orthogonal Frequency Division Multiple Access, OFDMA, symbols and subchannels of uplink and downlink bursts of the BS;

transmitting, by the RS, the uplink relay communication data to the BS in an uplink relay receipt of an uplink relay zone in the downlink sub-frame of the RS, and receiving, by the BS, the uplink relay communication data in an uplink relay RS of an uplink relay zone in the uplink sub-frame, wherein the uplink relay communication data is transmitted to the RS by the subscriber station.

when the RS is provided with two radio transceivers, if the two radio transceivers correspond to the BS and the subscriber station respectively, the RS employs a first radio transceiver for information transmission and reception between the RS and the subscriber station, employs a second radio transceiver for information transmission and reception between the RS and the BS;

if the two radio transceivers employ different frequencies corresponding to information transferring from the BS to the subscriber station and information transferring from the subscriber station to the BS, the RS employs a first frequency to receive information from the BS and to perform relay to the subscriber station, employs a second frequency to receive information from the subscriber station and to perform relay to the BS As can be seen from the above solutions of the invention, the wireless relay communication system supports an advanced relay communication mode. In other words, an MSS/SS may access a BS via the relay of an RS, thereby broadening the effective coverage of the BS, and improving the throughput of the MSS/SS. Moreover, the uplink and downlink sub-frames in the relay communication are arranged appropriately, thereby effectively preventing various interferences that may occur in the wireless relay communication.

DETAILED DESCRIPTION OF THE EMBODIMENTS

When implementing a relay communication system and method according to the invention, different relay communication techniques may be employed in different embodiments. For example, information may be transferred by a Relay Station (RS) based on a combination of relay sub-channel with Orthogonal Frequency Division Multiple Access (OFDMA) symbol, or during relay time slots. In addition, relay communication may be implemented by Frequency Division Duplexing (FDD) or Time Division Duplexing (TDD) between a Base Station (BS), a Relay Station (RS) and a Mobile Station/Subscriber Station (MS/SS).

The particular implementations under various application scenarios according to the invention are detailed below in conjunction with the accompanying drawings, to make the invention better understood.

The First Application Scenario: each of a BS, an RS and an MS/SS is provided with a TDD radio transceiver, and the RS performs relay communication by use of one or more configured relay timeslots.

Figure 1:
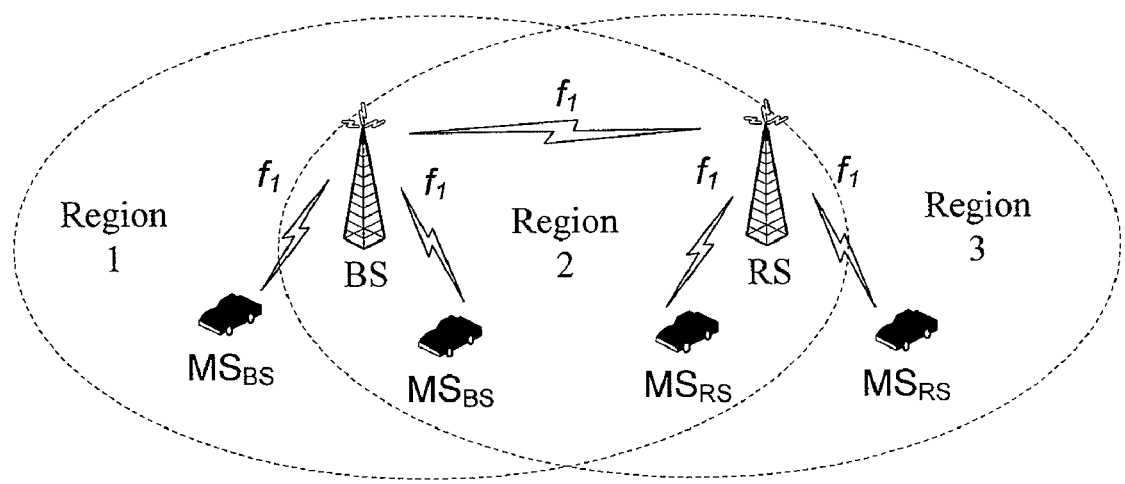
FIG. 1 is a schematic diagram illustrating a communication system including a Relay station (RS)
Figure 2:
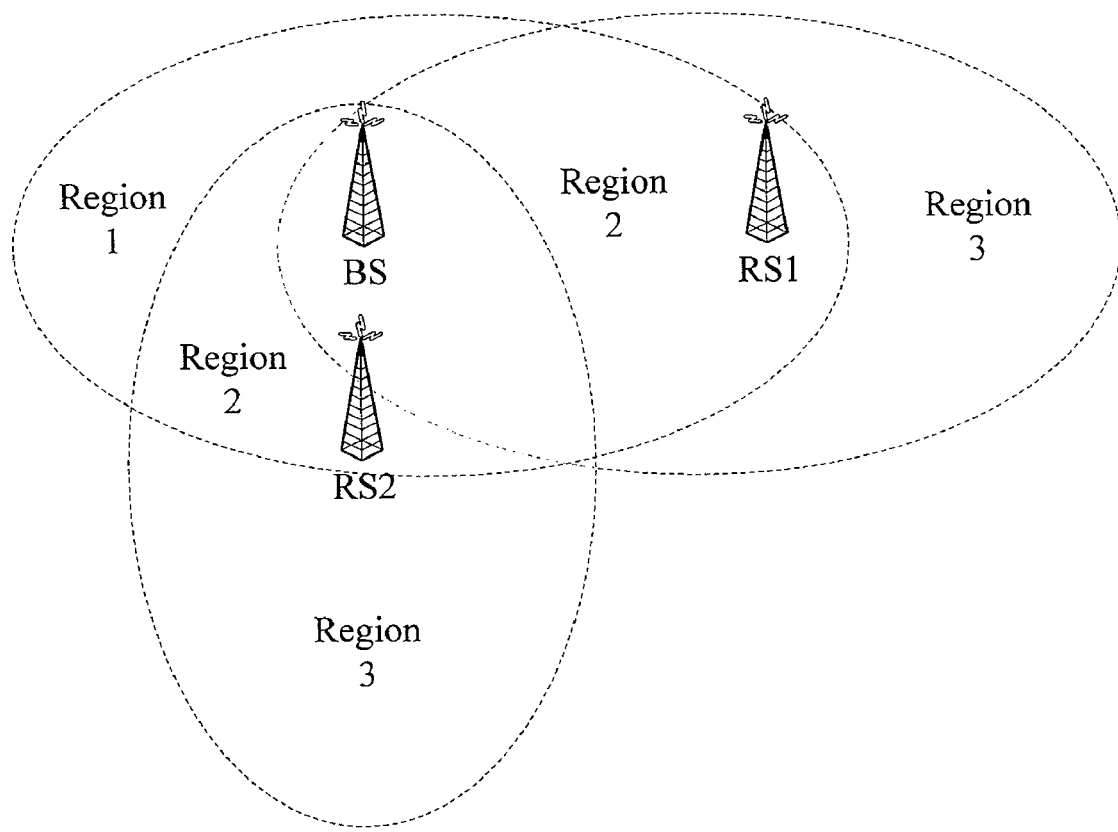
FIG. 2 is a schematic diagram illustrating a communication system including RSs.

FIGS. 1 and 2 illustrate the models of communication systems each including a BS, an RS(s) and MSs/SSs. FIG. 1 shows a model of a communication system including a single RS, and FIG. 2 shows a model of a communication system including multiple RSs. In the communication systems, an RS and a BS, an MS/SS communicate with each other by Time Division Duplexing/Time Division Multiplexing/Time Division Multiple Access (TDD/TDM/TDMA) over a same frequency. The MS/SS accesses the BS through the wireless relay of the RS, and the RS accesses the BS as an MS/SS.

Figure 3:
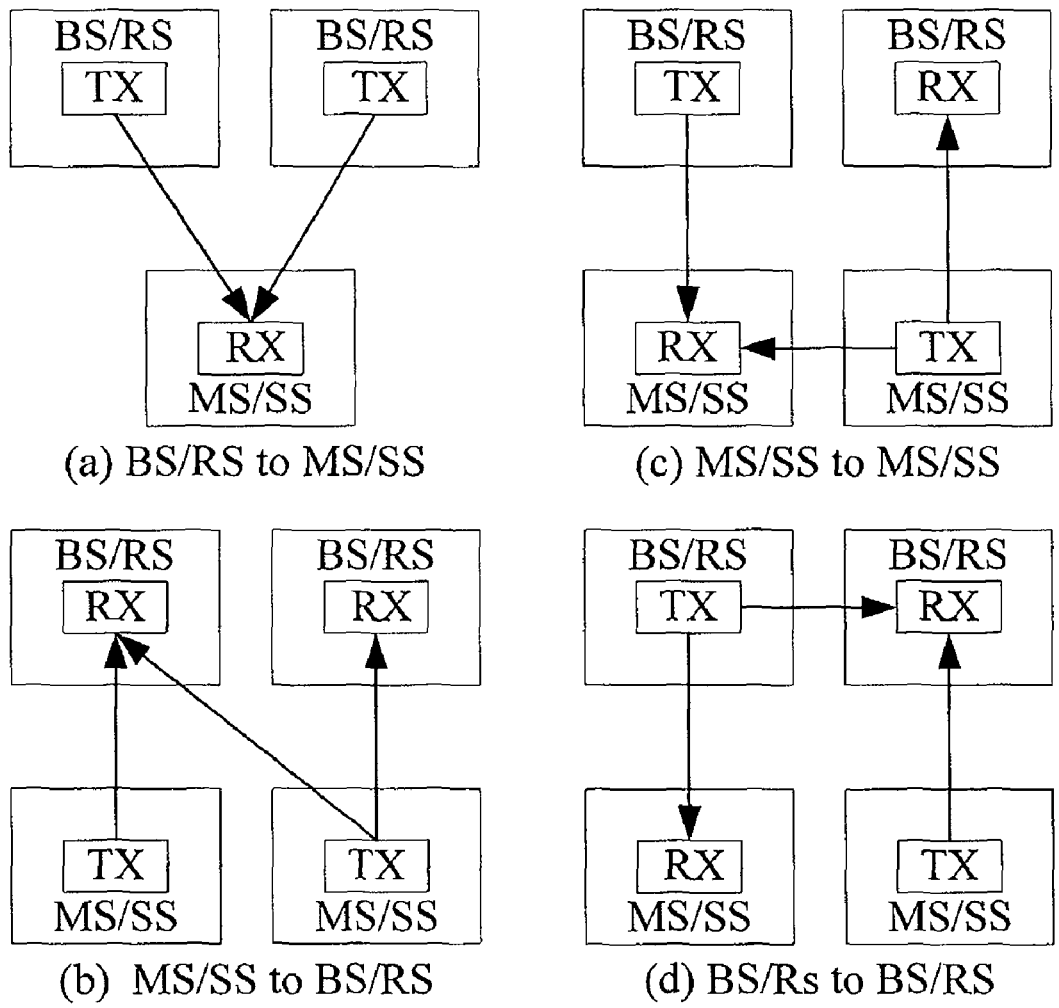
FIG. 3 is a schematic diagram illustrating a first co-frequency interference mode.

The co-frequency communication of a TDD network system brings about mutual interference illustrated by the four situations as shown in FIG. 3 (a)-(d). In FIG. 3, TX represents a transmitting module, and RX represents a receiving module.

In the invention, the coverages of the BS and RS are divided into 3 regions as follows.

The first region 1, simplified as Region 1, is covered by only the BS, in which the interference from the RS to an MS/SS (e.g. an MSBS in FIG. 1) of the BS and the interference from the MSBS to the RS do not exist.

The third region 3, simplified as Region 3, is covered by only the RS, in which the interference from the BS to an MS/SS (e.g. an MSRS in FIG. 1) of the RS and the interference from the MSRS to the BS do not exist.

The second region 2, simplified as Region 2, is covered by both of the BS and RS, in which the interference from the RS to an MSBS and the interference from the MSBS to the RS, as well as the interference from the BS to an MSRS and the interference from the MSRS to the BS, exist. In FIG. 2, for example, the overlapped region between BS and RS1 is region 2 of RS1, and the overlapped region between BS and RS2 is region 2 of RS2.

Figure 4:
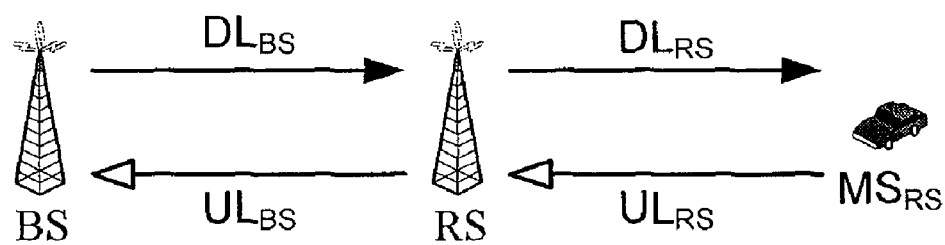
FIG. 4 is a schematic diagram illustrating a model of relay communication between a BS and an RS.

FIG. 4 illustrates a relay communication mode of a BS and an RS, including the following transport frames:

(1) DLBS, which is a downlink frame of the physical layer frame structure of BS, and is sent by BS to RS or SS/MSBS;

(2) ULBS, which is an uplink frame of the physical layer frames of BS, and is sent to BS by RS or SS/MSBS. In ULBS, SS/MSBS keeps synchronization with BS, SS/MSBS keeps frame synchronization with BS in transmission and reception, and RS keeps timeslot synchronization with BS in transmission and reception except for Relay Zone, TTG and RTG;

(3) DLRS, which is a downlink frame of the physical layer frame structure of RS, and is sent by RS to SS/MSRS;

(4) ULRS, which is an uplink frame of the physical layer frame structure of RS, and is sent to RS by SS/MSRS, for which SS/MSRS keeps frame synchronization with RS in transmission and reception.

Based on the above frames, BS may communicate with RS, and thereby communicate with SS/MS via the relay of RS. In addition, the information destined for BS sent by SS/MS may be transmitted to BS via the relay of RS. In this way, the coverage of the communication system may be broadened effectively.

A physical layer frame structure of physical layer frames needs to be defined so that the RS located between the BS and SS/MS is capable of relay communication. Moreover, an appropriate frame definition according to the relay communication is required to ensure the communication reliability. An appropriate definition of physical layer frames structure of BS and RS may facilitate the relay communication via RS, and prevent the possible interference during communication effectively. Therefore, the definition of physical layer frame structure of BS and RS is critical to the relay communication via RS. The definition of frame structures according to the requirements of transport frames during the relay communication of RS and BS is described below in detail.

To enable the relay communication between BS and SS/MS via RS, the structures of physical layer uplink and downlink frame structures of BS and RS are defined as follows:

1. DL Relay Zone (downlink relay zone) is arranged in the downlink frame DLBS of the physical layer frame structure of BS, to define BS downlink relay data timeslots for transmission from BS to RS.

2. DL Relay Zone (downlink relay zone) is arranged in the uplink frame ULRS of the physical layer frame structure of RS, to define the BS downlink relay data timeslots for transmission from BS to RS.

3. UL Relay Zone (uplink relay zone) is arranged in the uplink frame ULBS of the physical layer frame structure of BS, to define BS uplink relay data timeslots transmission from RS to BS.

4. UL Relay Zone (uplink relay zone) is arranged in the downlink frame DLRS of the physical layer frame structure of RS, to define BS uplink relay data timeslots transmission from RS to BS.

The timeslots in the DL Relay Zone of BS have a one-to-one correspondence with those in the DL Relay Zone of RS, and the timeslots in the UL Relay Zone of BS have a one-to-one correspondence with those in the UL Relay Zone of RS, so as to ensure the information transmission and reception between BS and RS.

Furthermore, SS/MSBS or SS/MSRS arranges no reception or transmission timeslot in the interval between the DL Relay Zone and UL Relay Zone of BS, so as to prevent the interference from SS/MSBS to RS and the interference from SS/MSRS to BS.

In addition, in the case of multiple RSs as shown in FIG. 2, the multiple RSs share the UL Relay Zone by TDM.

In the invention, to exchange broadcast service information between BS and RS, the relay zones in the frame structures of BS and RS need to be defined as follows:

1. DL Relay Broadcast Slot (downlink relay broadcast timeslot), simplified as DL RB, is arranged in the DL Relay Zone of the downlink frame DLBS of the physical layer frame structure of BS, to define downlink timeslots for broadcast from BS to RS, during which DCD (Downlink Channel Descriptor), UCD (Uplink Channel Descriptor), FCP (Fast Power Control), and CLK_CMP (Clock Comparison) broadcast messages as defined in the 802.16 standard are broadcasted.

2. DL Relay Broadcast RX Slot (downlink relay broadcast receiving timeslot), simplified as DL RB RX, is created in the DL Relay Zone of the uplink frame ULRS of the physical layer frame structure of RS, to define RS uplink timeslots for the reception of downlink relay broadcast timeslots of BS, from which DCD, UCD, FCP, and CLK_CMP broadcast messages as defined in the broadcast 802.16 standard are received.

In the invention, to prevent the interference during relay communication of RS and BS, the physical layer frames of BS and RS are required to be further defined as follows:

1. DL Interference Slot (downlink interference timeslot), is arranged in the downlink frame DLBS of the physical layer frame structure of BS, to define BS downlink data timeslots for BS downlink coverage of the region 2.

2. DL Interference Slot (downlink interference timeslot), is arranged in the downlink frame DLRS of the physical layer frame structure of RS, to define RS downlink data timeslots for RS downlink coverage of the region 2.

In the above frame definition, the DL Interference Slot of BS is not overlapped in time with that of RS, to prevent the interference from RS to SS/MSBS and the interference from BS to SS/MSRS.

In addition, in the case of multiple RSs as shown in FIG. 2, the multiple RSs share the DL Interference Slot by TDM, to prevent the interference between RSs.

In the invention, to enable the relay communication based on RS, the physical layer frames of BS and RS are required to be further defined as follows:

1. DL Header Slot (downlink header timeslot) is arranged in the downlink frame DLBS of the physical layer frame structure of BS. The DL Header Slot is the beginning of the downlink frame DLBS, and defines timeslots for transmitting user synchronization information and timeslots for transmitting indication information indicating the positions and utilization method (i.e. profile) of the timeslots of uplink and downlink frames of the physical layer frame structure of BS, the synchronization information and indication information include the preamble, FCH burst (Frame Control Header burst), and one or more downlink Bursts of an existing 802.16 OFDM (or SC, i.e. Single Carrier) frame. The downlink Burst is specified by DLFP (Downlink Frame Prefix) and subsequently follows FCH (Frame Control Header), and contains a DL-MAP (downlink map) and a UL-MAP (uplink map). Furthermore, frame synchronization is kept between SS/MSBS, RS and BS in transmission and reception, and the RS keeps timeslot synchronization with BS in transmission and reception, except for Relay Zone, TTG (Transmit/Receive Transition Gap), and RTG (Receive/Transmit Transition Gap).

2. DL Header Slot (downlink header timeslot) is arranged in the downlink frame DLRS of the physical layer frame structure of RS. The DL Header Slot is the beginning of the downlink frame DLRS, and defines timeslots for transmitting user synchronization information and timeslots for transmitting indication information indicating the positions and utilization method (i.e. profile) of the timeslots of uplink and downlink frames of the physical layer frame structure of RS, and includes the preamble, FCH burst, and one or more downlink Bursts of an existing 802.16 OFDM (or SC, i.e. Single Carrier) frame. The downlink Burst is specified by DLFP (Downlink Frame Prefix) and follows FCH, and includes a DL-MAP and a UL-MAP. Frame synchronization is kept between SS/MSBS and RS in transmission and reception.

The DL Header Slot of RS lags behind that of BS in time, and should not be overlapped in time with the DL Header Slot, DL Relay Zone and DL Interference Slot of the downlink frame DLBS of the physical layer frame structure of BS.

The DL Header Slot of an RS should not be overlapped in time with the DL Header Slot, UL Contention TX Slot (uplink contention transmission timeslot), DL Interference Slot and DL Relay Zone of the downlink frame DLRS of the physical layer frame structure of another RS, to prevent the interference between RSs. In special situations, if the DL Header Slots of different RSs overlap in time, the DL Header Slots should be overlapped entirely, be rigorously synchronized with each other, and carry the same contents, so as to prevent the interference between RSs.

Moreover, to facilitate the reception of DL Header Slot from BS at RS, a DL Header RX Slot (downlink header receiving timeslot) is arranged in the uplink frame ULRS of the physical layer frame structure of RS in the invention. The DL Header RX Slot defines timeslots for receiving the DL Header Slot of BS, and is required to be entirely overlapped and rigorously synchronized with the DL Header Slot of BS.

In the invention, to prevent uplink interference, the physical layer frames of BS and RS are required to be further defined as follows, i.e. a corresponding uplink interference timeslot is defined.

1. UL Interference Slot (uplink interference timeslot) is arranged in the uplink frame ULBS of the physical layer frame structure of BS, to define BS uplink data timeslots for BS uplink coverage of region 2.

2. UL Interference Slot (uplink interference timeslot) is arranged in the uplink frame ULRS of the physical layer frame structure of RS, to define RS uplink data timeslots for RS uplink coverage of region 2.

The UL Interference Slot of BS defined as above should not be overlapped in timeslot with the UL Interference Slot of RS, to prevent the interference from SS/MSBS to RS and the interference from SS/MSRS to BS.

In addition, in the case of multiple RSs as shown in FIG. 2, the multiple RSs share the UL Interference Slot by TDM, to prevent the interference between RSs.

The invention further defines uplink contention timeslots of BS and RS as follows:

1. UL Contention Slot (uplink Contention timeslot) is arranged in the uplink frame ULBS of the physical layer frame structure of BS. The UL Contention Slot of BS includes an initial Ranging contention timeslot and a bandwidth request contention timeslot of an existing 802.16 OFDM (or SC) frame.

2. UL Contention Slot (uplink Contention timeslot) is arranged in the uplink frame ULRS of the physical layer frame structure of RS. The UL Contention Slot of RS includes an initial Ranging contention timeslot and a bandwidth request contention timeslot of an existing 802.16 OFDM (or SC) frame, and should not be overlapped with the uplink relay zone and/or uplink interference timeslot of an uplink frame of BS.

An uplink contention transmitting timeslot, i.e. UL Contention TX Slot, is also defined in the downlink frame DLRS of the physical layer frame structure of RS, to define timeslots for contending for the UL Contention Slot of BS, and the downlink frame DLRS including the UL Contention TX Slot is transmitted from RS.

The UL Contention Slot of BS should be entirely overlapped in timeslot and rigorously synchronized with the UL Contention TX Slot of RS.

In the above defined frame structures, except for DL Relay Zone and UL Relay Zone, the downlink timeslots of BS should not be overlapped with the uplink timeslots of RS, and the uplink timeslots of BS should not be overlapped with the downlink timeslots of RS, either, to prevent the interference from SS/MSBS to SS/MSRS, the interference from SS/MSRS to SS/MSBS, the interference from BS to RS and the interference from RS to BS.

An interval having a length of at least a TTG may be reserved between a downlink frame DLBS and an uplink frame ULBS of BS. An interval having a length of at least an RTG may be reserved between an uplink frame ULBS and a downlink frame DLBS of BS. An interval having a length of at least a TTG may be reserved from a downlink frame DLRS to an uplink frame ULRS of RS. An interval having a length of at least an RTG may be reserved between an uplink frame ULRS and a downlink frame DLRS of RS.

Moreover, in the above defined frame structures, the Slots or Zones as defined, except for the DL Header Slot and UL Contention Slot, are not necessarily to be included in each frame.

Particular examples of the embodiments of the invention are described below to make the invention better understood.

Figure 5:
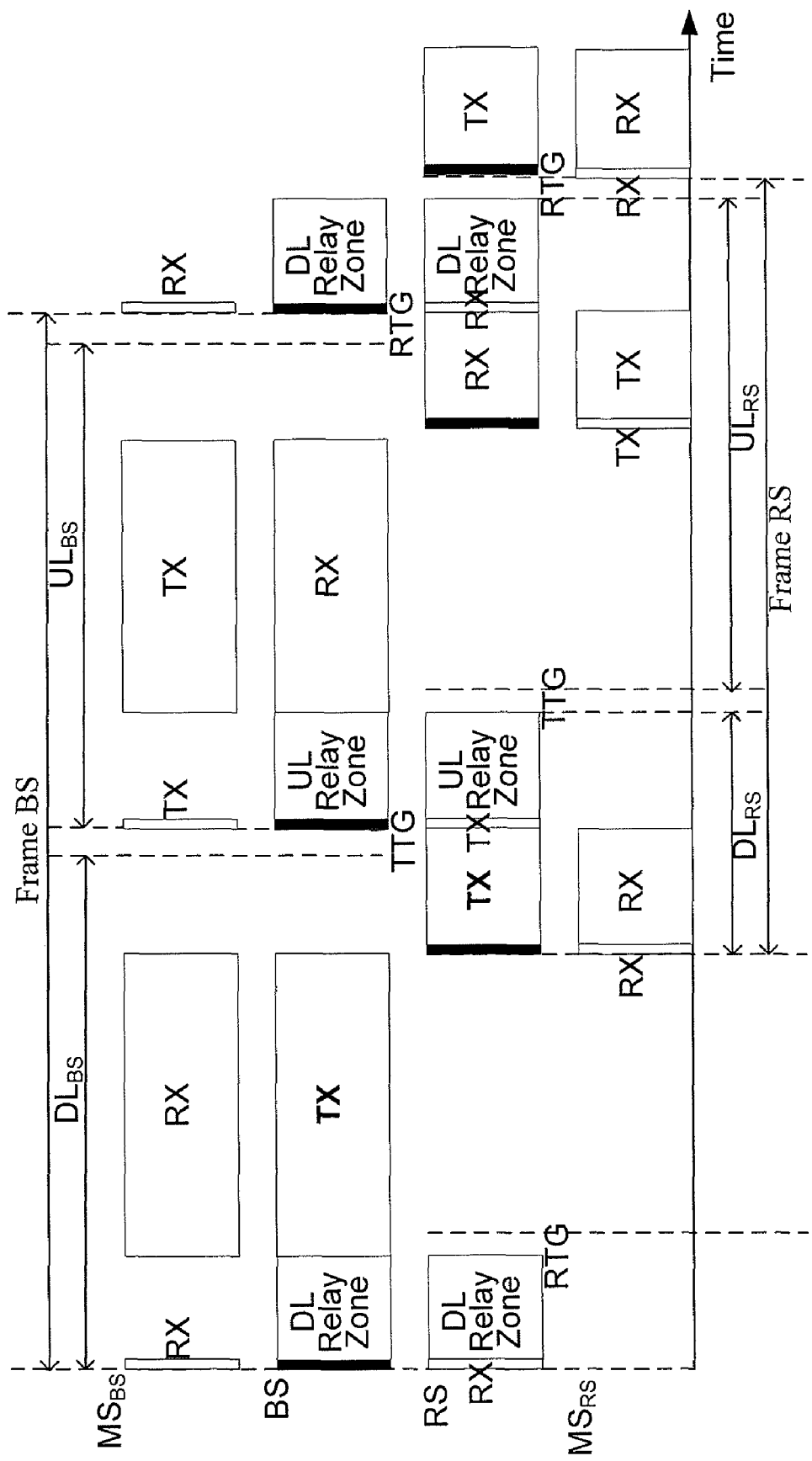
FIG. 5 is a first schematic diagram illustrating the physical layer frame structures of a BS and an RS in a first application scenario.
Figure 6:
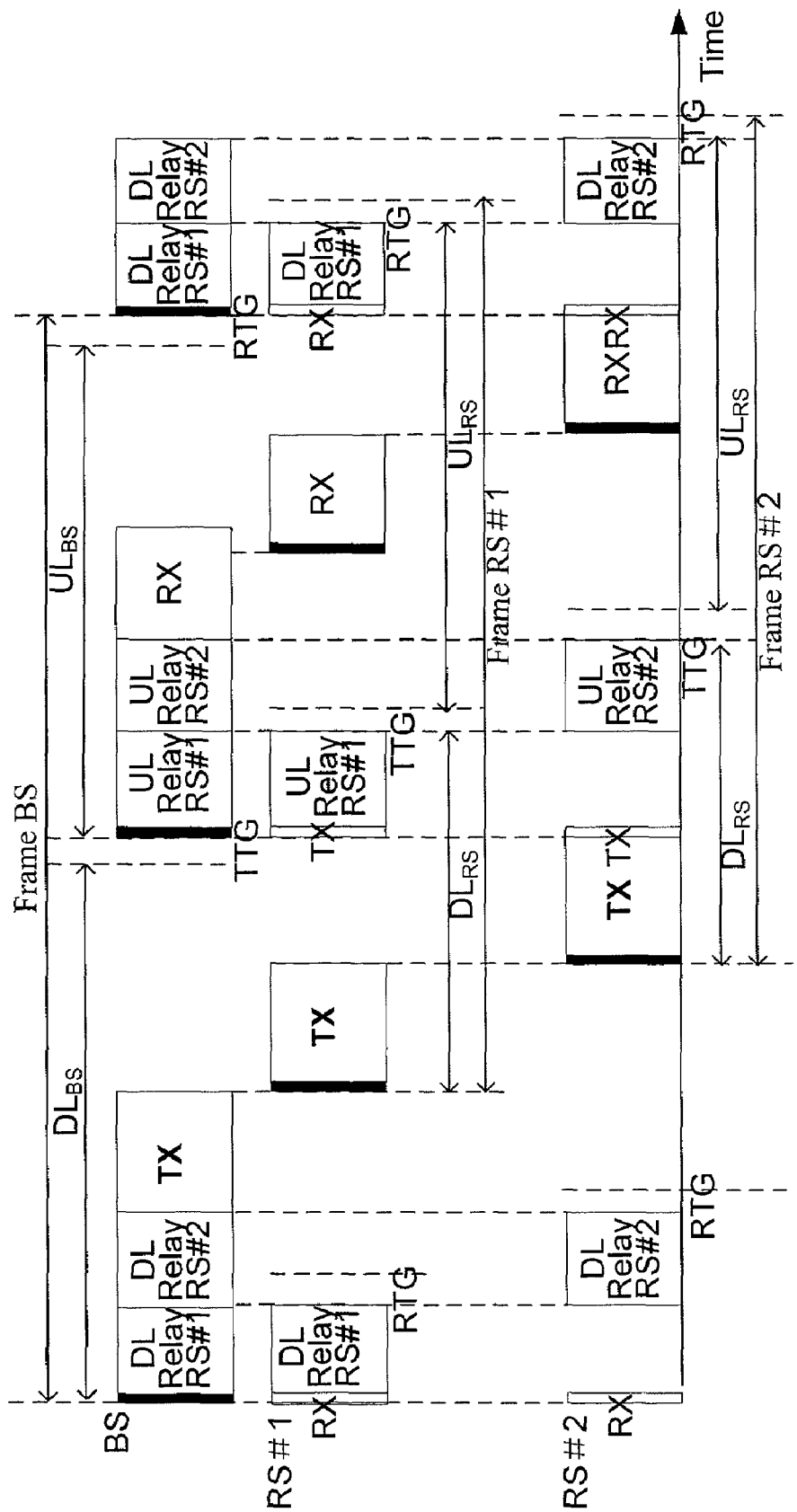
FIG. 6 is a second schematic diagram illustrating the physical layer frame structures of a BS and an RS in the first application scenario.

FIGS. 5 and 6 illustrate a first embodiment of the physical layer frame structures of BS and RS according to the invention. FIG. 5 shows the case of a single RS, and FIG. 6 shows the case of multiple RSs.

The black blocks in downlink frame DLBS of BS and downlink frame DLRS of RS represent DL Header Slots. The black blocks in uplink frame ULBS of BS and uplink frame ULRS of RS represent UL Contention Slots.

The white slender block in downlink frame DLRS of RS represents a UL Contention TX Slot. The time slot RX represented by a white slender block in uplink frame ULRS of RS is a DL Header RX Slot.

The timeslot TX in downlink frame DLBS of BS is a DL Interference Slot, for BS downlink coverage of region 2. The timeslot RX in uplink frame ULBS of BS is a UL Interference Slot, for BS uplink coverage of region 2.

The timeslot TX in downlink frame DLRS of RS is a DL Interference Slot, for RS downlink coverage of region 2. The timeslot RX in uplink frame ULRS of RS is a UL Interference Slot, for RS uplink coverage of region 2.

As shown in FIGS. 5 and 6, the DL Relay Zone of BS follows the DL Header Slot of the downlink frame DLBS of BS, and the UL Relay Zone of BS follows the UL Contention Slot of the uplink frame ULBS of BS. The timeslots of DL Relay Zone of BS have a one-to-one correspondence with those of DL Relay Zone of RS, and the timeslots of UL Relay Zone of BS have a one-to-one correspondence with those of UL Relay Zone of RS. An MS does not arrange any receiving or transmitting timeslot during the time periods corresponding to the DL Relay Zone and UL Relay Zone of BS.

The UL Interference Slot of BS is not overlapped with that of RS in timeslots, and the DL Interference Slot of BS is not overlapped with that of RS in timeslots.

In the invention, in the case of multiple RSs as shown in FIG. 6, the multiple RSs share, by using TDM, the DL Relay Zone (i.e. DL RB, DL Relay R#1, #2, . . . , etc. in FIG. 6), UL Relay Zone (i.e. UL Relay R#1, #2, . . . etc.), DL Interference Slot and UL Interference Slot, to prevent the interference between RSs.

Figure 7:
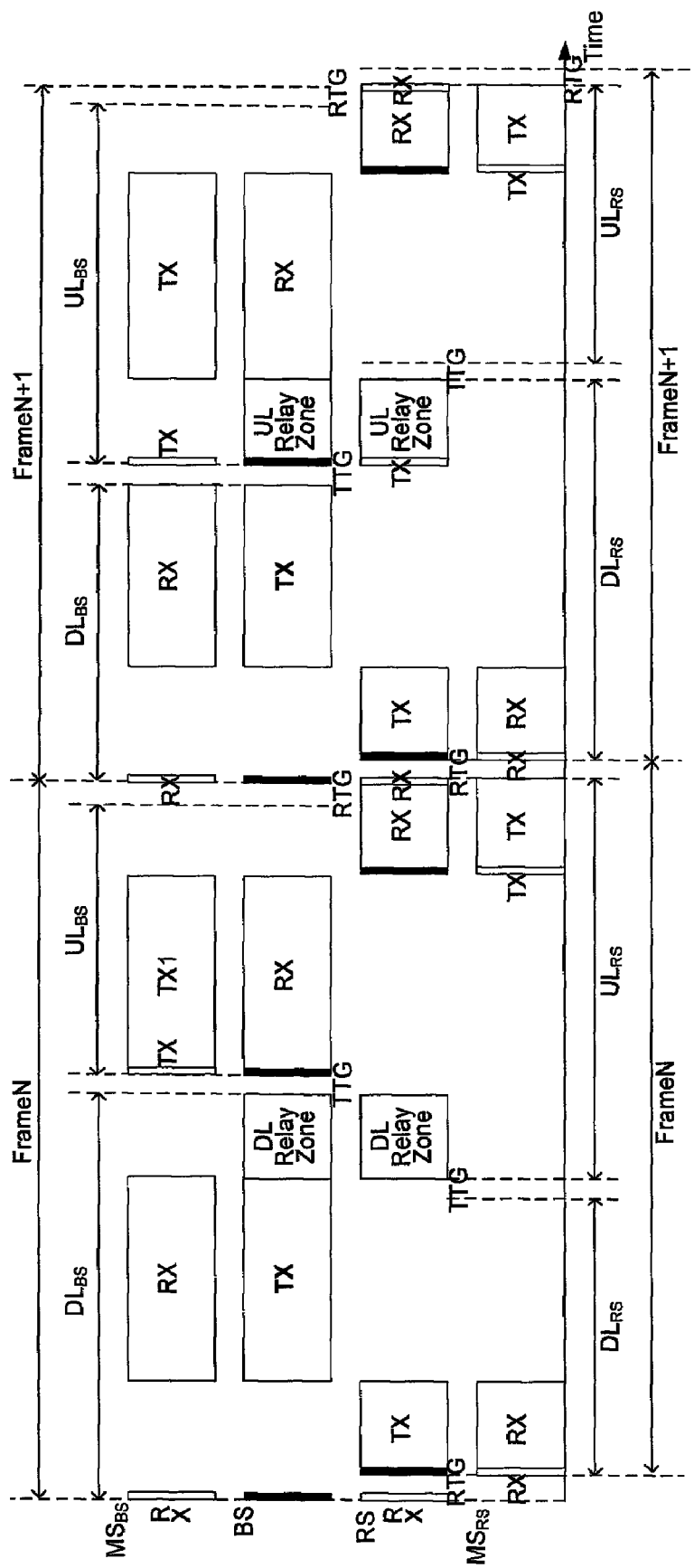
FIG. 7 is a third schematic diagram illustrating the physical layer frame structures of a BS and an RS in the first application scenario.

FIG. 7 illustrates a second embodiment of the physical layer frame structures of BS and RS according to of the invention.

As shown in FIG. 7, the UL Contention TX Slot of RS appears once every two frames. For example, the UL Contention TX Slot of RS appears in the downlink frame DLRS of Frame N−1, Frame N+1, Frame N+3.

The DL Relay Zone of BS and the UL Relay Zone of BS may be arranged in different frames. For example, the DL Relay Zone of BS may be arranged at the end of the downlink frame DLBS of FrameN. The DL Relay Zone of RS may be arranged at the header of the uplink frame ULRS of FrameN, followed by a UL Contention Slot. The UL Relay Zone of BS may be arranged to follow the UL Contention Slot of the uplink frame ULBS of Frame N+1.

The timeslots of DL Relay Zone of BS have one-to-one correspondence with those of DL Relay Zone of RS, and the timeslots of UL Relay Zone of BS have one-to-one correspondence with those of UL Relay Zone of RS. An MS does not arrange any receiving or transmitting timeslot during the time periods corresponding to the DL Relay Zone and UL Relay Zone of BS.

In the invention, the above described physical layer frame structures of BS and RS may further include the timeslots defined as follows:

1. a DL Non-Interference Slot (downlink Non-Interference timeslot), arranged in the downlink frame DLBS of the physical layer frame structure of BS, to define the downlink data timeslots of BS for the BS downlink coverage "region 1";

2. a DL Non-Interference Slot (downlink Non-Interference timeslot), arranged in the downlink frame DLRS of the physical layer frame structure of RS, to define the downlink data timeslots of RS for the RS downlink coverage "region 3";

The DL Non-Interference Slot of BS may be overlapped with that of RS in timeslots.

3. a UL Non-Interference Slot (uplink Non-Interference timeslot), arranged in the uplink frame ULBS of the physical layer frame structure of BS, to define the uplink data timeslots of BS for the BS uplink coverage "region 1";

4. a UL Non-Interference Slot (uplink Non-Interference timeslot), arranged in the uplink frame ULRS of the physical layer frame structure of RS, to define the uplink data timeslots of RS for the RS uplink coverage "region 3";

The UL Non-Interference Slot of BS may be overlapped with that of RS in timeslots.

At this time, the DL header Slot of RS lags behind that of BS in time, and the DL Header Slot of RS is not overlapped with that of BS. The DL header Slot of RS is required to be within the time period corresponding to the DL Non-Interference Slot of the downlink frame DLBS of the physical layer frame structure of BS.

In addition, the DL Header Slot of an RS can not be overlapped with the DL Header Slot, UL Contention Slot, DL Relay Zone and DL Interference Zone in the downlink frame DLRS of physical layer frame structure of another RS, so as to prevent the interference between RSs. In special cases that the DL Header Slot of an RS overlaps with that of another RS, the DL Header Slots of the two RSs are required to be completely overlapped and strictly synchronous with each other, and the contents thereof are required to be the same, to prevent the interference between the RSs.

Figure 8:
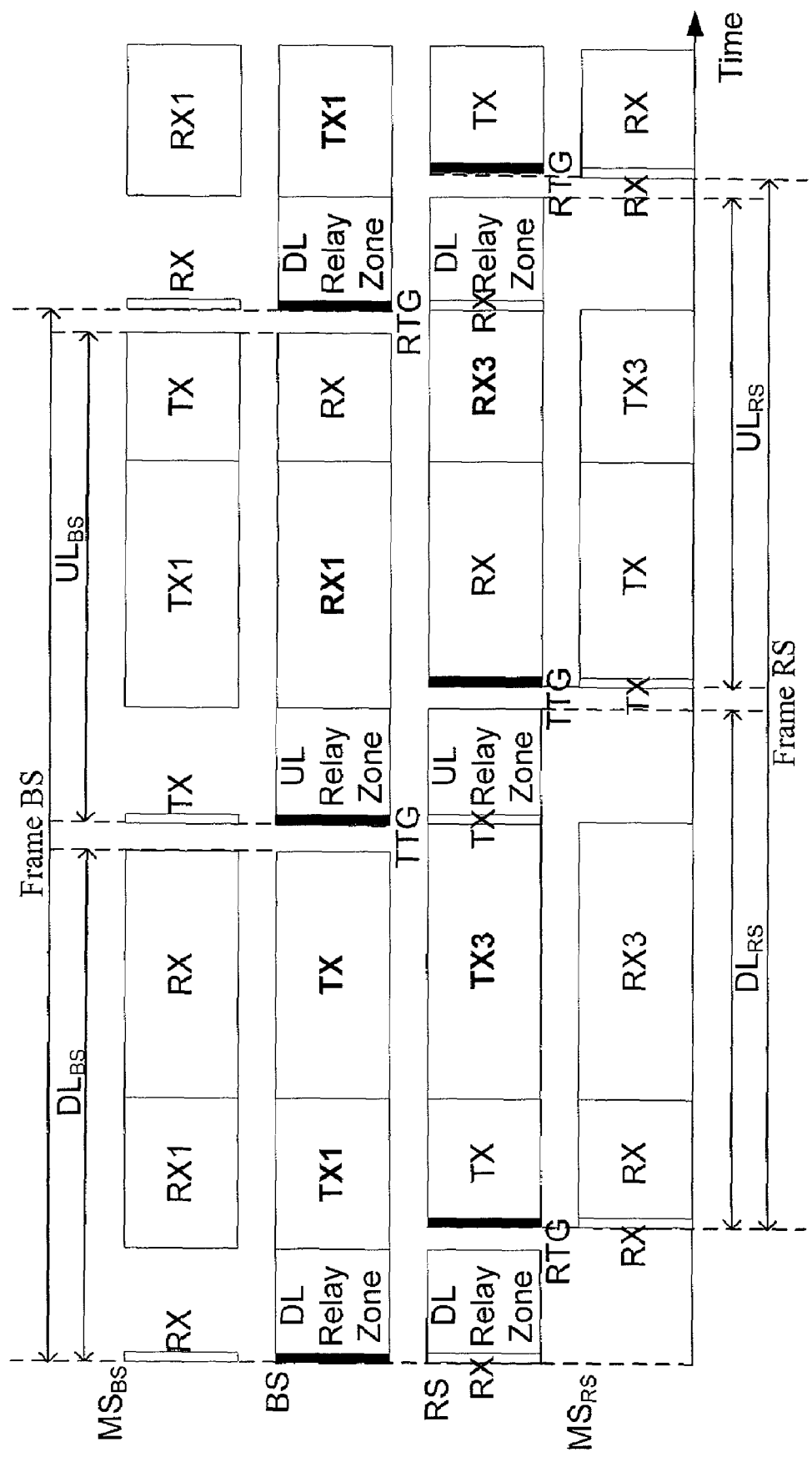
FIG. 8 is a fourth schematic diagram illustrating the physical layer frame structures of a BS and an RS in the first application scenario.

FIG. 8 illustrates a third embodiment of the physical layer frame structures of BS and RS according to the invention, based on the above physical frames, of BS and RS, including the downlink non-interference timeslots and the uplink non-interference timeslots.

The black blocks in downlink frame DLBS of BS and downlink frame DLRS of RS represent DL Header Slots. The black blocks in uplink frame ULBS of BS and uplink frame ULRS of RS represent UL Contention Slots.

The time slot TX represented by a white slender block in downlink frame DLRS of RS represents a UL Contention TX Slot. The time slot RX represented by a white slender block in uplink frame ULRS of RS is a DL Header RX Slot.

The timeslot TX1 in downlink frame DLBS of BS is a DL Non-Interference Slot, for the downlink coverage of BS including region 1. The timeslot TX in downlink frame DLBS of BS is a DL Interference Slot, for BS downlink coverage of region 2. The timeslot RX1 in uplink frame ULBS of BS is a UL Non-Interference Slot, for the uplink coverage of BS including region 1. The timeslot RX in uplink frame ULBS of BS is a UL Interference Slot, for BS uplink coverage of region 2.

The timeslot TX3 in downlink frame DLRS of RS is a DL Non-Interference Slot, for the downlink coverage of RS including region 3. The timeslot TX in downlink frame DLRS of RS is a DL Interference Slot, for RS downlink coverage of region 2. The timeslot RX3 in uplink frame ULRS of RS is a UL Non-Interference Slot, for the uplink coverage of RS including region 3. The timeslot RX in uplink frame ULRS of RS is a UL Interference Slot, for RS uplink coverage of region 2.

The DL Relay Zone of BS follows the DL Header Slot of the downlink frame DLBS of BS, and the UL Relay Zone of BS follows the UL Contention Slot of the uplink frame ULBS of BS.

The timeslots of DL Relay Zone of BS have a one-to-one correspondence with those of DL Relay Zone of RS, and the timeslots of UL Relay Zone of BS have a one-to-one correspondence with those of UL Relay Zone of RS. An MS does not arrange any receiving or transmitting timeslot during the time periods corresponding to the DL Relay Zone and UL Relay Zone of BS.

The UL Interference Slot of BS is not overlapped with that of RS in timeslots, and the DL Interference Slot of BS is not overlapped with that of RS in timeslots.

In the invention, the above described interference timeslots of the physical layer frame structures of BS and RS may define the region (i.e. region 2) covered by both of BS and RS as follows:

1. a DL Interference Slot (downlink Interference timeslot) is arranged in the downlink frame DLBS of the physical layer frame structure of BS, to define the downlink data timeslots of BS for the BS downlink coverage "region 2";

2. a DL Interference Slot (downlink Interference timeslot) is arranged in the downlink frame DLRS of the physical layer frame structure of RS, to define the downlink data timeslots of RS for the RS downlink coverage "region 2";

3. a UL Interference Slot (uplink Interference timeslot) is arranged in the uplink frame ULBS of the physical layer frame structure of BS, to define the uplink data timeslots of BS for the BS uplink coverage "region 2";

4. a UL Interference Slot (uplink Interference timeslot) is arranged in the uplink frame ULRS of the physical layer frame structure of RS, to define the uplink data timeslots of RS for the RS uplink coverage "region 2";

In addition, in the case of multiple RSs as shown in FIG. 2, the multiple RSs share the UL Interference Slot by TDM, to prevent the interference between the RSs.

Figure 9:
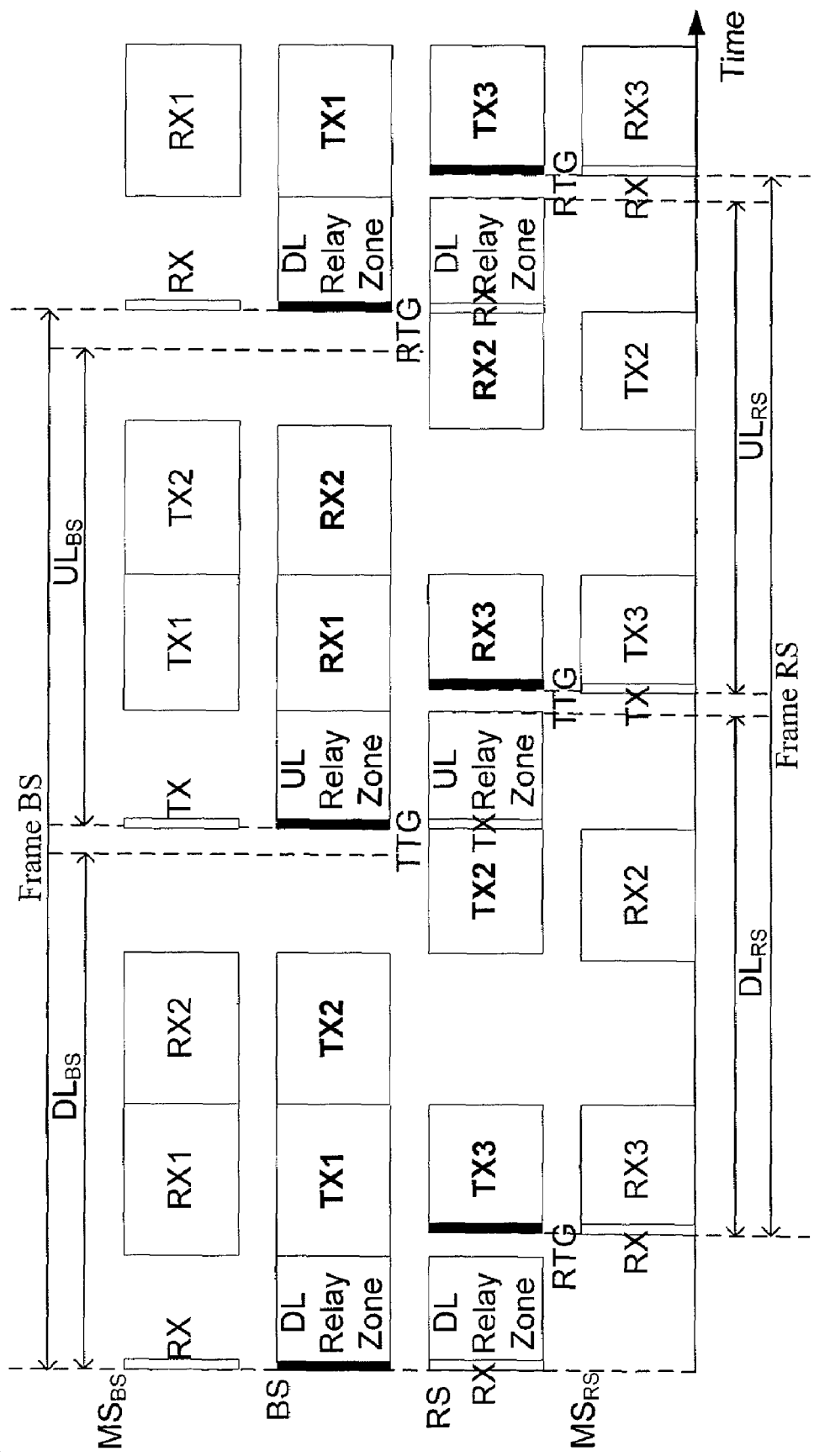
FIG. 9 is a fifth schematic diagram illustrating the physical layer frame structure of a BS and an RS in the first application scenario.

FIG. 9 illustrates the physical layer frame structures of BS and RS according to a third embodiment of the invention, based on the above physical frames of BS and RS.

The black blocks in downlink frame DLBS of BS and downlink frame DLRS of RS represent DL Header Slots. The black blocks in uplink frame ULBS of BS and uplink frame ULRS of RS represent UL Contention Slots.

The time slot TX represented by a white slender block in downlink frame DLRS of RS represents a UL Contention TX Slot. The time slot RX represented by a white slender block in uplink frame ULRS of RS is a DL Header RX Slot.

The timeslot TX1 in downlink frame DLBS of BS is a DL Non-Interference Slot, for the downlink coverage of BS including region 1. The timeslot TX2 in downlink frame DLBS of BS is a DL Interference Slot, for the downlink coverage of BS including region 2. The timeslot RX1 in uplink frame ULBS of BS is a UL Non-Interference Slot, for the uplink coverage of BS including region 1. The timeslot RX2 in uplink frame ULBS of BS is a UL Interference Slot (for the uplink coverage of BS including region 2).

The timeslot TX3 in downlink frame DLRS of RS is a DL Non-Interference Slot, for the downlink coverage of RS including region 3. The timeslot TX2 in downlink frame DLRS of RS is a DL Interference Slot, for the downlink coverage of RS including region 2. The timeslot RX3 in uplink frame ULRS of RS is a UL Non-Interference Slot, for the uplink coverage of RS including region 3. The timeslot RX2 in uplink frame ULRS of RS is a UL Interference Slot, for the uplink coverage of RS including region 2.

The DL Relay Zone of BS follows the DL Header Slot of the downlink frame DLBS of BS, and the UL Relay Zone of BS follows the UL Contention Slot of the uplink frame ULBS of BS.

The timeslots of DL Relay Zone of BS have a one-to-one correspondence with those of DL Relay Zone of RS, and the timeslots of UL Relay Zone of BS have a one-to-one correspondence with those of UL Relay Zone of RS. An MS does not arrange any receiving or transmitting timeslot during the time periods corresponding to the DL Relay Zone and UL Relay Zone of BS.

The UL Interference Slot of BS is not overlapped with that of RS in timeslots, and the DL Interference Slot of BS is not overlapped with that of RS in timeslots. The DL Non-Interference Slot of BS is overlapped with that of RS in timeslots as much as possible, and the UL Non-Interference Slot of BS is overlapped with that of RS in timeslots as much as possible.

The Second Application Scenario: each of a BS, an RS and an MS/SS is provided with a TDD radio transceiver, and the RS performs relay communication by use of the combination of OFDMA symbols and a relay subchannel(s).

In the second application scenario, the physical layer frame structures of BS and RS are defined by introducing a combination mechanism of TDM and OFDMA.

Figure 10:
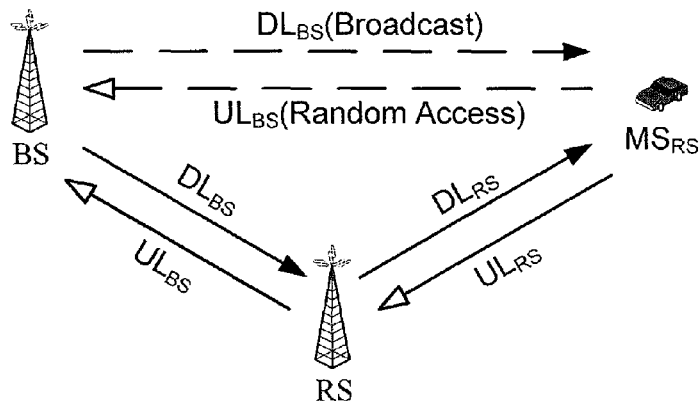
FIG. 10 is a schematic diagram illustrating an Orthogonal Frequency Division Multiple Access (OFDMA) communication system.

FIG. 4 and FIG. 10 respectively shows two structures of relay communication systems, i.e. an advanced-mode relay communication system and a simplified-mode relay communication system. The system models of the two relay communication systems are described below.

(I) FIG. 4 illustrates an advanced-mode relay communication system model between RS, and BS and MS/SS. This is a common communication system model, in which an RS and a BS, an MS/SS communicate with each other by using TDD/TDM/TDMA techniques over a same frequency. The MS/SS accesses the BS through the wireless relay of the RS, and the RS accesses the BS as an MS/SS.

Figure 11:
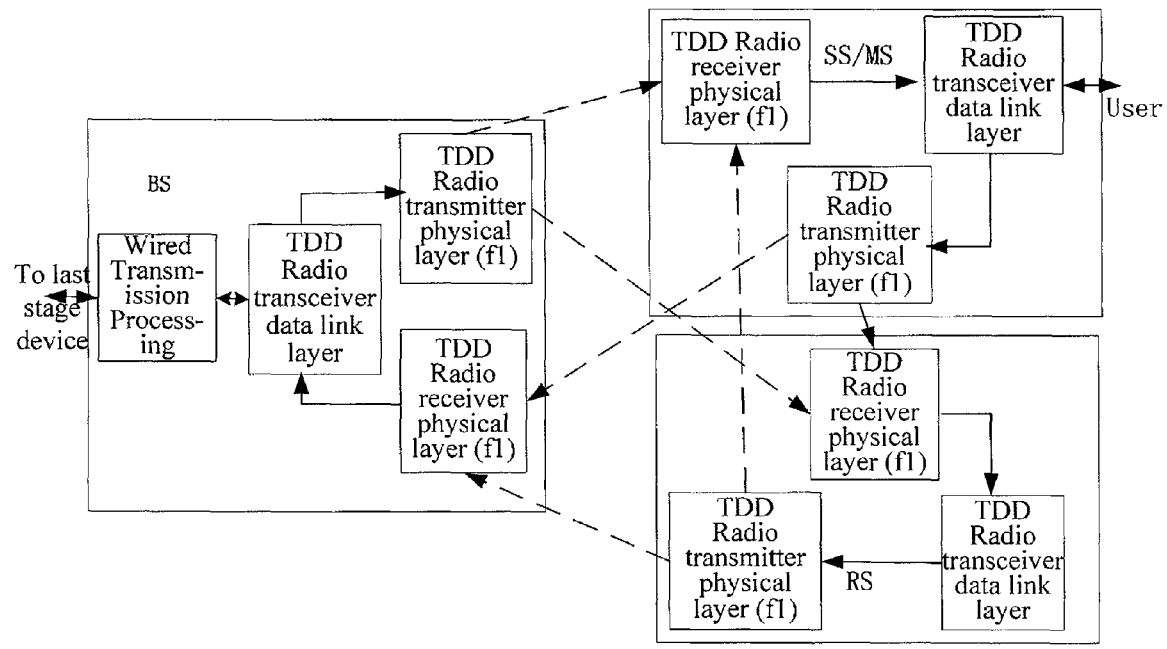
FIG. 11 is a schematic diagram illustrating the detailed structure of the system as shown in FIG. 10.

(II) FIGS. 10 and 11 illustrate a simplified-mode relay communication system model between RS, and BS and MS/SS. This relay mode represents a relay communication system model provided by the invention, in which an RS and a BS, an MS/SS communicate with each other by using TDD/TDM/TDMA techniques over a same frequency. The RS accesses the BS as an MS/SS.

In the simplified-mode relay communication system including BS, RS and MS/SS, the BS is provided with interfaces for communication with the RS and the subscriber terminal, the RS is provided with interfaces for communication with the BS and the subscriber terminal, and each MS/SS is provided with interfaces for communication with the BS and RS. The RS, BS, and MS/SS communicate with each other via the above interfaces.

As shown in FIG. 11, the BS includes:

a wired transmission processing unit, capable of establishing communication with an upper stage apparatus (such as a base station controller) or with a set of base stations, and exchanging information with the upper stage apparatus or the set of base stations;

a TDD radio transceiver, adapted to communicate wirelessly with an RS or SS/MS in a TDD manner over a same frequency (such as f1). The TDD radio transceiver includes a TDD radio transmitter physical layer unit, a TDD radio receiver physical layer unit, and a TDD radio transceiver data link layer unit.

The TDD radio transmitter physical layer unit is adapted to communicate with the data link layer unit of the TDD radio transceiver and wirelessly with the radio receiver physical layer unit of the RS or SS/MS, capable of communicating with the BS, over a same frequency (such as f1). In the simplified relay mode, the TDD radio transmitter physical layer unit employs, for the downlink sub-frame header broadcast of DLBS (such as Preamble, FCH, DL-MAP, UL-MAP), a channel encoding and modulation scheme (such as Binary Phase Shift Keying, BPSK) more reliable than that for other transmission data, or employs a higher transmission power than for other transmission data. The BS directly transmits the downlink sub-frame header broadcast of DLBS to the MS/SS without the relay of RS.

The TDD radio receiver physical layer unit is adapted to communicate with the data link layer unit of the TDD radio transceiver and wirelessly with the radio transmitter physical layer unit of the RS or SS/MS, capable of communicating with the BS, over a same frequency (such as f1).

The TDD radio transceiver data link layer unit is adapted to perform a TDD radio transceiver data link layer processing on the data received from the TDD radio receiver physical layer unit or the wired transmission processing unit, and forward the processed data to the wired transmission processing unit or the TDD radio transmitter physical layer unit.

The RS includes:

a TDD radio transceiver, adapted to communicate wirelessly with a BS or SS/MS in a TDD manner over a same frequency (such as f1). The TDD radio transceiver includes a TDD radio transmitter physical layer unit, a TDD radio receiver physical layer unit, and a TDD radio transceiver data link layer unit.

The TDD radio transmitter physical layer unit is adapted to communicate with the data link layer unit of the TDD radio transceiver and wirelessly with the radio receiver physical layer unit of the BS or SS/MS, capable of communicating with the RS, over a same frequency (such as f1).

The TDD radio receiver physical layer unit is adapted to communicate with the data link layer unit of the TDD radio transceiver and wirelessly with the radio transmitter physical layer unit of the BS or SS/MS, capable of communicating with the RS, over a same frequency (such as f1).

The TDD radio transceiver data link layer unit is adapted to perform a TDD radio transceiver data link layer processing on the data received from the TDD radio receiver physical layer unit, and forward the processed data to the TDD radio transmitter physical layer unit.

The SS/MS includes:

a TDD radio transceiver, adapted to communicate wirelessly with an RS or BS in a TDD manner over a same frequency (such as f1). The TDD radio transceiver includes a TDD radio transmitter physical layer unit, a TDD radio receiver physical layer unit, and a TDD radio transceiver data link layer unit.

The TDD radio transmitter physical layer unit is adapted to communicate with the data link layer unit of the TDD radio transceiver and wirelessly with the radio receiver physical layer unit of the RS or BS, capable of communicating with the SS/MS, over a same frequency (such as f1). In the simplified relay mode, the TDD radio transmitter physical layer unit employs, for the uplink random access timeslots (or referred to Contention Slots) of ULBS, such as initial ranging contention slots and bandwidth request contention slots, or initial access ranging, periodic ranging, bandwidth request of MS/SS, a channel encoding and modulation scheme (such as Binary Phase Shift Keying, BPSK) more reliable than that for other transmission data, or employs a higher transmission power than for other transmission data, over the ranging subchannel of ULBS. The MS/SS directly transmits the initial access ranging, periodic ranging, bandwidth request of MS/SS to the BS without the relay of RS.

The TDD radio receiver physical layer unit is adapted to communicate with the data link layer unit of the TDD radio transceiver and wirelessly with the radio transmitter physical layer unit of the RS or BS, capable of communicating with the SS/MS, over a same frequency (such as f1).

The TDD radio transceiver data link layer unit is adapted to perform a TDD radio transceiver data link layer processing on the data received from the TDD radio receiver physical layer unit or a user, and forward the processed data to the user of the SS/MS or the TDD radio transmitter physical layer unit.

As can be seen in FIG. 11, each of the TDD radio transmitter physical layer units in the BS, RS and SS/MS is provided with a communication interface(s) for communication with the TDD radio receiver physical layer units of other entities, and each of the TDD receiver physical layer units is provided with a communication interface(s) for communication with the TDD radio transmitter physical layer units of other entities.

Referring to FIG. 10, the downlink sub-frame header broadcast, such as Preamble, Frame Control Header (FCH), Downlink Map (DL-MAP), and Uplink Map (UL-MAP), is directly transmitted by the BS to the MS/SS, without the relay of the RS. The initial access ranging, periodic ranging, bandwidth request of MS/SS are directly transmitted by the MS/SS to the BS via the ranging subchannel, without the relay of the RS.

Other downlink bursts of DLBS, such as data packets or message packets except for DL-MAP and UL-MAP, need the relay of the RS, and can not be directly transmitted by the BS to the MS/SS. Other uplink bursts of ULBS, except for the initial access ranging, periodic ranging, and bandwidth request of MS/SS, need the relay of the RS, and can not be directly transmitted by the MS/SS to the BS.

Based on the above sub-frames, the BS may communicate with the RS, and thereby communicate with the SS/MS by the relay of the RS. In addition, the information transmitted by the SS/MS to the BS may also be relayed by the RS, thereby extending the coverage of the wireless communication system.

Furthermore, in the implementation of the invention, the inter-interference as shown in the 4 cases of FIG. 3 (a)-(d) due to the co-frequency communication of the TDD network system is required to be taken into account.

According to the above requirements for relay communication, corresponding physical layer frame structures need to be defined so that the relay communication function of the RS is enabled by disposing the RS to be located between the BS and SS/MS. In addition, an appropriate definition of the frame structures according to the requirements for relay communication is required, so as to ensure the communication reliability. An appropriate definition of the physical layer frame structures of BS and RS is a guarantee enabling the relay communication based on the relay, and may effectively prevent the possible interference generated during communication.

As can be seen, the definition of the physical layer frame structures of BS and RS is very critical to the implementation of the relay communication based on RS. Hereinafter the definition of frame structures according to the requirements for transport frames in the relay communication of BS and RS is described.

To implement the communication between BS and SS/MS through the relay via RS, the physical layer uplink and downlink frame structures of BS and RS is firstly defined as follows:

1. In the downlink sub-frame DLBS of the physical layer frame structure of BS, TDM technology is employed, a downlink relay zone DL Relay Zone is arranged to define the combination(s) of OFDMA symbols and BS downlink relay subchannels transferred by BS to RS.

In the case of multiple RSs, the multiple RSs share the DL Relay Zone through different combinations of OFDMA symbols and BS downlink relay subchannels.

2. In the uplink sub-frame ULRS of the physical layer frame structure of RS, TDM technology is employed, a downlink relay zone DL Relay Zone is arranged to define the combination(s) of OFDMA symbols and BS downlink relay subchannels in the DL Relay Zone received from BS by RS.

In the case of multiple RSs, the multiple RSs share the DL Relay Zone through different combinations of OFDMA symbols and BS downlink relay subchannels. Each of RSs receives the BS data to be relayed based on only the corresponding combination of OFDMA symbols and BS downlink relay subchannel of the DL Relay Zone, and does not receive based on other combination(s) of OFDMA symbols and BS downlink relay subchannels.

3. In the uplink sub-frame ULBS of the physical layer frame structure of BS, TDM technology is employed, an uplink relay zone UL Relay Zone is arranged to define the combination(s) of OFDMA symbols and BS uplink relay subchannels from RS to BS.

In the case of multiple RSs, the multiple RSs share the DL Relay Zone through different combinations of OFDMA symbols and BS uplink relay subchannels.

4. In the downlink sub-frame DLRS of the physical layer frame structure of RS, TDM technology is employed, an uplink relay zone UL Relay Zone is arranged to define the combination(s) of OFDMA symbols and BS uplink relay subchannels in the UL Relay Zone from RS to BS.

In the case of multiple RSs, the multiple RSs share the UL Relay Zone through different combinations of OFDMA symbols and subchannels. Each of RSs receives the BS data to be relayed in only the corresponding combination of OFDMA symbols and subchannel of the UL Relay Zone, and does not receive other combination(s) of OFDMA symbols and subchannels.

It should be noted that during the time periods corresponding to the DL Relay Zone and UL Relay Zone of BS, SS/MSBS and SS/MSRS do not transmit or receive any combination of OFDMA symbols and subchannel, to prevent the interference from the SS/MSBS and SS/MSRS to the BS.

In the invention, to exchange broadcast service information between BS and RS, the relay zones in the frame structures of BS and RS are further defined as follows:

1. A downlink relay broadcast subchannel DL Relay Broadcast Subchannel is arranged in the downlink sub-frame DLBS of the physical layer frame structure of BS, to define the combination(s) of OFDMA symbols and downlink subchannels for broadcast from BS to RS, during which the Downlink Channel Descriptor (DCD), Uplink Channel Descriptor (UCD), Fast Power Control (FPC), and Clock Compare (CLK_CMP) broadcast messages defined in the 802.16 standard are broadcasted.

2. A downlink relay broadcast subchannel DL Relay Broadcast Subchannel is arranged in the uplink sub-frame ULRS of the physical layer frame structure of RS, to define the combination(s) of OFDMA symbols and RS uplink sub-channels for receiving during BS downlink relay broadcast timeslot(s), so as to receive the broadcasted DCD, UCD, FPC, and CLK_CMP broadcast messages defined in the 802.16 standard.

To facilitate the SS/MSS to access the BS, the relay zones in the frame structures of BS and RS need to be further defined as follows:

1. A Relay Ranging Subchannel (RRS) is arranged in the UL Relay Zone of the uplink sub-frame ULBS of the physical layer frame structure of BS, to define the combination(s) of OFDMA symbols and BS relay ranging receiving subchannel for the initial access ranging, periodic ranging, and bandwidth request of RS. The relay ranging subchannel (RRS) may be used as the ranging subchannel for the initial access ranging, periodic ranging, bandwidth request of SS/MSSBS.

2. A Relay Ranging TX Subchannel (RRS TX) is arranged in the DL Relay Zone of the downlink sub-frame DLRS of the physical layer frame structure of RS, to define the combination(s) of OFDMA symbols and RS relay ranging transmitting subchannel for the initial access ranging, periodic ranging, and bandwidth request of RS.

The Relay Ranging Subchannel of BS has a one-to-one correspondence in frequency and time with the Relay Ranging TX Subchannel of RS, and is in rigorous synchronization with the Relay Ranging TX Subchannel of RS.

In a downlink sub-frame of the physical layer frame structure of BS or RS, the BS shares the remaining part of the downlink sub-frame, except for the DL Header, DL Relay Zone of BS and UL Relay Zone of RS, by different combinations of OFDMA symbols and subchannels with different RSs, to prevent the interference from RS to SS/MSRS, the interference from RS to SS/MSBS, and the interference from BS to SS/MSRS.

In an uplink sub-frame of the physical layer frame structure of BS or RS, the BS shares the remaining part of the uplink sub-frame, except for the DL Header RX, DL Relay Zone of BS and UL Relay Zone of RS, through different combinations of OFDMA symbols and subchannels with different RSs, to prevent the interference from SS/MSRS to RS, the interference from SS/MSBS to RS, and the interference from SS/MSRS to BS.

In the invention, to implement the relay communication based on RS, the physical layer frame structures of BS and RS may be further defined as follows:

1. A downlink header DL Header is arranged in downlink sub-frame DLBS of the physical layer frame structure of BS, as the beginning of the downlink sub-frame, to define the combination(s) of OFDMA symbols and subchannels for transmitting subscriber synchronization information, and the combination(s) of OFDMA symbols and subchannels for transmitting indication information, indicating the positions and utilization method (i.e. profile) of the combinations of OFDMA symbols and subchannels of uplink and downlink frames of the physical layer frame structure of BS, and containing the preamble, FCH, DL-MAP, and UL-MAP of the existing 802.16 OFDMA (or SOFDMA) frame. The SS/MSBS, RS and BS keep frame synchronization with each other in transmission and reception.

2. A downlink header DL Header is arranged in downlink sub-frame DLRS of the physical layer frame structure of RS, as the beginning of the downlink sub-frame, to define the combination(s) of OFDMA symbols and subchannels for transmitting subscriber synchronization information, and the combination(s) of OFDMA symbols and subchannels for transmitting indication information, indicating the positions and utilization method (i.e. profile) of the combinations of OFDMA symbols and subchannels of uplink and downlink frames of the physical layer frame structure of BS, and containing the preamble, FCH, DL-MAP, and UL-MAP of the existing 802.16 OFDMA (or SOFDMA) frame. The SS/MSBS and RS keep frame synchronization with each other in transmission and reception.

The DL Header of RS is applied to only the advanced relay mode as shown in FIG. 4, and lags behind the DL Header of BS in time. During the period of the DL Header of an RS, no combination of OFDMA symbols and transmitting subchannels may be arranged in the downlink sub-frame (DLBS) of BS, to prevent the interference from BS to SS/MSRS.

During the period of the DL Header of an RS, no combination of OFDMA symbols and transmitting subchannels may be arranged in the downlink sub-frames DLRS of other RSs, to prevent the interference from RS to SS/MSRS. In special cases that the DL Headers of different RSs are overlapped in time, the DL Headers of the different RSs are required to be overlapped entirely, be rigorously synchronized with each other, and contain the same contents, so as to prevent the interference from RS to SS/MSRS.

3. A downlink header receipt DL Header RX is arranged in uplink sub-frame ULRS of the physical layer frame structure of RS, to define the combination(s) of OFDMA symbols and subchannels to receive the DL Header of BS.

In the above frame structures, the DL Header of BS has a one-to-one correspondence in frequency and time with the DL Header RX of RS, and is in rigorous synchronization with the DL Header RX of RS.

In the invention, to implement the relay communication based on RS, the physical layer frame structures of BS and RS may be further defined as follows:

1. A Ranging Subchannel is arranged in uplink sub-frame ULBS of the physical layer frame structure of BS, to define the combination(s) of OFDMA symbols and BS ranging sub-channels for transmitting the initial access ranging, periodic ranging, and bandwidth request of SS/MSSBS.

2. A Ranging Subchannel is arranged in uplink sub-frame ULRS of the physical layer frame structure of RS, to define the combination(s) of OFDMA symbols and RS ranging sub-channels for transmitting the initial access ranging, periodic ranging, and bandwidth request of SS/MSSRS.

In the above frame structures, except for the DL Relay Zone and UL Relay Zone, the downlink sub-frame of BS may not be overlapped with the uplink sub-frame of RS, and the uplink sub-frame of BS may not be overlapped with the downlink sub-frame of RS, to prevent the interference from SS/MSBS to SS/MSRS, the interference from SS/MSRS to SS/MSBS, the interference from BS to RS, and the interference from RS to BS.

In addition, a time interval having a length of at least a TTG (Transmit/Receive Transition GAP) is reserved from the downlink sub-frame DLBS of BS to the uplink sub-frame ULBS of BS. A time interval having a length of at least an RTG (Receive/Transmit Transition GAP) is reserved from the uplink sub-frame ULBS of BS to the downlink sub-frame DLBS of BS. A time interval having a length of at least a TTG (Transmit/Receive Transition GAP) is reserved from the downlink sub-frame DLRS of RS to the uplink sub-frame ULRS of RS. A time interval having a length of at least an RTG (Receive/Transmit Transition GAP) is reserved from the uplink sub-frame ULRS of RS to the downlink sub-frame DLRS of RS. In the simplified mode, during the TTG of BS, RS may not arrange any combination of OFDMA symbols and transmitting subchannels. During the RTG of BS, RS may not arrange any combination of OFDMA symbols and receiving subchannels.

Moreover, except for the DL Header and Ranging Subchannel, the above defined combination of OFDMA symbols and subchannels are not necessarily to be included in each frame.

In an OFDMA or SOFDMA system, a BS, an RS and an SS/MSS communicate with each other based on the above defined frame structures. In this way, the relay communication is implemented, a good communication effect as well as various requirements for the relay communication are ensured.

The particular implementations of the invention are described below in conjunction with particular application examples, to make the invention better understood.

Figure 12:
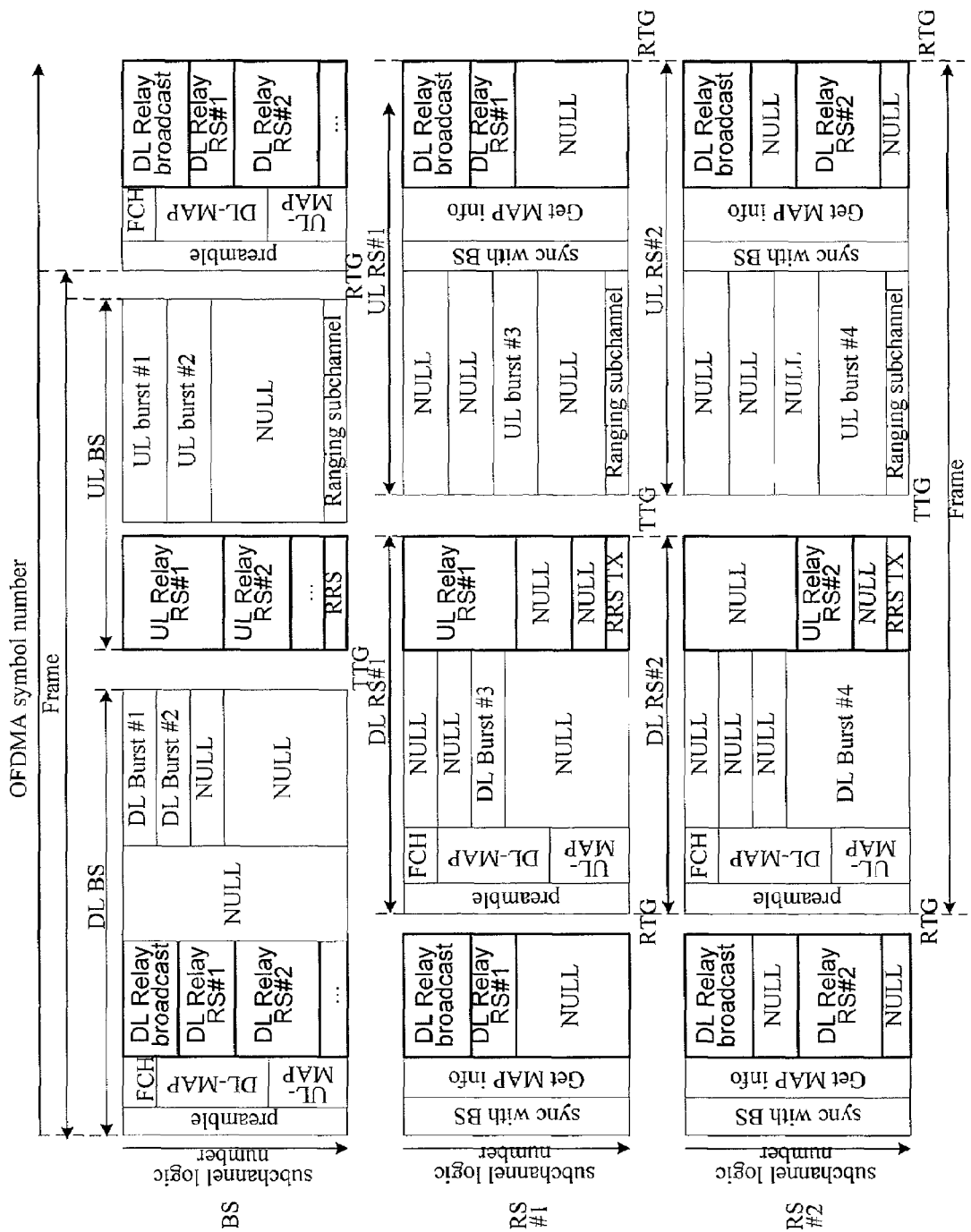
FIG. 12 is a first schematic diagram illustrating the physical layer frame structure of a BS and an RS in a second application scenario.
Figure 13:
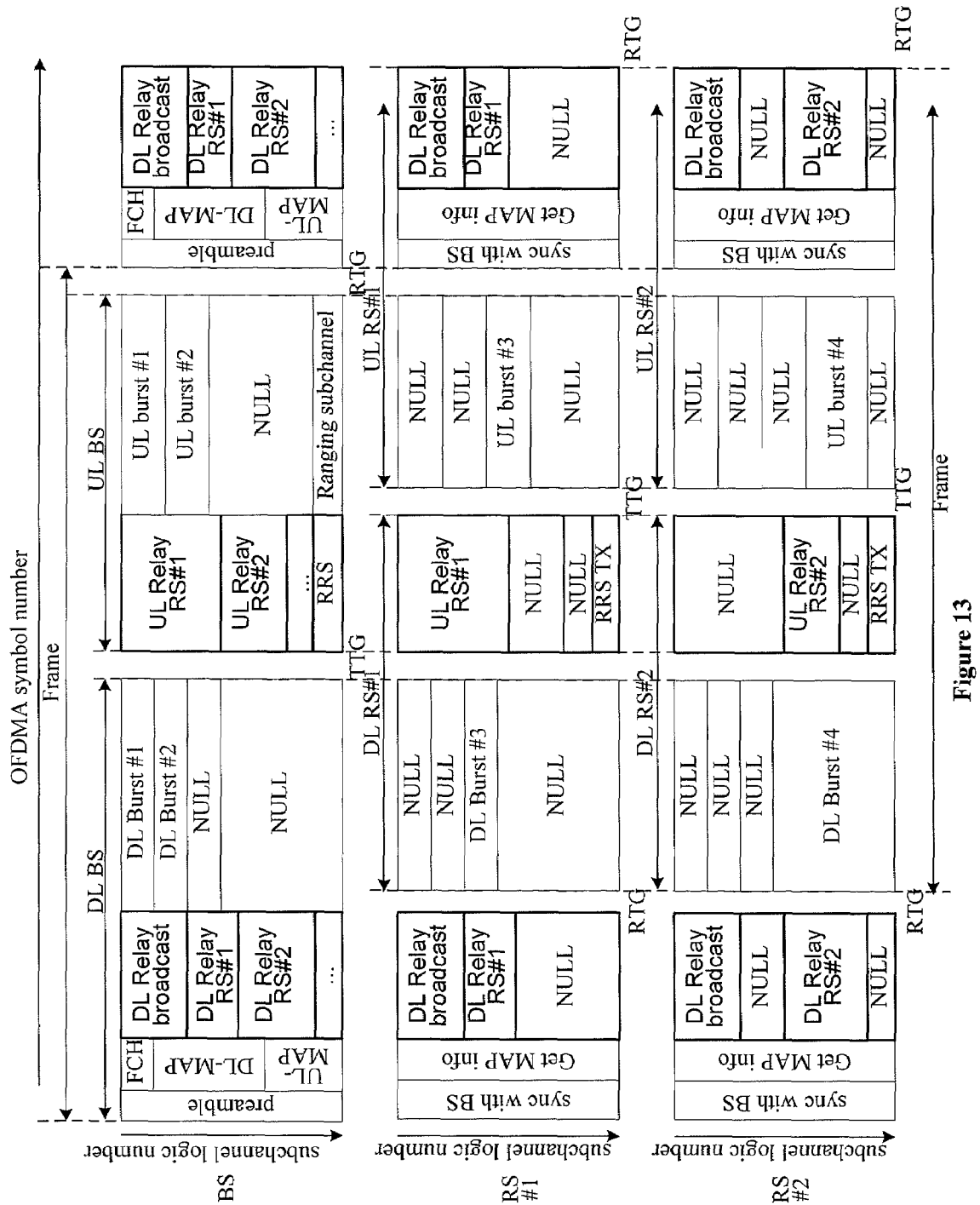
FIG. 13 is a second schematic diagram illustrating the physical layer frame structure of a BS and an RS in the second application scenario.

FIG. 12 and FIG. 13 illustrate a first embodiment of the physical layer frame structures of BS and RS according to the invention, in which FIG. 12 shows a schematic diagram of an advanced relay mode, and FIG. 13 shows a schematic diagram of a simplified relay mode.

In the Figures, the NULL or blank portions represent the parts in which no reception or transmission is arranged. In FIGS. 12 and 13, the Preamble, and DL-MAP, UL-MAP zones of BS are the DL Header of the downlink sub-frame DLBS of BS and the downlink sub-frame DLRS of RS, and the Preamble, and DL-MAP, UL-MAP zones of RS are the DL Header RX of the uplink sub-frame ULRS of RS.

The DL Relay Zone (i.e. DL Relay broadcast, DL Relay R#1, #2, . . . ) of BS is arranged to follow the DL Header of the downlink sub-frame DLBS of BS. The UL Relay Zone (i.e. UL Relay R#1, #2, . . . , and RRS TX) of BS is arranged at the beginning of the uplink sub-frame ULBS of BS. During the time periods corresponding to the DL Relay Zone and UL Relay Zone of BS, an MS does not arrange any combination of OFDMA symbols and receiving or transmitting subchannels.

In the simplified relay mode, during the TTG of BS, an RS may not arrange any combination of OFDMA symbols and transmitting subchannels. During the RTG of BS, an RS may not arrange any combination of OFDMA symbols and receiving subchannels.

PHY bursts are allocated with a set of adjacent subchannels and a set of OFDMA symbols. The BS and different RSs share the remaining portion of the downlink sub-frame by different combinations of OFDMA symbols and subchannels.

Figure 14:
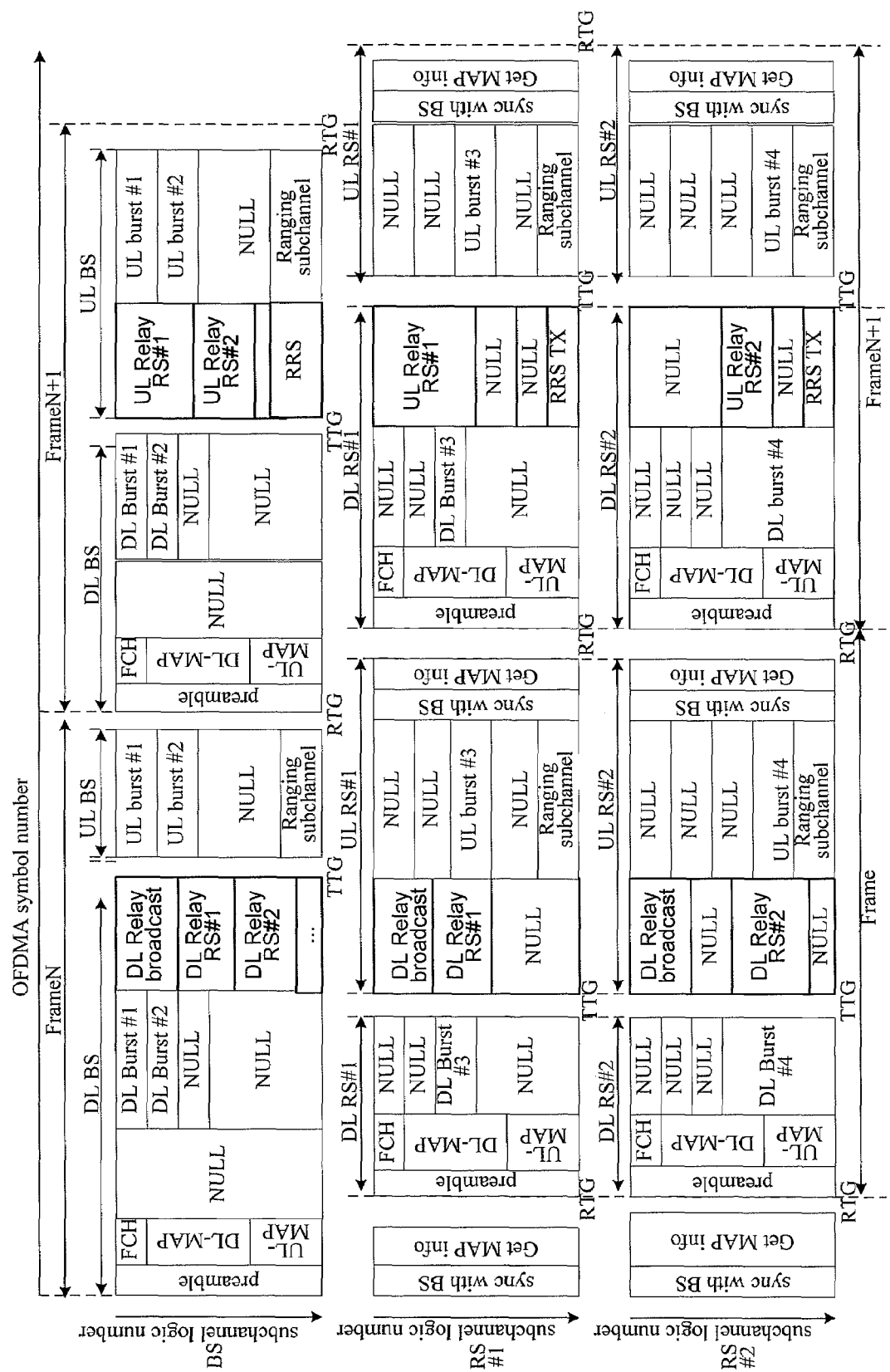
FIG. 14 is a third schematic diagram illustrating the physical layer frame structure of a BS and an RS in the second application scenario.
Figure 15:
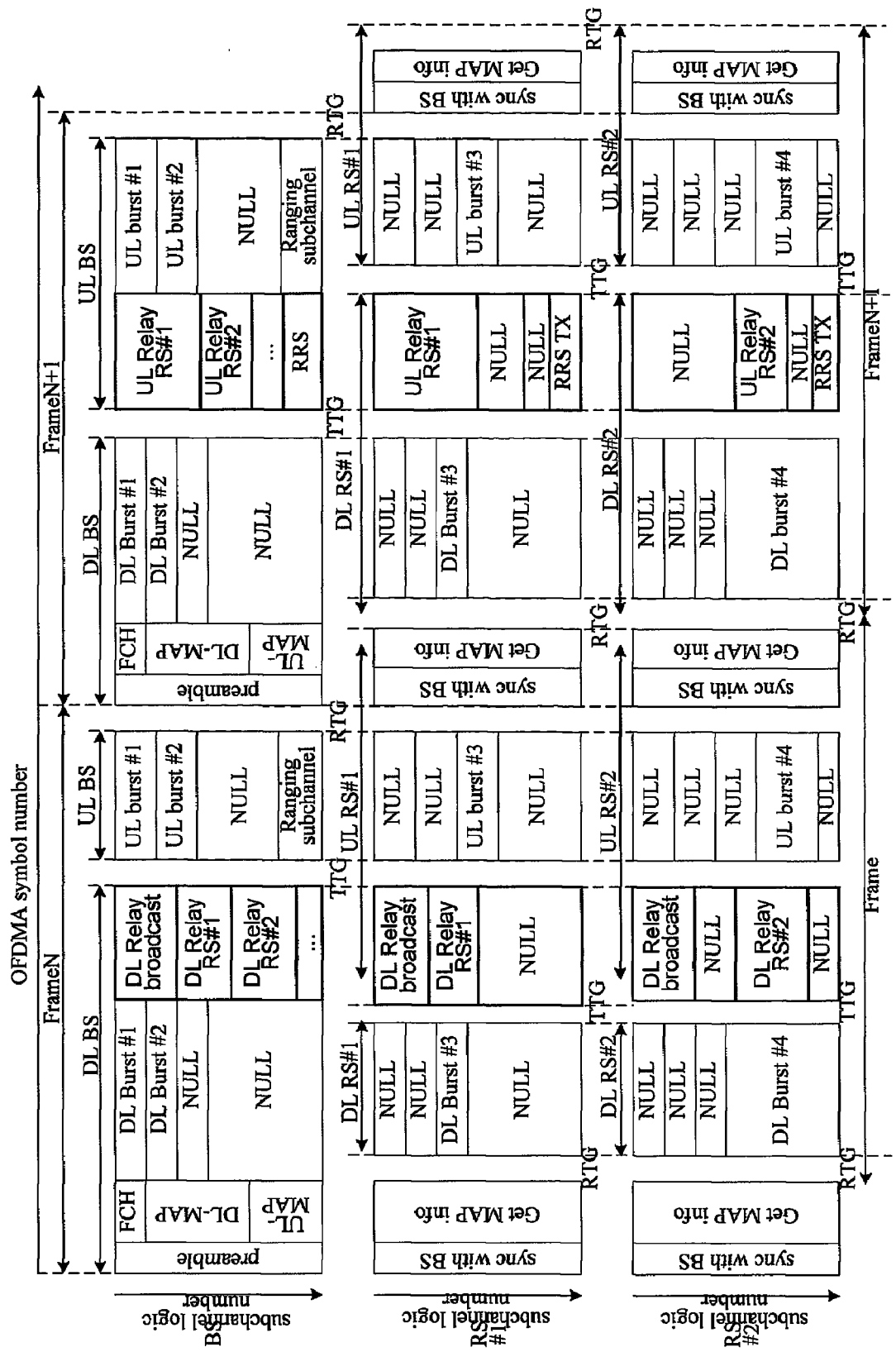
FIG. 15 is a fourth schematic diagram illustrating the physical layer frame structure of a BS and an RS in the second application scenario.

FIGS. 14 and 15 illustrate another embodiment of the physical layer frame structures of BS and RS according to the invention, in which FIG. 14 illustrates the physical layer frame structures in an advanced relay mode, and FIG. 15 illustrates the physical layer frame structures in a simplified relay mode.

The RRS of BS and the RRS TX of RS appears once every two frames, for example, at the downlink sub-frames DLRS of Frame N−1, Frame N+1, Frame N+3, . . . , etc.

The DL Relay Zone of the BS and the UL Relay Zone of BS may be arranged in different frames. For example, the DL Relay Zone of BS may be arranged at the end of the downlink sub-frame DLBS of FrameN, and the DL Relay Zone of RS may be arranged at the beginning of the uplink sub-frame ULRS of FrameN. The UL Relay Zone of BS may be arranged at the beginning of the uplink sub-frame ULBS of FrameN+1, and the UL Relay Zone of RS may be arranged at the end of the downlink sub-frame DLRS of FrameN+1. During the time periods corresponding to the DL Relay Zone and UL Relay Zone of BS, an MS does not arrange any combination of OFDMA symbols and receiving or transmitting subchannels.

In the simplified relay mode, during the TTG of BS, an RS may not arrange any combination of OFDMA symbols and transmitting subchannels. During the RTG of BS, an RS may not arrange any combination of OFDMA symbols and receiving subchannels.

Particular application examples of communication process are described below to make the invention better understood.

The relay process according to the invention is as follows:
(I) Downlink Relay

The downlink relay may be divided into two phases. The first phase of downlink relay includes a communication process from BS to RS, and the second phase of downlink relay includes a communication process from RS to SS/MS. In the first phase of downlink relay, the relay processes in the advanced relay mode and the simplified relay mode as shown in FIGS. 4, 10, and 11 are the same. In the second phase of downlink relay, the relay processing in the advanced relay mode is different from that in the simplified relay mode.

The processing of the first phase (BS→RS) of downlink relay includes:

1. BS transmits preamble in the first symbol or timeslot in the "DL Header" of the downlink sub-frame DLBS.

2. RS #1 receives the preamble in the "DL Header" of the downlink sub-frame DLBS of BS based on the "DL Header RX" of the uplink sub-frame ULRS of RS, to keep synchronized with BS.

3. BS transmits FCH, DL-MAP, and UL-MAP after transmitting the preamble in "DL Header" of the downlink sub-frame DLBS.

4. RS#1 receives the FCH, DL-MAP, and UL-MAP in "DL Header" of the downlink sub-frame DLBS based on the "DL Header RX" of the uplink sub-frame ULRS of RS, to obtain the information about positions and utilization methods (profile) of OFDMA symbols and/or subchannels, timeslots of the uplink and downlink bursts of BS.

5. BS transmits a broadcast message(s) in the "DL Relay broadcast" of the "DL Relay Zone" in the downlink sub-frame DLBS of BS.

6. BS transmits downlink relay communication data, i.e. traffic data, to RS#1 in the "DL Relay RS#1" of the "DL Relay Zone" in the downlink sub-frame DLBS of BS.

7. RS#1 receives the broadcast message in the "DL Relay broadcast" of the "DL Relay Zone" of the downlink sub-frame DLBS of BS, based on the "DL RB" in the uplink sub-frame ULRS of RS. The broadcast message may include a message to be relayed by RS#1.

8. RS#1 receives the downlink relay communication data, i.e. the traffic data, in the "DL Relay RS#1" of the "DL Relay Zone" in the downlink sub-frame DLBS of BS in the "DL Relay Zone" of the uplink sub-frame ULRS of RS.

The second phase (RS→MS/SS) of downlink relay includes:

(1) processing in the advanced relay mode

1. RS#1 transmits preamble in the first symbol or timeslot of the "DL Header" of the downlink sub-frame DLRS.

2. MS/SS receives the preamble in the "DL Header" of the downlink sub-frame DLRS of RS#1, to keep synchronized with RS#1.

3. RS#1 transmits FCH, DL-MAP, and UL-MAP after transmitting the preamble in "DL Header" of the downlink sub-frame DLRS (the FCH, DL-MAP, and UL-MAP may be transmitted by BS to RS#1 in the step 4 of the first phase).

4. MS/SS receives the FCH, DL-MAP, and UL-MAP transmitted in "DL Header" of the downlink sub-frame DLRS, to obtain the information about positions and utilization methods (profile) of OFDMA symbols and/or subchannels, timeslots of the uplink and downlink bursts of RS#1.

5. RS#1 transmits the downlink relay communication data, i.e. the traffic data (which is transmitted to RS#1 by BS in step 6 of the first phase), to MS/SS, in the time-frequency zone(s), except for the DL Header and DL Relay Zone, in the downlink sub-frame DLRS.

6. MS/SS receives the downlink relay communication data, i.e. the traffic data, transmitted in the downlink sub-frame DLRS of RS#1 in the corresponding time-frequency zone(s).

(2) Processing in the Simplified Relay Mode

1. MS/SS receives the preamble in the "DL Header" of the downlink sub-frame DLBS of BS, to keep synchronized with BS.

2. MS/SS receives the FCH, DL-MAP, and UL-MAP in "DL Header" of the downlink sub-frame DLBS of BS, to obtain the information about positions and utilization methods (profile) of OFDMA symbols and/or subchannels, timeslots of the uplink and downlink bursts of BS and RS#1.

3. RS#1 transmits the downlink relay communication data, i.e. the traffic data (which is transmitted to RS#1 by BS in step 6 of the first phase), to MS/SS, in the time-frequency zone(s) of the downlink sub-frame DLRS except for the DL Header and DL Relay Zone.

4. MS/SS receives the downlink relay communication data, i.e. the traffic data, transmitted in the corresponding time-frequency zone(s) of the downlink sub-frame DLRS of RS#1.

(II) Uplink Relay

Similarly, the uplink relay may be also divided into two phases. The first phase of uplink relay includes a communication process from SS/MS to RS, and the second phase of uplink relay includes a communication process from RS to BS. In the first phase of uplink relay, the relay processes in the advanced relay mode and the simplified relay mode as shown in FIGS. 3-5 are different from each other. In the second phase of uplink relay, the relay process in the advanced relay mode is the same as that in the simplified relay mode.

The processing of the first phase of the uplink relay (MS/SS→RS) includes:

(1) Processing in the Advanced Relay Mode

1. MS/SS receives the FCH, DL-MAP, and UL-MAP in "DL Header" of the downlink sub-frame DLRS, to obtain the information about positions and utilization methods (profile) of OFDMA symbols and/or subchannels, timeslots of the uplink and downlink bursts of RS#1.

2. MS/SS transmits uplink communication data, i.e. the traffic data, to RS#1, in timeslot(s) of the uplink sub-frame ULRS of RS except for the DL Header RX and UL Relay Zone.

3. RS#1 receives the uplink communication data, i.e. the traffic data, in the corresponding timeslot(s) of the uplink sub-frame ULRS.

(2) Processing in the Simplified Relay Mode

1. MS/SS receives the FCH, DL-MAP, and UL-MAP in "DL Header" of the downlink sub-frame DLBS of BS, to obtain the information about positions and utilization methods (profile) of OFDMA symbols and/or subchannels, timeslots of the uplink and downlink bursts of BS and RS#1.

2. MS/SS transmits uplink communication data, i.e. the traffic data, to RS#1, in timeslot(s) of the uplink sub-frame ULRS of RS except for the DL Header RX and UL Relay Zone.

3. RS#1 receives the uplink communication data, i.e. the traffic data, in the corresponding timeslot(s) of the uplink sub-frame ULRS.

The second phase of the uplink relay (RS→BS) includes:

1. RS#1 receives the FCH, DL-MAP, and UL-MAP in "DL Header" of the downlink sub-frame DLBS, to obtain the information about positions and utilization methods (profile) of OFDMA symbols and/or subchannels, timeslots of the uplink and downlink bursts of BS.

2. RS#1 transmits the uplink communication data, i.e. the traffic data (which is transmitted to RS#1 by MS/SS in step 2 of the first phase of uplink relay), to BS, in "UL Relay RS#1" of "UL Relay Zone" of the downlink sub-frame DLRS of RS.

3. BS receives the uplink communication data, i.e. the traffic data transmitted in step 2 of the second phase, in "UL Relay RS#1" of "UL Relay Zone" of the uplink sub-frame ULBS of BS.

The Third Application Scenario: each RS contains two TDM/TDMA-FDD radio transceivers corresponding to BS and MS respectively, and the RS transfers information in relay timeslots.

Figure 16:
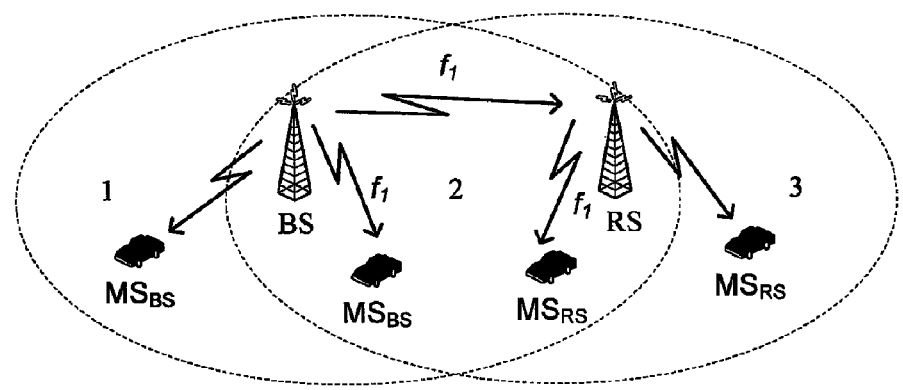
FIG. 16 is a schematic diagram illustrating a model of a downlink communication system including an RS, a BS and MSs/SSs in the case of a single RS.
Figure 17:
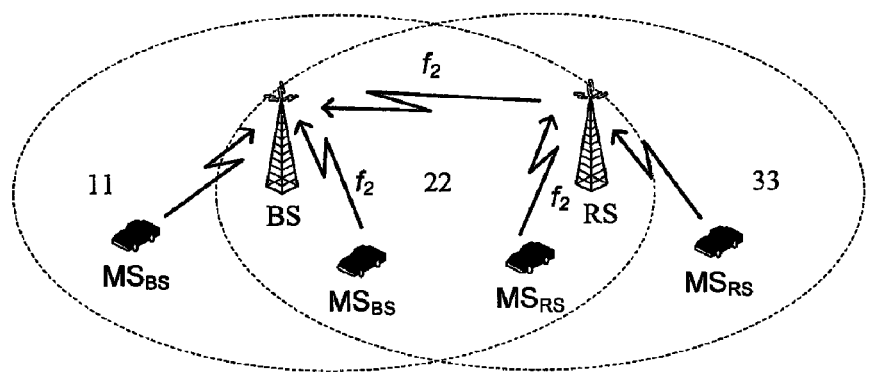
FIG. 17 is a schematic diagram illustrating a model of an uplink communication system including an RS, a BS and MSs/SSs in the case of a single RS.

FIGS. 16, 17 and 2 illustrate a communication system model containing RS, BS, and MS/SS. FIG. 16 illustrates the case of single RS for downlink, FIG. 17 illustrates the case of single RS for uplink, and FIG. 2 illustrates the case of multiple RSs. In the communication system model, Time Division Multiplexing (TDM)/Time Division Multiple Access (TDMA)—Frequency Division Duplex (FDD) technology is employed to implement communication between an RS, a BS and an MS/SS. The BS and RS employ a frequency f2 for downlink communication, and a frequency f1 for uplink communication, so as to implement Frequency Division Duplex (FDD). The RS accesses the BS as an MS/SS. In an advanced relay mode, an MS/SS accesses a BS through the wireless relay of an RS. In the FDD mode, there may be interferences as shown in the four cases illustrated in FIGS. 18(*a*)-(*d*) in the network system communication. In the FIGS. 18(*a*)-(*d*), TX represents a transmitting module, and RX represents a receiving module.

For convenience in description, in FIGS. 2, 16 and 17, the coverage of a BS is divided into 3 regions including:

Region 1: downlink covered by only the BS, in which there is no interference from an RS to an MS/SS (e.g. an MSBS in FIG. 16) of the BS;

Region 2: downlink covered by both of the BS and an RS, in which there are interference from the RS to an MSBS and the interference from the BS to an MSRS;

Region 3, downlink covered by only an RS, in which there is no interference from the BS to an MS/SS (e.g. an MSRS in FIG. 16) of the RS.

In FIG. 4, the overlapped region covered by both the BS and RS1 is the region 2 of RS1, and the overlapped region covered by both the BS and BS2 is the region 2 of RS2.

The coverage of an RS may be also divided into 3 regions including:

Region 11: uplink covered by only a BS, in which there is no interference from an MS/SS to the BS;

Region 22: uplink covered by both of the BS and the RS, in which there are interference from an MSBS to the RS and the interference from an MSRS to the BS;

Region 33, uplink covered by only an RS, in which there is no interference from an MSRS to the RS.

In FIG. 2, the overlapped region covered by both the BS and RS1 is the region 22 of RS1, and the overlapped region covered by both the BS and BS2 is the region 22 of RS2.

The relay communication system according to the invention is described below in conjunction with the drawings. In the invention, the relay communication system may be classified into advanced relay communication mode system and simplified relay communication mode system.

Figure 19:
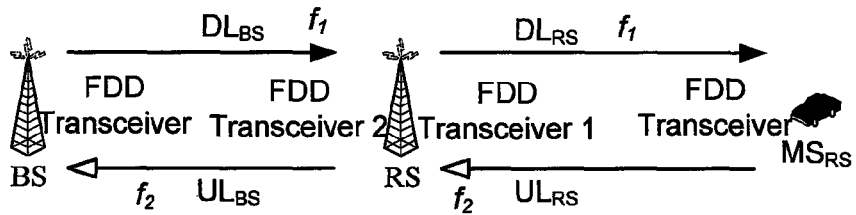
FIG. 19 is a schematic diagram illustrating an advanced relay communication mode of a BS and an RS.

FIG. 19 illustrates an advanced relay communication mode of RS, BS, and MS/SS according to the invention. In the advanced relay communication mode, a BS can not directly communicate with a subscriber station within the coverage of an RS. In FIG. 19, an RS has two sets of FDD radio transceivers. In the first set, the transmitter TX1 operates at a frequency f1, and the receiver RX1 operates at a frequency f2. In the second set, the transmitter TX2 operates at the frequency f2, and the receiver RX2 operates at the frequency f1. DLBS represents a downlink frame of the physical layer frame structure of BS, from BS to SS/MSBS (a subscriber station within the coverage of BS) or RS. ULBS represents an uplink frame of the physical layer frame structure of BS, from SS/MSBS or RS to BS, for which the SS/MSBS, and the second set of radio transceiver of the RS are required to keep frame synchronization with BS in transmission and reception. DLRS represents a downlink frame of the physical layer frame structure of RS, from RS to SS/MSRS (a subscriber station within the coverage of RS). ULRS represents an uplink frame of the physical layer frame structure of RS, from SS/MSRS to RS, for which the SS/MSRS, and the first set radio transceiver of the RS are required to keep frame synchronization with each other in transmission and reception.

In addition, in the system according to the invention, Orthogonal Frequency Division Multiplexing (OFDM) technology is employed to implement the relay communication between the BS, RS and SS/MS.

Figure 20:
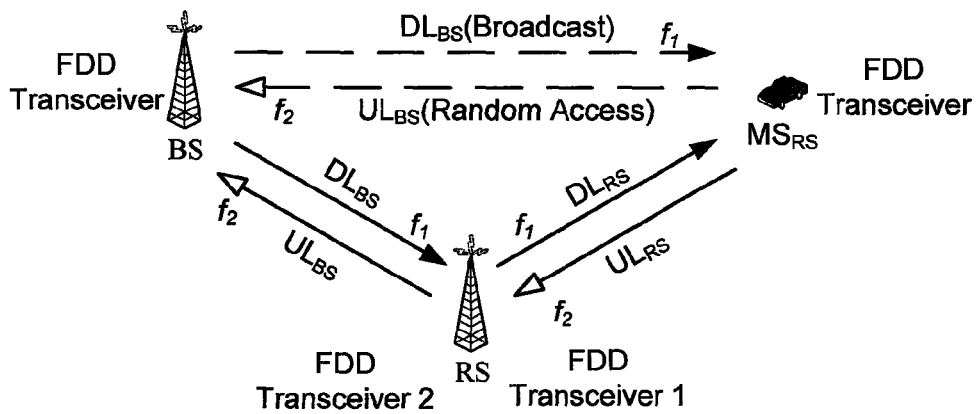
FIG. 20 is a schematic diagram illustrating a simplified relay communication mode of a BS and an RS.

FIG. 20 illustrates a simplified relay communication mode of RS, BS, and MS/SS. In the simplified relay communication mode, a BS may directly communicate with a subscriber station (i.e. an SS/MSRS) within the coverage of an RS. In FIG. 20, an RS has two sets of FDD radio transceivers. In the first set, the transmitter TX1 operates at a frequency f1, and the receiver RX1 operates at a frequency f2. In the second set, the transmitter TX2 operates at the frequency f2, and the receiver RX2 operates at the frequency f1. DLBS represents a downlink frame of the physical layer frame structure of BS, from BS to SS/MSBS or RS. ULBS represents an uplink frame of the physical layer frame structure of BS, from SS/MSBS or RS to BS, for which the SS/MSBS or SS/MSRS, and the second set radio transceiver of the RS are required to keep frame synchronization with BS in transmission and reception. DLRS represents a downlink frame of the physical layer frame structure of RS, from RS to SS/MSRS. ULRS represents an uplink frame of the physical layer frame structure of RS, from SS/MSRS to RS.

The downlink Broadcast Bursts of DLBS, such as Preamble, FCH, DL-MAP, and UL-MAP, are directly transmitted to MS/SSRS by BS, without the relay of RS. The uplink Random Access timeslots (or referred to as Contention Slots) of ULBS, such as initial ranging contention timeslot and bandwidth request contention timeslot, are directly transmitted to BS by MS/SS, without the relay of RS. Other downlink bursts of DLBS, such as data packets or message packets except for DL-MAP and UL-MAP, can not be directly transmitted to MS/SSRS by BS, but are required to be relayed by RS. Other uplink timeslots of ULBS, except for initial ranging contention timeslot and bandwidth request contention timeslot, can not be directly transmitted to BS by MS/SSRS, but are required to be relayed by RS.

The detailed structures of two relay communication systems according to the invention are described below.

Figure 21:
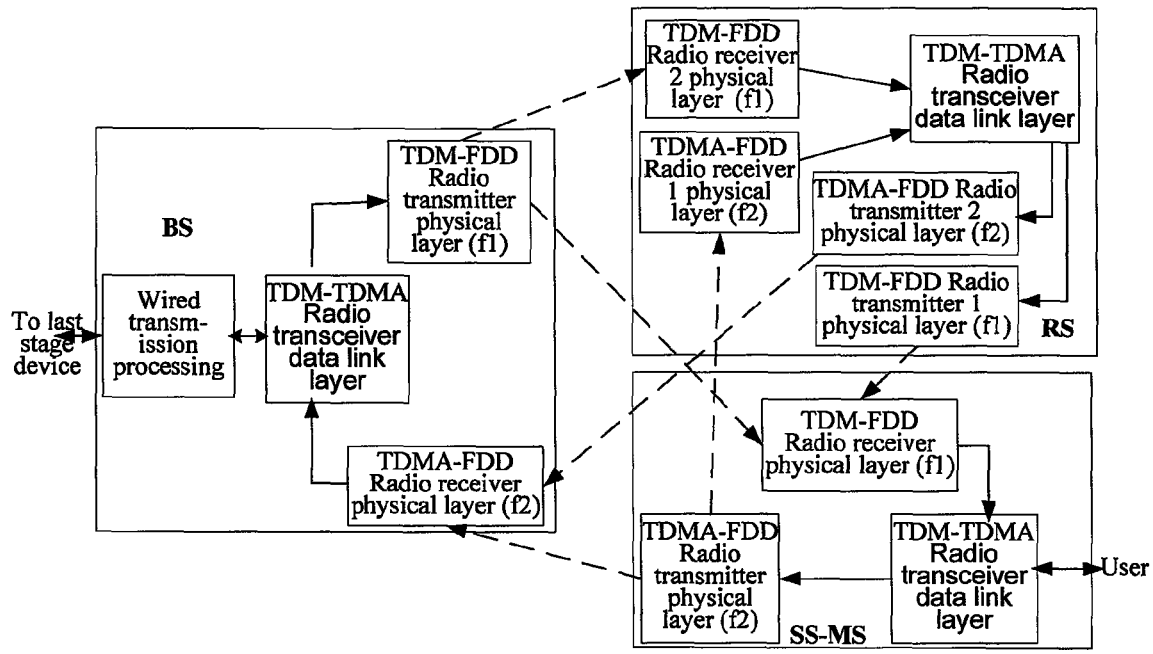
FIG. 21 is a schematic diagram illustrating the structure of a system in the case of a third application scenario according to the invention.

FIG. 21 shows a relay communication system including a BS, an RS, and an SS/MS according to the invention, which may employ two relay communication mode, i.e. an advanced relay mode and a simplified relay mode.

In the relay communication system, the BS includes:
a wired transmission processing unit, capable of establishing communication with an upper stage apparatus (such as a base station controller) or with a set of base stations, and exchanging information with the upper stage apparatus or the set of base stations;
a TDM/TDMA-FDD radio transceiver, adapted to communicate wirelessly with an RS or SS/MS in a TDM/TDMA-FDD manner. The TDM/TDMA-FDD radio transceiver includes a TDM-FDD radio transmitter physical layer unit, a TDMA-FDD radio receiver physical layer unit, and a TDM-TDMA radio transceiver data link layer unit.

The TDM-FDD radio transmitter physical layer unit is adapted to communicate with the data link layer of the TDM-TDMA radio transceiver and wirelessly with a physical layer unit of TDM-FDD radio receiver 1 of the RS capable of communicating with the BS or with the TDM-FDD radio receiver physical layer unit of SS/MS capable of communicating with the BS. In the simplified relay mode, the TDM-FDD radio transmitter physical layer unit employs, for the downlink sub-frame header broadcast of DLBS (such as Preamble, FCH, DL-MAP, UL-MAP), a channel encoding and modulation scheme (such as Binary Phase Shift Keying, BPSK) more reliable than that for other transmission data, or employs a higher transmission power than for other transmission data. The BS directly transmits the downlink sub-frame header broadcast of DLBS to the MS/SS without the relay of RS.

The TDMA-FDD radio receiver physical layer unit (frequency f2) is adapted to communicate with the data link layer of the TDMA-FDD radio transceiver and wirelessly with a physical layer unit of TDMA-FDD radio transmitter 1 of the RS capable of communicating with the BS or with a TDMA-FDD radio transmitter physical layer unit of SS/MS capable of communicating with the BS.

The TDM-TDMA radio transceiver data link layer unit is adapted to perform a TDM-TDMA radio transceiver data link layer processing on the data received from the TDMA-FDD radio receiver physical layer unit or the wired transmission processing unit, and forward the processed data to the wired transmission processing unit or the TDM-FDD radio transmitter physical layer unit.

As shown in FIG. 21, the RS includes:
TDM/TDMA-FDD radio transceivers 1 and 2, adapted to communicate wirelessly with a BS or SS/MS in a TDM/TDMA-FDD manner. The TDM/TDMA-FDD radio transceiver includes a physical layer unit of the TDM-FDD radio transmitter 1, a physical layer unit of the TDMA-FDD radio transmitter 2, a physical layer unit of TDMA-FDD radio receiver 1, a physical layer unit of TDM-FDD radio receiver 2, and a TDM-TDMA radio transceiver data link layer unit. The physical layer units of the TDM-FDD radio transmitter 1 and the TDMA-FDD radio receiver 1 constitute the first TDM/TDMA-FDD radio transceiver, i.e. the TDM/TDMA-FDD radio transceiver 1. The physical layer units of the TDMA-FDD radio transmitter 2 and the TDM-FDD radio receiver 2 constitute the second TDM/TDMA-FDD radio transceiver, i.e. the TDM/TDMA-FDD radio transceiver 2.

The physical layer unit of TDMA-FDD radio transmitter 2 (frequency f2), i.e. a second TDMA-FDD radio transmitter physical layer unit, is adapted to communicate wirelessly with the data link layer of the TDM-TDMA radio transceiver and with the TDMA-FDD radio receiver physical layer unit of the BS capable of communicating with the RS.

The physical layer unit of TDM-FDD radio transmitter 1 (frequency f1), i.e. a first TDM-FDD radio transmitter physical layer unit, is adapted to communicate with the data link layer of the TDM-TDMA radio transceiver and wirelessly with the TDM-FDD radio receiver physical layer unit of the SS/MS capable of communicating with the RS.

The physical layer unit of the TDM-FDD radio receiver 2 (frequency f1), i.e. a second TDM-FDD radio receiver physical layer unit, is adapted to communicate with the data link layer of the TDM-FDD radio transceiver and wirelessly with the TDM-FDD radio transmitter physical layer unit of the BS capable of communicating with the RS.

The physical layer unit of the TDMA-FDD radio receiver 1 (frequency f2), i.e. a first TDM-FDD radio receiver physical layer unit, is adapted to communicate with the data link layer of the TDM-FDD radio transceiver and wirelessly with the TDMA-FDD radio transmitter physical layer unit of the SS/MS capable of communicating with the RS.

The TDM-TDMA radio transceiver data link layer unit is adapted to perform a TDM-TDMA radio transceiver data link layer processing on the data received from the physical layer units of the TDMA-FDD radio receiver 1 and/or the TDM-FDD radio receiver 2, and forward the processed data to the physical layer unit of the TDM-FDD radio transmitter 1 and/or the physical layer unit of the TDMA-FDD radio transmitter 2.

As shown in FIG. 21, the SS/MS includes:

a TDM/TDMA-FDD radio transceiver, adapted to communicate wirelessly with an RS or BS in a TDM/TDMA-FDD manner. The TDM/TDMA-FDD radio transceiver includes a TDMA-FDD radio transmitter physical layer unit, a TDM-FDD radio receiver physical layer unit, and a TDM-TDMA radio transceiver data link layer unit.

The TDMA-FDD radio transmitter physical layer unit is adapted to communicate with the data link layer of the TDM-TDMA radio transceiver and wirelessly with the physical layer unit of the TDMA-FDD radio receiver 1 of the RS capable of communicating with the SS/MS or the TDMA-FDD radio receiver physical layer unit of the BS capable of communicating with the SS/MS. In the simplified relay mode, the TDMA-FDD radio transmitter physical layer unit employs, for the uplink random access timeslots (or referred to Contention Slots) of ULBS, such as initial ranging contention slots and bandwidth request contention slots, or initial access ranging, periodic ranging, bandwidth request of MS/SS, a channel encoding and modulation scheme (such as Binary Phase Shift Keying, BPSK) more reliable than that for other transmission data, or employs a higher transmission power than for other transmission data, over the ranging subchannel of ULBS. The MS/SS directly transmits the initial access ranging, periodic ranging, bandwidth request of MS/SS to the BS without the relay of RS.

The TDM-FDD radio receiver physical layer unit is adapted to communicate with the data link layer of the TDM-TDMA radio transceiver and wirelessly with the physical layer unit of the TDM-FDD radio transmitter 2 of the RS capable of communicating with the SS/MS or the TDM-FDD radio transmitter physical layer unit of BS capable of communicating with the SS/MS.

The TDM-TDMA radio transceiver data link layer unit is adapted to perform a TDM-TDMA radio transceiver data link layer processing on the data received from the TDM-FDD radio receiver physical layer unit or a user, and forward the processed data to the user of the SS/MS or the TDMA-FDD radio transmitter physical layer unit.

To ensure a reliable communication, the physical layer frame structures of BS and RS are required to be arranged, thereby implementing the relay communication in the wireless communication system based on the physical layer frame structures.

The particular frame format of the physical layer frame structures according to the invention is described below.

Firstly, to implement relay communication via RS, the physical layer frame structures of BS and RS are defined as follows:

1. A downlink relay zone, DL Relay Zone, is arranged in the downlink frame DLBS of frequency f1 in the physical layer frame structure of BS, to define BS downlink relay data timeslots for transmission from BS to RS.

2. A downlink relay zone, DL Relay Zone, is arranged in the physical layer frame structure of the second set radio receiver RX2 (frequency f1) of RS, to define relay data timeslots for the DL Relay Zone of the downlink frame DLBS from BS to RS.

3. An uplink relay zone, UL Relay Zone, is arranged in the uplink frame ULBS of frequency f2 in the physical layer frame structure of BS, to define BS uplink relay data timeslots for transmission from RS to BS.

4. An uplink relay zone, UL Relay Zone, is arranged in the physical layer frame structure of the second set radio transmitter TX2 (frequency f2) of RS, to define relay data timeslots for the UL Relay Zone of the uplink frame ULBS from RS to BS.

In addition, in the case of multiple RSs, the multiple RSs share the UL Relay Zone by TDM.

In the above physical layer frame structures, the timeslots of the DL Relay Zone of BS have a one-to-one correspondence with those of the DL Relay Zone of RS RX2, and the timeslots of the UL Relay Zone of BS have a one-to-one correspondence with those of the UL Relay Zone of RS TX2.

Furthermore, during the time period corresponding to the UL Relay Zone of BS, SS/MSBS or SS/MSRS may not arrange any transmitting timeslot, and RS may not arrange any receiving timeslot, so as to prevent the interference from SS/MSBS to RS and the interference from SS/MSRS to BS. During the time period corresponding to the DL Relay Zone of BS, RS may not arrange any transmitting timeslot, so as to prevent the interference from RS to RS.

In addition, to ensure the relay transferring of broadcast messages, the physical layer frame structures may be further defined as follows:

1. A downlink relay broadcast timeslot, i.e. DL Relay Broadcast Slot (DL RB), is arranged in the DL Relay Zone of the downlink sub-frame DLBS (frequency f1) of the physical layer frame structure of BS, to define the downlink timeslots broadcasted from BS to RS, in which the DCD, UCD, FPC, and CLK_CMP broadcast messages defined in the 802.16 standard are broadcasted.

2. A downlink relay broadcast receiving timeslot, i.e. DL Relay Broadcast RX Slot (DL RB RX), is arranged in the DL Relay Zone of the physical layer frame structure of the second set radio receiver RX2 (frequency f1) of RS, to define the uplink timeslots of RS for receiving in the downlink broadcast timeslots of BS, from which the DCD, UCD, FPC, and CLK_CMP broadcast messages defined in the 802.16 standard are received.

In the invention, the physical layer frame structures of BS and RS may be further defined as follows:

1. A downlink interference timeslot, i.e. DL Interference Slot, is arranged in the downlink frame DLBS (frequency f1) of the physical layer frame structure of BS, to define the BS downlink data timeslots of the downlink coverage of BS, i.e. "region 2".

In the case of multiple RSs as shown in FIG. 4, the multiple RSs share the DL Interference Slot by TDM, to prevent the interference from RS to SS/MSRS.

2. A downlink interference timeslot, i.e. DL Interference Slot, is arranged in the downlink frame DLRS of the physical layer frame structure of the first set radio transmitter TX1 (frequency f1) of RS, to define the RS downlink data timeslots of the downlink coverage of RS, i.e. "region 2".

In the case of multiple RSs as shown in FIG. 4, the multiple RSs share the DL Interference Slot by TDM, to prevent the interference from RS to SS/MSRS.

The DL Interference Slot of BS may not be overlapped with that of RS TX1 in timeslots, to prevent the interference from RS to SS/MSBS and the interference from BS to SS/MSRS.

In the invention, the physical layer frame structures of BS and RS may be further defined as follows:

1. A downlink header timeslot, i.e. DL Header Slot, is arranged in the downlink frame DLBS (frequency f1) of the physical layer frame structure of BS, defined as the beginning of the downlink timeslot, to define timeslots for transmitting user synchronization information and timeslots for transmitting indication information indicating the positions and utilization method (i.e. profile) of the timeslots of uplink and downlink frames of the physical layer frame structure of BS.

The synchronization information and indication information include the preamble, FCH burst, and one or more downlink Bursts of an existing 802.16 OFDM or SC (Single Carrier) frame. The downlink Burst is specified by DLFP (Downlink Frame Prefix) and subsequently follows FCH (Frame Control Header), and includes DL-MAP and UL-MAP. Furthermore, SS/MSBS, RS and BS keep frame synchronization with each other in transmission and reception.

2. In the advanced relay mode, a downlink header timeslot, i.e. DL Header Slot, is arranged in the downlink frame DLRS in the physical layer frame structure of the first set radio transmitter TX1 (frequency f1) of RS, defined as the beginning of the downlink timeslot, to define timeslots for transmitting user synchronization information and timeslots for transmitting indication information indicating the positions and utilization method (i.e. profile) of the timeslots of uplink and downlink frames of the physical layer frame structure of RS.

Similarly, the synchronization information and indication information include the preamble, FCH burst, and one or more downlink Bursts of an existing 802.16 OFDM or SC (Single Carrier) frame. The downlink Burst is specified by DLFP (Downlink Frame Prefix) and subsequently follows FCH, and includes DL-MAP and UL-MAP. Furthermore, SS/MSRS and RS keep frame synchronization with each other in transmission and reception.

In the advanced relay mode, the DL Header Slot of RS TX1 lags behind that of BS in time, and may not be overlapped with the DL Header Slot, DL Relay Zone and DL Interference Slot of the downlink frame DLBS in the physical layer frame structure of BS.

In the advanced relay mode, the DL Header Slot of an RS TX1 may not be overlapped with the DL Header Slot and DL Interference Slot of the downlink frames DLRSs in the physical layer frame structures of other RS TX1s, to prevent the interference from RS to SS/MSRS. Or, if the DL Header Slots of different RSs are overlapped in time, they are required to be overlapped with each other entirely, keep rigorously synchronized with each other, and contain the same contents, to prevent the interference from RS to SS/MSRS.

3. A downlink header receiving timeslot, i.e. DL Header RX Slot, is arranged in the physical layer frame structure of the second set radio receiver RX2 (frequency f1) of RS, to define timeslots for receiving the DL Header Slot of BS. The two sets of radio transceivers of an RS achieve frequency and/or symbol synchronization with the BS according to the preamble received in the DL Header RX Slot.

It should be noted that the DL Header Slot of BS and the DL Header RX Slot of RS are required to be overlapped entirely with each other and to be rigorously synchronized with each other.

In the invention, the physical layer frame structures of BS and RS may be further defined as follows:

1. An uplink interference timeslot, i.e. UL Interference Slot, is arranged in the uplink frame ULBS (frequency f2) in the physical layer frame structure of BS, to define the BS uplink data timeslots for the uplink coverage of BS, i.e. "region 22".

2. An uplink interference timeslot, i.e. UL Interference Slot, is arranged in the uplink frame ULRS in the physical layer frame structure of the first set radio receiver RX1 (frequency f2) of RS, to define the RS uplink data timeslots for the uplink coverage of RS, i.e. "region 22".

In the case of multiple RSs as shown in FIG. 4, the multiple RSs share the UL Interference Slot by TDM, to prevent the interference from RS to SS/MSRS.

The UL Interference Slot of BS may not be overlapped with that of RS RX1 in timeslots, to prevent the interference from SS/MSBS to RS and the interference from SS/MSRS to BS.

In the invention, the physical layer frame structures of BS and RS may be further defined as follows:

1. An uplink contention timeslot, i.e. UL Contention Slot, is arranged in the uplink frame ULBS (frequency f2) of the physical layer frame structure of BS. The UL Contention Slot includes the initial ranging contention timeslot and bandwidth request contention timeslot defined in an existing 802.16 OFDM (or SC) frame.

In addition, in the advanced relay mode, an uplink contention timeslot, i.e. UL Contention Slot, is also defined in the uplink frame ULRS in the physical layer frame structure of the first set radio receiver RX1 (frequency f2) of RS. Similarly, the UL Contention Slot of RS also includes the initial ranging contention timeslot and bandwidth request contention timeslot defined in an existing 802.16 OFDM (or SC) frame.

2. An uplink contention transmitting timeslot, i.e. UL Contention TX Slot, is arranged in the physical layer frame structure of the second set radio transmitter TX2 (frequency f2) of RS, to define the timeslots for contending for timeslots within the UL Contention Slot of BS.

The UL Contention Slot of BS and the UL Contention TX Slot of RS TX2 are required to be overlapped with each other entirely in time and frequency, and keep rigorously synchronized with each other. The UL Contention TX Slot of RS TX2 may not be overlapped with the uplink relay zone and the uplink interference timeslot of the uplink frame of BS.

In the above defined physical layer frame structures, the above defined Slots or Zones are not necessarily included in each frame, except for the DL Header Slot and UL Contention Slot.

Figure 22:
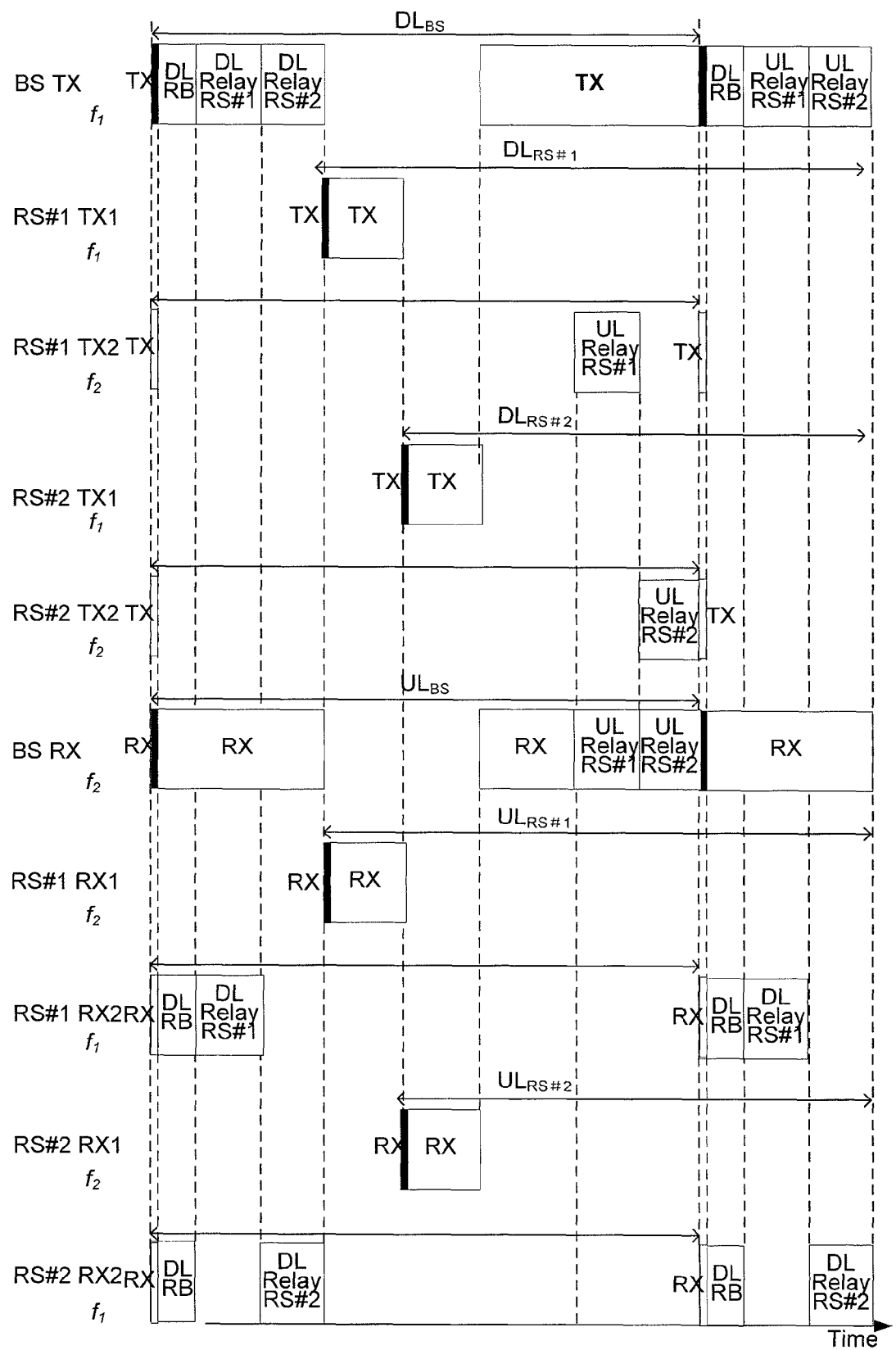
FIG. 22 is a schematic diagram illustrating the physical layer frame structure in the advanced relay communication mode under the third application scenario.
Figure 23:
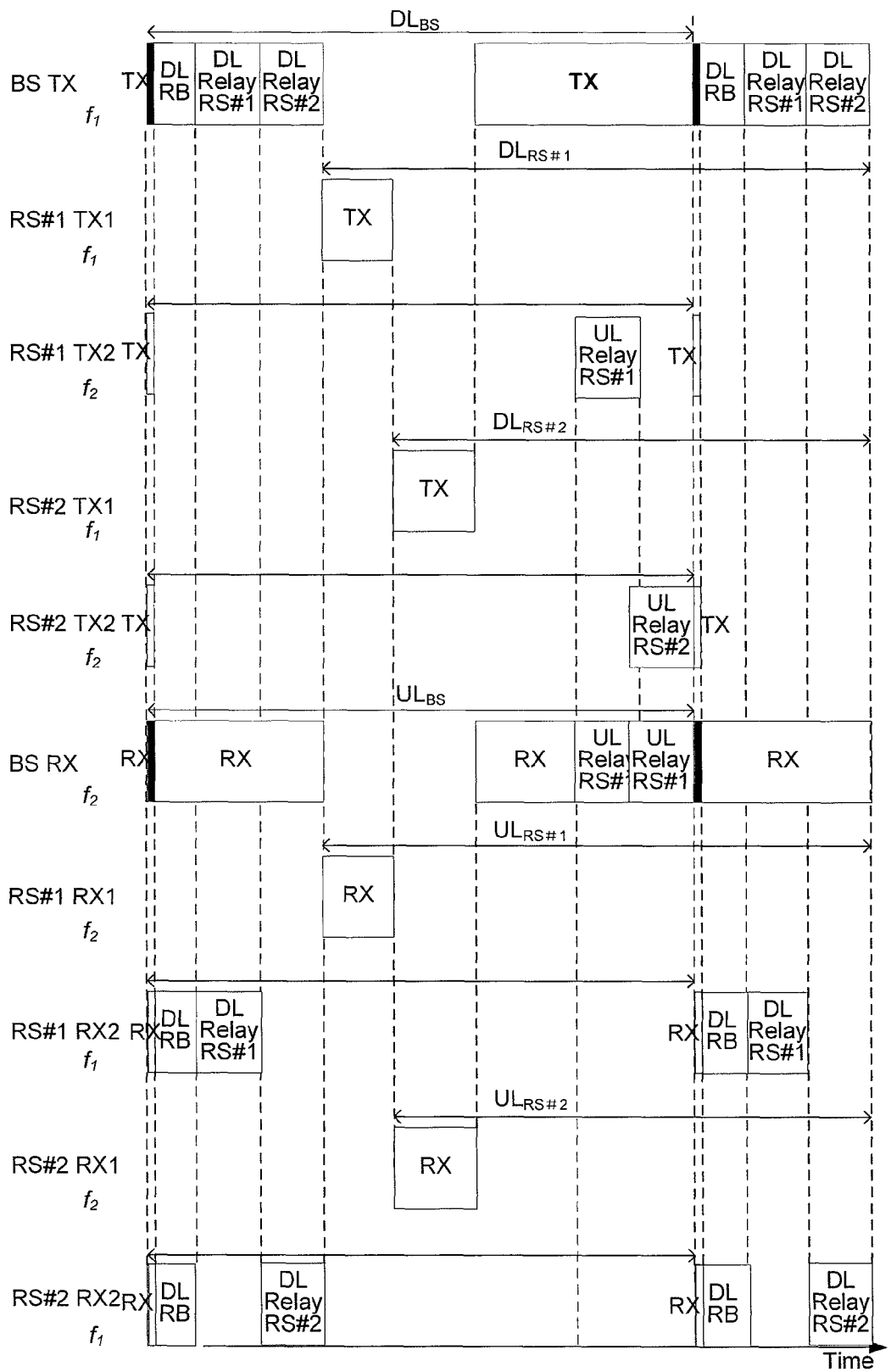
FIG. 23 is a schematic diagram illustrating the physical layer frame structure in the simplified relay communication mode under the third application scenario.

FIGS. 22 and 23 illustrate a particular embodiment of the physical layer frame structures of BS and RS according to the above described physical layer frame structure schemes according to the invention. FIG. 22 is a schematic diagram showing the physical layer frame structures of BS and RS in the case of multiple RSs in an advanced relay mode, and FIG. 23 is a schematic diagram showing the physical layer frame structures of BS and RS in the case of multiple RSs in a simplified relay mode. In FIGS. 22 and 23, the transmitting and receiving frequencies of RS and BS are represented by the frequencies as shown at the leftmost of the Figures.

The black blocks in downlink frame DLBS of BS and downlink frame DLRS of RS TX1 represent DL Header Slots. The black blocks in uplink frame ULBS of BS and uplink frame ULRS of RS RX1 represent UL Contention Slots. The white slender block TX of RS TX2 represents a UL Contention TX Slot. The white slender block RX of RS RX2 is a DL Header RX Slot.

The timeslot TX in downlink frame DLBS of BS is a DL Interference Slot (the downlink coverage of BS including region 2). The timeslot RX in uplink frame ULBS of BS is a UL Interference Slot (the uplink coverage of BS including region 22). The timeslot TX in downlink frame DLRS of RS TX1 is a DL Interference Slot (for the downlink coverage of RS including region 2). The timeslot RX in uplink frame ULRS of RS RX1 is a UL Interference Slot (the uplink coverage of RS including region 33 and region 22).

The DL Relay Zone of BS follows the DL Header Slot of the downlink frame DLBS of BS, and the UL Relay Zone of BS follows the UL Contention Slot of the uplink frame ULBS of BS. The timeslots of DL Relay Zone of BS have a one-to-one correspondence with those of DL Relay Zone of RS RX2, and the timeslots of UL Relay Zone of BS have a one-to-one correspondence with those of UL Relay Zone of RS TX2. During the time periods corresponding to the UL Relay Zone of BS, an SS/MSBS or SS/MSRS does not arrange any transmitting timeslot, an RS does not arrange any receiving timeslot. During the time periods corresponding to the DL Relay Zone of BS, an RS does not arrange any transmitting timeslot.

The UL Interference Slot of BS is not overlapped with that of RS RX1 in timeslots, and the DL Interference Slot of BS is not overlapped with that of RS TX1 in timeslots.

In the case of multiple RSs, the multiple RSs share, by TDM, the DL Relay Zone (i.e. DL RB, DL Relay R#1, #2, . . . , etc. in FIG. 6), UL Relay Zone (i.e. UL Relay R#1, #2, . . . etc.), DL Interference Slot and UL Interference Slot.

The invention further provides another (the second) implementation solution of the physical layer frame structures of BS and RS, which has the following characteristics:

1. In the advanced relay mode, the DL Header Slot of RS TX1 is required to lag behind that of BS in time, and be not overlapped with that of BS. The DL Header Slot of RS TX1 is required to be within the time period corresponding to a DL Non-Interference Slot of the downlink frame DLBS in the physical layer frame structure of BS.

2. A downlink non-interference timeslot, i.e. DL Non-Interference Slot, is arranged in the downlink frame DLBS (frequency f1) of the physical layer frame structure of BS, to define the BS downlink data timeslots of the downlink coverage "region 1" of BS.

3. A downlink non-interference timeslot, i.e. DL Non-Interference Slot, is arranged in the downlink frame DLRS of the physical layer frame structure of the first set radio transmitter TX1 (frequency f1) of RS, to define the RS downlink data timeslots of the downlink coverage "region 3" of RS.

The DL Non-Interference Slot of BS may be overlapped with that of RS TX1 in timeslots.

4. An uplink non-interference timeslot, i.e. UL Non-Interference Slot, is arranged in the uplink frame ULBS (frequency f2) of the physical layer frame structure of BS, to define the BS uplink data timeslots of the uplink coverage "region 11" of BS.

5. An uplink non-interference timeslot, i.e. UL Non-Interference Slot, is arranged in the uplink frame ULRS of the physical layer frame structure of the first set radio receiver RX1 (frequency f2) of RS, to define the RS uplink data timeslots of the uplink coverage "region 33" of RS.

The UL Non-Interference Slot of BS may be overlapped with that of RS RX1 in timeslots.

Figure 24:
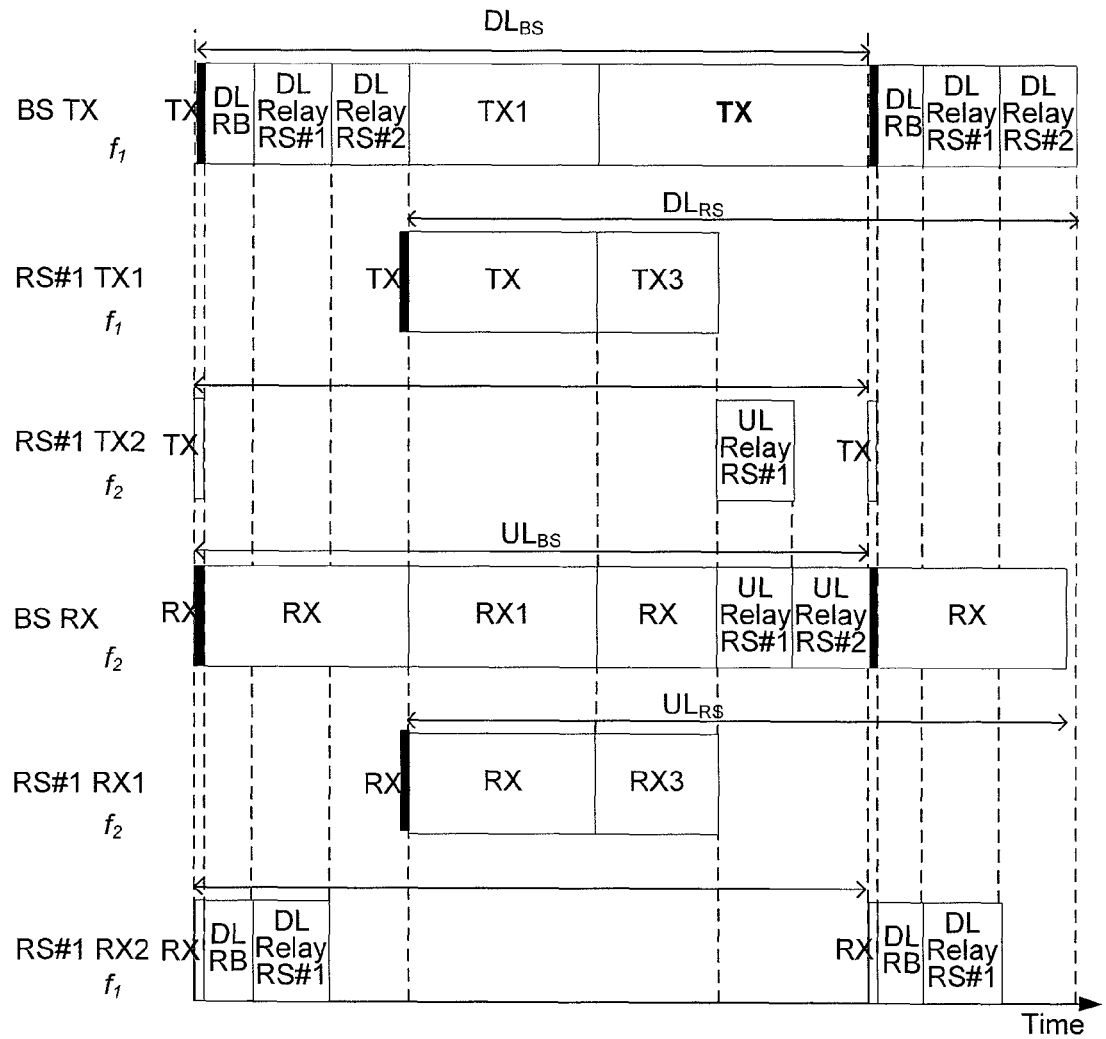
FIG. 24 is a first schematic diagram illustrating the physical layer frame structure of the BS and RS under the third application scenario.

FIG. 24 illustrates a particular embodiment of the physical layer frame structures of BS and RS during relay communication in the advanced relay mode according to the above characteristics of the physical layer frame structures. In FIG. 24, the transmitting and receiving frequencies of RS and BS are represented by the frequencies as shown at the leftmost of the Figure.

The black blocks in downlink frame DLBS of BS and downlink frame DLRS of RS TX1 represent DL Header Slots. The black blocks in uplink frame ULBS of BS and uplink frame ULRS of RS RX1 represent UL Contention Slots. The white slender block TX of RS TX2 represents a UL Contention TX Slot. The white slender block RX of RS RX2 is a DL Header RX Slot.

During relay communication in the simplified relay mode, the physical layer frame structures are similar to those illustrated in FIG. 24, except that the DL Header Slot of the downlink frame DLRS of RS TX1 and the UL Contention Slot of the uplink frame ULRS of RS RX1 do not exist in the simplified relay mode.

The timeslot TX1 in downlink frame DLBS of BS is a DL Non-Interference Slot (the downlink coverage "region 1" of BS), the timeslot TX is a DL Interference Slot (the downlink coverage "region 2" of BS). The timeslot RX1 in uplink frame ULBS of BS is a UL Non-Interference Slot (the uplink coverage "region 11" of BS), the timeslot RX is a UL Interference Slot (the uplink coverage "region 22" of BS). The timeslot TX3 in downlink frame DLRS of RS TX1 is a DL Non-Interference Slot (the downlink coverage "region 3" of RS), the timeslot TX is a DL Interference Slot (the downlink coverage "region 2" of RS). The timeslot RX3 in uplink frame ULRS of RS RX1 is a UL Non-Interference Slot (the uplink coverage "region 33" of RS), the timeslot RX is a UL Interference Slot (the uplink coverage "region 22" of RS).

The DL Relay Zone of BS follows the DL Header Slot of the downlink frame DLBS of BS, and the UL Relay Zone of BS follows the UL Contention Slot of the uplink frame ULBS of BS. The timeslots of DL Relay Zone of BS have a one-to-one correspondence with those of DL Relay Zone of RS RX2, and the timeslots of UL Relay Zone of BS have a one-to-one correspondence with those of UL Relay Zone of RS TX2.

Furthermore, during the time periods corresponding to the UL Relay Zone of BS, an SS/MSBS or SS/MSRS does not arrange any transmitting timeslot, an RS does not arrange any receiving timeslot. During the time periods corresponding to the DL Relay Zone of BS, an RS does not arrange any transmitting timeslot.

The UL Interference Slot of BS is not overlapped with that of RS RX1 in timeslots, and the DL Interference Slot of BS is not overlapped with that of RS TX1 in timeslots.

The invention further provides the third implementation solution of the physical layer frame structures of BS and RS. The third implementation solution is different from the second implementation solution in that:

1. A downlink interference timeslot, i.e. DL Non-Interference Slot, is arranged in the downlink frame DLBS (frequency f1) of the physical layer frame structure of BS, to define the BS downlink data timeslots of the downlink coverage "region 2" of BS, i.e. the region covered by only BS.

2. A downlink interference timeslot, i.e. DL Interference Slot, is arranged in the downlink frame DLRS of the physical layer frame structure of the first set radio transmitter TX1

(frequency f1) of RS, to define the RS downlink data timeslots of the downlink coverage "region 2" of RS, i.e. the region covered by only RS.

3. An uplink interference timeslot, i.e. UL Interference Slot, is arranged in the uplink frame ULBS (frequency f2) of the physical layer frame structure of BS, to define the BS uplink data timeslots of the uplink coverage "region 22" of BS, i.e. the region covered by only BS.

4. An uplink interference timeslot, i.e. UL Interference Slot, is arranged in the uplink frame ULRS of the physical layer frame structure of the first set radio receiver RX1 (frequency f2) of RS, to define the RS uplink data timeslots of the uplink coverage "region 22" of RS, i.e. the region covered by only RS.

In the case of multiple RSs, the multiple RSs share the UL Interference Slot by TDM, to prevent the interference from SS/MSRS to RS.

Figure 25:
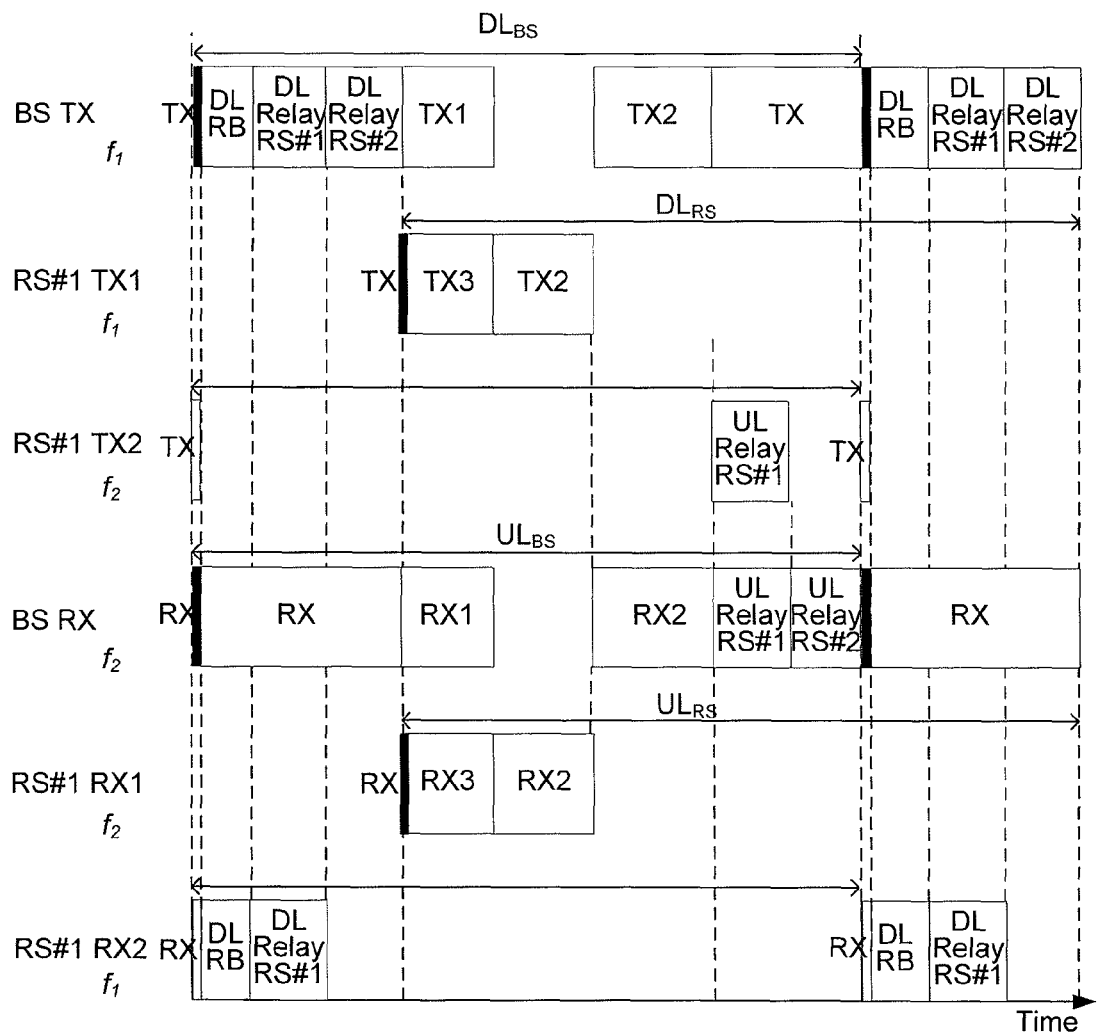
FIG. 25 is a second schematic diagram illustrating the physical layer frame structure of the BS and RS under the third application scenario.

FIG. 25 illustrates a particular embodiment of the physical layer frame structures of BS and RS in the advanced relay mode according to the third implementation solution of the physical layer frame structures. In FIG. 25, the transmitting and receiving frequencies of RS and BS are represented by the frequencies as shown at the leftmost of the Figure.

The black blocks in downlink frame DLBS of BS and downlink frame DLRS of RS TX1 represent DL Header Slots. The black blocks in uplink frame ULBS of BS and uplink frame ULRS of RS RX1 represent UL Contention Slots. The white slender block TX of RS TX2 represents a UL Contention TX Slot. The white slender block RX of RS RX2 is a DL Header RX Slot.

In the simplified relay mode, the physical layer frame structures are similar to those illustrated in FIG. 25, except that the DL Header Slot of the downlink frame DLRS of RS TX1 and the UL Contention Slot of the uplink frame ULRS of RS RX1 do not exist in the simplified relay mode.

The timeslot TX1 in downlink frame DLBS of BS is a DL Non-Interference Slot (the downlink coverage "region 1" of BS), the timeslot TX2 is a DL Interference Slot (the downlink coverage "region 2" of BS). The timeslot RX1 in uplink frame ULBS of BS is a UL Non-Interference Slot (the uplink coverage "region 11" of BS), the timeslot RX2 is a UL Interference Slot (the uplink coverage "region 22" of BS). The timeslot TX3 in downlink frame DLRS of RS TX1 is a DL Non-Interference Slot (the downlink coverage "region 3" of RS), the timeslot TX2 is a DL Interference Slot (the downlink coverage "region 2" of RS). The timeslot RX3 in uplink frame ULRS of RS RX1 is a UL Non-Interference Slot (the uplink coverage "region 33" of RS), the timeslot RX2 is a UL Interference Slot (the uplink coverage "region 22" of RS).

The DL Relay Zone of BS follows the DL Header Slot of the downlink frame DLBS of BS, and the UL Relay Zone of BS follows the UL Contention Slot of the uplink frame ULBS of BS. The timeslots of DL Relay Zone of BS have a one-to-one correspondence with those of DL Relay Zone of RS RX2, and the timeslots of UL Relay Zone of BS have a one-to-one correspondence with those of UL Relay Zone of RS TX2.

During the time periods corresponding to the UL Relay Zone of BS, an SS/MSBS or SS/MSRS does not arrange any transmitting timeslot, an RS does not arrange any receiving timeslot. During the time periods corresponding to the DL Relay Zone of BS, an RS does not arrange any transmitting timeslot.

The UL Interference Slot of BS is not overlapped with that of RS RX1 in timeslots, and the DL Interference Slot of BS is not overlapped with that of RS TX1 in timeslots. The DL Non-Interference Slot of BS is overlapped with that of RS TX1 in timeslots as much as possible, and the UL Non-Interference Slot of BS is overlapped with that of RS RX1 in timeslots as much as possible.

The invention further provides a processing flow of TDM/TDMA-FDD relay communication. The processing flow includes a downlink relay communication process from BS to a subscriber station, and an uplink relay communication process from a subscriber station to BS. The processing flow of TDM/TDMA-FDD relay communication is described below.

First, the downlink relay communication process from BS to a subscriber station is described. The downlink relay communication process may be divided into two phases, i.e. a first phase including a communication process from BS to RS, and a second phase includes a communication process from RS to the subscriber station.

In the first phase (BS→RS) of downlink relay, the relay process in the advanced relay mode is same as that in the simplified relay mode, which is as follows:

1. BS transmits preamble in the DL Header of the downlink sub-frame DLBS at frequency f1.

2. RS#1 receives the preamble in the DL Header of the downlink sub-frame DLBS of BS in the DL Header RX of the uplink sub-frame ULRS at frequency f1 of RS RX2, to keep synchronized with BS.

3. BS transmits FCH, DL-MAP, and UL-MAP information, after transmitting the preamble in "DL Header" of the downlink sub-frame DLBS at frequency f1.

4. RS#1 receives the FCH, DL-MAP, and UL-MAP transmitted in DL Header of the downlink sub-frame DLBS in the DL Header RX of the uplink sub-frame ULRS at frequency f1 of RS RX2, to obtain the information about positions and utilization methods (profile) of the uplink and downlink bursts of BS.

5. BS transmits a broadcast message(s) in the DL Relay broadcast of the DL Relay Zone in the downlink sub-frame DLBS of BS at frequency f1.

6. BS transmits downlink relay communication data, i.e. traffic data, to RS#1 in the DL Relay RS#1 of the DL Relay Zone in the downlink sub-frame DLBS of BS at frequency f1.

7. RS#1 receives the broadcast message transmitted in the DL Relay broadcast of the DL Relay Zone of the downlink sub-frame DLBS of BS, via the DL RB at frequency f1 of RS RX2. The broadcast message may include a message to be relayed by RS#1.

8. RS#1 receives the downlink relay communication data, i.e. the traffic data, transmitted in the DL Relay RS#1 of the DL Relay Zone in the downlink sub-frame DLBS of BS, via the DL Relay Zone at frequency f1 of RS RX2.

The second phase (RS→MS/SS) of downlink relay is as follows:

(1) Processing in the Advanced Relay Mode Includes:

1. RS#1 TX1 transmits preamble in the DL Header (at frequency f1) of the downlink sub-frame DLRS.

2. MS/SS receives the preamble transmitted in the DL Header of the downlink sub-frame DLRS of RS#1 TX 1, to keep synchronized with RS#1.

3. RS#1 TX1 transmits FCH, DL-MAP, and UL-MAP, after transmitting the preamble in DL Header of the downlink sub-frame DLRS at frequency f1. The FCH, DL-MAP, and UL-MAP of RS#1 may be transmitted by BS to RS#1 in the step 4 of the first phase).

4. MS/SS receives the FCH, DL-MAP, and UL-MAP transmitted in DL Header of the downlink sub-frame DLRS of RS#1 TX1, to obtain the information about positions and utilization methods (profile) of OFDMA symbols and/or sub-channels of the uplink and downlink bursts of RS#1.

5. RS#1 TX1 transmits the downlink relay communication data, i.e. the traffic data, to MS/SS, in the timeslots except for the DL Header and DL Relay Zone in the downlink sub-frame DLRS at frequency f1. The downlink relay communication data is transmitted to RS#1 TX1 by BS in step 6 of the first phase.

6. MS/SS receives the downlink relay communication data, i.e. the traffic data, transmitted in the downlink sub-frame DLRS of RS#1 TX1 in the corresponding timeslots.

(2) Processing in the Simplified Relay Mode Includes:

1. MS/SS receives the preamble transmitted in the DL Header of the downlink sub-frame DLBS of BS, to keep synchronized with BS.

2. MS/SS receives the FCH, DL-MAP, and UL-MAP transmitted in DL Header of the downlink sub-frame DLBS of BS, to obtain the information about positions and utilization methods (profile) of OFDMA symbols and/or subchannels, timeslots of the uplink and downlink bursts of BS and RS#1.

3. RS#1 TX1 transmits the downlink relay communication data, i.e. the traffic data, in the timeslots except for the DL Header and DL Relay Zone in the downlink sub-frame DLRS. The downlink relay communication data is transmitted to RS#1 TX1 by BS in step 6 of the first phase.

4. MS/SS receives the downlink relay communication data, i.e. the traffic data, transmitted in the downlink sub-frame DLRS of RS#1 TX1, in the corresponding timeslots.

Similarly, the uplink relay communication process also includes two phases, i.e. a first phase including a communication process from a subscriber station to RS, and a second phase includes a communication process from RS to BS.

The first phase (MS/SS→RS) of uplink relay includes the relay processing in the advanced relay mode and the simplified relay mode.

(1) The communication process in the advanced relay mode is as follows.

1. MS/SS receives the FCH, DL-MAP, and UL-MAP transmitted in DL Header (at frequency f1) of the downlink sub-frame DLRS of RS#1 TX1, to obtain the information about positions and utilization methods (profile) of timeslots of the uplink and downlink bursts of RS#1 TX1.

2. MS/SS transmits uplink communication data, i.e. the traffic data, to RS#1, in timeslot(s) except for the DL Header RX and UL Relay Zone in the uplink sub-frame ULRS of RS at frequency f2.

3. RS#1 receives the uplink communication data, i.e. the traffic data, transmitted in the uplink sub-frame ULRS by MS/SS in the corresponding timeslot(s) at frequency f2.

(2) The communication process in the simplified relay mode is as follows.

1. MS/SS receives the FCH, DL-MAP, and UL-MAP transmitted in DL Header of the downlink sub-frame DLBS of BS, in the corresponding timeslots at frequency f2, to obtain the information about positions and utilization methods (profile) of timeslots of the uplink and downlink bursts of BS and the first set radio transmitter of RS#1.

2. MS/SS transmits uplink communication data, i.e. the traffic data, to RS#1, at frequency f2 in timeslot(s) except for the DL Header RX and UL Relay Zone in the uplink sub-frame ULRS of RS RX1.

3. RS#1 RX1 receives the uplink communication data, i.e. the traffic data, transmitted in the uplink sub-frame ULRS by MS/SS, in the corresponding timeslot(s) at frequency f2.

In the second phase of the uplink relay (RS→BS), the communication process in the advanced relay mode is the same as that in the simplified relay mode. The second phase of the uplink relay is as follows.

1. RS#1 RX2 receives the FCH, DL-MAP, and UL-MAP transmitted in DL Header of the downlink sub-frame DLBS, via the DL Header RX Slot (at frequency f1) of the uplink sub-frame ULRS of RS, to obtain the information about positions and utilization methods (profile) of OFDMA symbols and subchannels of the uplink and downlink bursts of BS.

2. RS#1 TX2 transmits the uplink relay communication data, i.e. the traffic data, to BS, in UL Relay RS#1 of UL Relay Zone in the downlink sub-frame DLRS of RS at frequency f2. The uplink relay communication data is transmitted to RS#1 by MS/SS in step 2 of the first phase.

3. BS receives the uplink communication data, i.e. the traffic data transmitted in UL Relay RS#1 of UL Relay Zone in the uplink sub-frame ULBS of BS at frequency f2.

Moreover, in the relay communication process according to the invention, the relay communication between BS, RS and SS/MS is based on the OFDM technology, to improve the capability of the communication system for preventing multipath disturbance.

The Fourth Application Scenario: each RS is provided with two TDD radio transceivers, and the RS transfers information by use of the combination of OFDMA symbols and a relay subchannel(s).

A radio relay communication system based on the hybrid of FDD and TDD is provided, including an advanced-mode relay communication system and a simplified-mode relay communication system.

Figure 26:
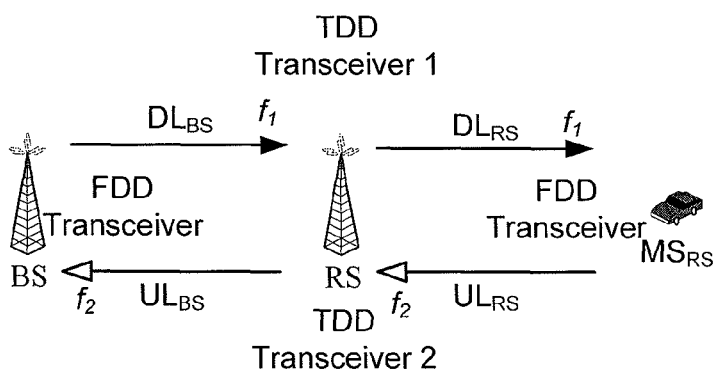
FIG. 26 is a schematic diagram illustrating an advanced relay communication mode under a fourth application scenario.

FIG. 26 illustrates an advanced-mode relay communication system model between RS, and BS and MS/SS. As shown in FIG. 26, an RS and a BS, an MS/SS communicate with each other by using FDD-TDD hybrid/TDM/OFDMA. The BS and RS employ a frequency f2 for downlink communication, and a frequency f1 for uplink communication. An MS/SS accesses a BS through the wireless relay of an RS. An RS accesses the BS as an MS/SS.

As shown in FIG. 26, BS and RS employ FDD transceivers. Each RS has two sets of TDD radio transceivers, e.g. TDD radio transceiver 1 and TDD radio transceiver 2 in FIG. 26. The first set TDD radio transceiver (TDD1) operates at a frequency f1, and the second set TDD radio transceiver (TDD2) operates at a frequency f2. DLBS represents a downlink sub-frame of the physical layer frame structure of BS, from BS to SS/MSBS or RS. ULBS represents an uplink sub-frame of the physical layer frame structure of BS, from SS/MSBS or RS to BS, for which the SS/MSBS is required to keep frame synchronization with BS in transmission and reception, the first set TDD radio transceiver of RS is required to keep frame synchronization with the transmitter of BS in transmission and reception, and the second set TDD radio transceiver of RS is required to keep frame synchronization with the receiver of BS in transmission and reception. DLRS represents a downlink sub-frame of the physical layer frame structure of RS, from RS to SS/MSRS. ULRS represents an uplink frame of the physical layer frame structure of RS, from SS/MSRS to RS, for which the transmitter of SS/MSRS and the second set TDD radio transceiver of the RS are required to keep frame synchronization with each other in transmission and reception, and the receiver of SS/MSRS and the first set TDD radio transceiver of the RS are required to keep frame synchronization with each other in transmission and reception.

Figure 27:
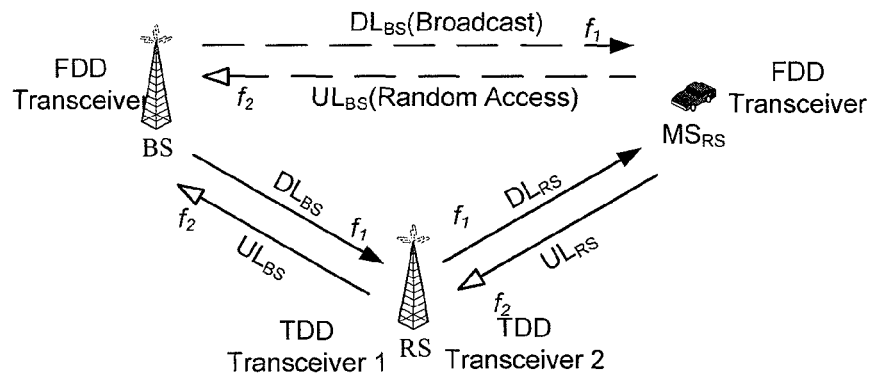
FIG. 27 is a schematic diagram illustrating a simplified relay communication mode under the fourth application scenario.

FIG. 27 illustrates a simplified relay communication mode of RS, BS, and MS/SS according to the invention. As shown in FIG. 27, an RS and a BS, an MS/SS communicate with each other by using FDD-TDD hybrid/TDM/OFDMA. The BS and RS employ a frequency f2 for downlink communication, and a frequency f1 for uplink communication. An MS/SS accesses a BS via the wireless relay of an RS. An RS accesses the BS as an MS/SS.

As shown in FIG. 27, BS and RS employ FDD transceivers. Each RS has two sets of TDD radio transceivers, e.g. TDD radio transceiver 1 and TDD radio transceiver 2 as shown in FIG. 26. The first set TDD radio transceiver (TDD1) operates at a frequency f1, and the second set TDD radio transceiver (TDD2) operates at a frequency f2. DLBS represents a downlink sub-frame of the physical layer frame structure of BS, from BS to SS/MSBS or RS, and ULBS represents an uplink sub-frame of the physical layer frame structure of BS, from SS/MSBS or RS to BS, for which the SS/MSBS or SS/MSRS is required to keep frame synchronization with BS in transmission and reception. DLRS represents a downlink sub-frame of the physical layer frame structure of RS, from RS to SS/MSRS, ULRS represents an uplink sub-frame of the physical layer frame structure of RS, from SS/MSRS to RS. The downlink Broadcast Bursts of DLBS, such as Preamble, FCH, DL-MAP, and UL-MAP, are directly transmitted to MS/SS by BS, without the relay of RS. The initial access ranging, periodic ranging and bandwidth request of MS/SS are directly transmitted to BS by MS/SS via the ranging subchannel of ULBS, without the relay of RS. Other downlink bursts of DLBS, such as data packets or message packets except for DL-MAP and UL-MAP, can not be directly transmitted to MS/SS by BS, but are required to be relayed by RS. Other uplink timeslots of ULBS, except for the initial access ranging, periodic ranging and bandwidth request of MS/SS, can not be directly transmitted to BS by MS/SSRS, but are required to be relayed by RS.

Figure 28:
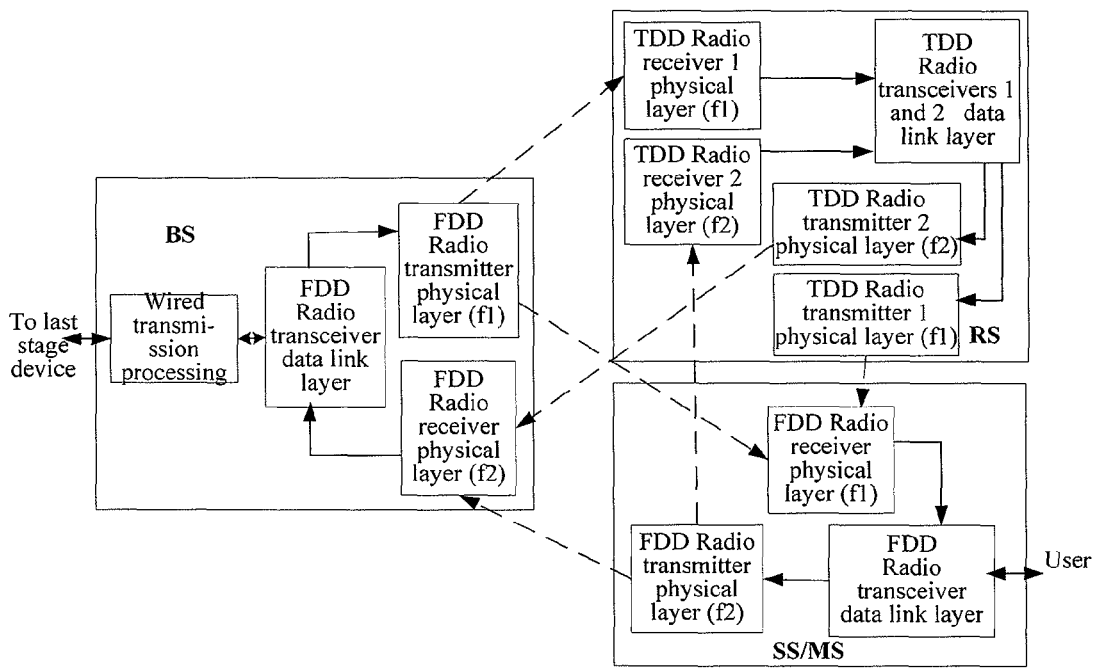
FIG. 28 is a schematic diagram illustrating the structure of a system under the fourth application scenario according to the invention.

The detailed structures of two relay communication systems according to the invention are described below in conjunction with the drawings. FIG. 28 shows a relay communication system which may employ the two relay communication mode, i.e. an advanced relay mode and a simplified relay mode. As shown in FIG. 28, the structure of the relay communication system is as follows.

In the relay communication system, the BS includes:

a wired transmission processing unit, capable of establishing communication with an upper stage apparatus (such as a base station controller) or with a set of base stations, and exchanging information with the upper stage apparatus or the set of base stations;

an FDD radio transceiver, adapted to communicate wirelessly with an RS or SS/MS in a TDD-FDD hybrid or FDD manner. The FDD radio transceiver includes an FDD radio transmitter physical layer unit, an FDD radio receiver physical layer unit, and an FDD radio transceiver data link layer unit.

The FDD radio transmitter physical layer unit (frequency f1) is adapted to communicate with the data link layer unit of the FDD radio transceiver and wirelessly with a physical layer unit of TDD radio receiver 1 of the RS capable of communicating with the BS or wirelessly with the FDD radio receiver physical layer unit of SS/SS capable of communicating with the BS. In the simplified relay mode, the FDD radio transmitter physical layer unit employs, for the downlink sub-frame header broadcast of DLBS (such as Preamble, FCH, DL-MAP, UL-MAP), a channel encoding and modulation scheme (such as Binary Phase Shift Keying, BPSK) more reliable than that for other transmission data, or employs a higher transmission power than for other transmission data. The BS directly transmits the downlink sub-frame header broadcast of DLBS to the MS/SS without the relay of RS.

The FDD radio receiver physical layer unit (frequency f2) is adapted to communicate with the data link layer of the FDD radio transceiver and wirelessly with a physical layer unit of TDD radio transmitter 1 of the RS capable of communicating with the BS or wirelessly with an FDD radio transmitter physical layer unit of SS/MS capable of communicating with the BS.

The FDD radio transceiver data link layer unit is adapted to perform an FDD radio transceiver data link layer processing on the data received from the FDD radio receiver physical layer unit or the wired transmission processing unit, and forward the processed data to the wired transmission processing unit or the FDD radio transmitter physical layer unit.

As shown in FIG. 28, the RS includes:

TDD radio transceivers 1 and 2, adapted to communicate wirelessly with a BS or SS/MS in a TDD/FDD hybrid manner. The TDD radio transceiver includes a physical layer unit of the TDD radio transmitter 1, a physical layer unit of the TDD radio transmitter 2, a physical layer unit of TDD radio receiver 1, a physical layer unit of TDD radio receiver 2, and a TDD radio transceiver data link layer unit. The TDD radio transceiver 1, i.e. the first TDD radio transceiver, includes the physical layer units of the TDD radio transmitter 1 (frequency f1) and the TDD radio receiver 1 (frequency f1). The TDD radio transceiver 2, i.e. the second TDD radio transceiver, includes the physical layer units of the TDD radio transmitter 2 (frequency f2) and the TDD radio receiver 2 (frequency f2).

The physical layer unit of TDD radio transmitter 1 (frequency f1), i.e. the first TDD radio transmitter physical layer unit, is adapted to communicate with the data link layer unit of the TDD radio transceivers 1 and 2 and wirelessly with the FDD radio receiver physical layer unit of the BS capable of communicating with the RS.

The physical layer unit of TDD radio transmitter 2 (frequency f2), i.e. the second TDD radio transmitter physical layer unit, is adapted to communicate with the data link layer unit of the TDD radio transceivers 1 and 2 and wirelessly with the FDD radio receiver physical layer unit of the SS/MS capable of communicating with the RS.

The physical layer unit of the TDD radio receiver 1 (frequency f1), i.e. the first TDD radio receiver physical layer unit, is adapted to communicate with the data link layer unit of the TDD radio transceivers and wirelessly with the FDD radio transmitter physical layer unit of the BS capable of communicating with the RS.

The physical layer unit of the TDD radio receiver 2 (frequency f2), i.e. the second TDD radio receiver physical layer unit, is adapted to communicate with the data link layer unit of the TDD radio transceivers and wirelessly with the FDD radio transmitter physical layer unit of the SS/MS capable of communicating with the RS.

The TDD radio transceiver data link layer unit is adapted to perform a TDD radio transceiver data link layer processing to the data received from the physical layer units of the TDD radio receiver 1 and/or the TDD radio receiver 2, and forward the processed data to the physical layer units of the TDD radio transmitter 1 and/or the TDD radio transmitter 2.

As shown in FIG. 28, the SS/MS includes:

an FDD radio transceiver, adapted to communicate wirelessly with an RS or BS in a TDD-FDD hybrid or FDD manner. The FDD radio transceiver includes an FDD radio transmitter physical layer unit, an FDD radio receiver physical layer unit, and an FDD radio transceiver data link layer unit.

The FDD radio transmitter physical layer unit is adapted to communicate with the data link layer unit of the FDD radio transceiver and wirelessly with the physical layer unit of the TDD radio receiver 2 of the RS capable of communicating with the SS/MS or wirelessly with the FDD radio receiver physical layer unit of the BS capable of communicating with the SS/MS. In the simplified relay mode, the FDD radio transmitter physical layer unit employs, for the uplink random access timeslots (or referred to Contention Slots) of ULBS, such as initial ranging contention slots and bandwidth request contention slots, or initial access ranging, periodic ranging, bandwidth request of MS/SS, a channel encoding and modulation scheme (such as Binary Phase Shift Keying, BPSK) more reliable than that for other transmission data, or employs a higher transmission power than for other transmission data, over the ranging subchannel of ULBS. The MS/SS directly transmits the initial access ranging, periodic ranging, bandwidth request of MS/SS to the BS without the relay of RS.

The FDD radio receiver physical layer unit is adapted to communicate with the data link layer unit of the FDD radio transceiver and wirelessly with the physical layer unit of the TDD radio transmitter 1 of the RS capable of communicating with the SS/MS or wirelessly with the FDD radio transmitter physical layer unit of BS capable of communicating with the SS/MS.

The FDD radio transceiver data link layer unit is adapted to perform an FDD radio transceiver data link layer processing on the data received from the FDD radio receiver physical layer unit or a user, and forward the processed data to the user or the FDD radio transmitter physical layer unit.

Figure 18:
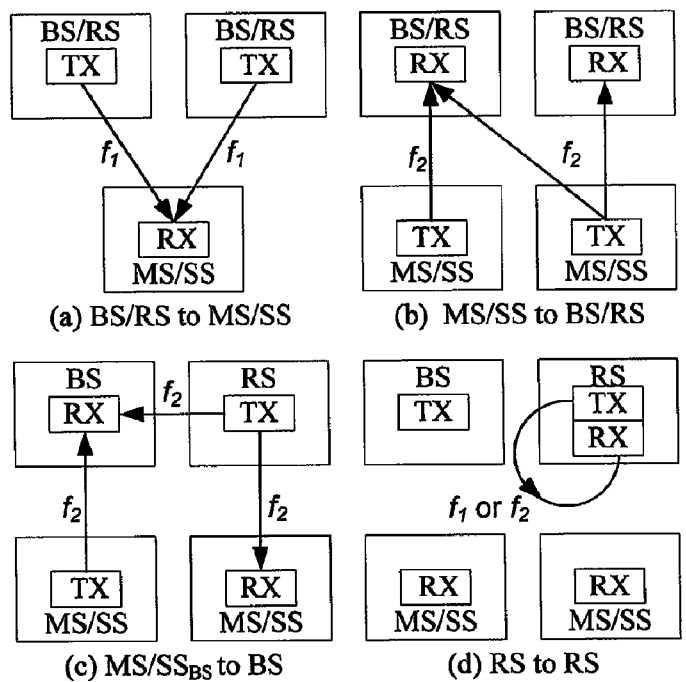
FIG. 18 is a schematic diagram illustrating a second co-frequency interference mode.
Figure 29:
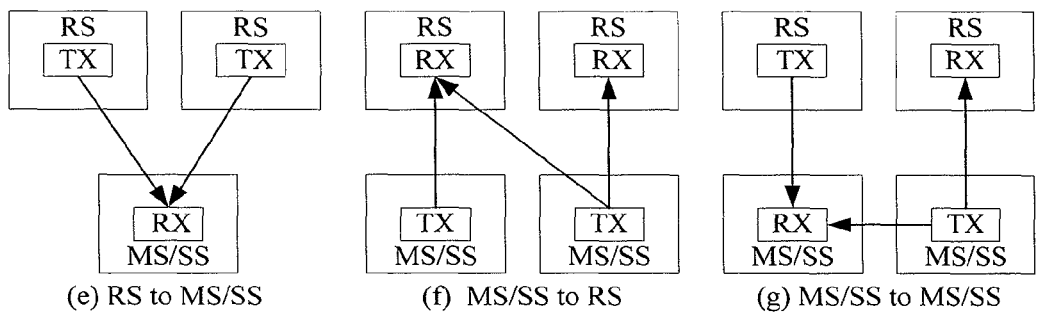
FIG. 29 is a schematic diagram illustrating a third co-frequency interference mode.

In the invention, in FDD mode, there may be the interference as shown in the 4 cases of FIG. 18 (a)-(d) in the network system communication. In the TDD mode, there may be the co-frequency interference as shown in the 3 cases of FIG. 29 (e)-(g). In FIG. 29, TX represents a transmitting model, and RX represents a receiving model.

To meet the requirements of relay communication and to eliminating various interferences possibly occurring in the communication, the physical layer frame structures of BS and RS are required to be arranged appropriately, thereby implementing the reliable relay communication via RS based on the physical layer frame structures.

The physical layer frame structures of BS and RS according to the invention are described below.

1. A downlink relay zone, DL Relay Zone, is arranged in the downlink sub-frame DLBS (frequency f1) of the physical layer frame structure of BS by TDM technique, to define the combinations of OFDMA symbols and downlink relay subchannels of BS to be transferred by BS to RS.

In the case of multiple RSs, the multiple RSs share the DL Relay Zone through different combinations of OFDMA symbols and subchannels.

2. A downlink relay zone, DL Relay Zone, is arranged in the uplink sub-frame ULRS of the physical layer frame structure of the first set TDD radio transmitter TDD1 of frequency f1 of RS by TDM technique, to define the combinations of OFDMA symbols and downlink relay subchannels in the DL Relay Zone of BS received by RS.

In the case of multiple RSs, the multiple RSs share the DL Relay Zone through different combinations of OFDMA symbols and subchannels. The TDD1 of each RS receives only the BS relay data in corresponding combination(s) of OFDMA symbols and subchannels in DL Relay Zone, and does not receive other combination(s) of OFDMA symbols and subchannels for other RSs.

3. An uplink relay zone, UL Relay Zone, is arranged in the uplink sub-frame ULBS of frequency f2 of the physical layer frame structure of BS by TDM, to define the combinations of OFDMA symbols and uplink relay subchannels for transferring from BS to RS.

In the case of multiple RSs, the multiple RSs share the UL Relay Zone through different combinations of OFDMA symbols and subchannels.

4. An uplink relay zone, UL Relay Zone, is arranged in the downlink sub-frame DLRS of the physical layer frame structure of the second set TDD radio transmitter TDD2 (frequency f2) of RS, to define the combinations of OFDMA symbols and relay subchannels in the UL Relay Zone of BS transferred by RS to BS.

In the case of multiple RSs, the multiple RSs share the UL Relay Zone through different combinations of OFDMA symbols and subchannels. The TDD2 of each RS receives only the BS relay data in corresponding combination(s) of OFDMA symbols and subchannels in UL Relay Zone, and does not receive other combination(s) of OFDMA symbols and subchannels for other RSs.

During the time period corresponding to the UL Relay Zone of BS, SS/MSBS or SS/MSRS does not arrange any combination of OFDMA symbols and transmitting subchannels, and RS may not arrange any combination of OFDMA symbols and receiving subchannels, to prevent the interference from SS/MSBS to RS and the interference from SS/MSRS to BS. In addition, during the time period corresponding to the DL Relay Zone of BS, RS may not arrange any combination of OFDMA symbols and transmitting subchannels, to prevent self-interference from RS to RS.

In addition, to facilitate the transport of broadcast messages between BS and RS, the physical layer frame structures of BS and RS may be further defined as follows:

1. A downlink relay broadcast subchannel, i.e. DL Relay Broadcast Subchannel, is created in the DL Relay Zone of the downlink sub-frame DLBS (frequency f1) in the physical layer frame structure of BS, to define the combinations of OFDMA symbols and downlink subchannels to be broadcasted by BS to RS, to broadcast the DCD, UCD, FPC, and CLK_CMP broadcast messages defined in the 802.16 standard.

2. A downlink relay broadcast subchannel, i.e. DL Relay Broadcast Subchannel, is created in the DL Relay Zone in the uplink sub-frame ULRS of the physical layer frame structure of TDD1 (frequency f1) of RS, to define the combinations of OFDMA symbols and uplink subchannels of RS for receiving the combinations of OFDMA symbols and downlink subchannels of BS, to receive the DCD, UCD, FPC, and CLK_CMP broadcast messages defined in the 802.16 standard.

In the invention, the physical layer frame structures of BS and RS may be further defined as follows:

1. A Relay Ranging Subchannel (RRS) is arranged in the UL Relay Zone of the uplink sub-frame ULBS (frequency f2) of the physical layer frame structure of BS, to define the combination(s) of OFDMA symbols and BS relay ranging receiving subchannel for the initial access ranging, periodic ranging, and bandwidth request of RS. The relay ranging subchannel (RRS) may be used as the ranging subchannel for the initial access ranging, periodic ranging, bandwidth request of SS/MSSBS.

2. A Relay Ranging TX Subchannel (RRS TX) is arranged in the DL Relay Zone of the downlink sub-frame DLRS of the physical layer frame structure of TDD2 (frequency f2) of RS, to define the combination(s) of OFDMA symbols and RS relay ranging transmitting subchannel for the initial access ranging, periodic ranging, and bandwidth request of RS.

The Relay Ranging Subchannel of BS has a one-to-one correspondence in frequency and time with the Relay Ranging TX Subchannel of RS, and is in rigorous synchronization with the Relay Ranging TX Subchannel of RS.

In a downlink sub-frame of the physical layer frame structure of BS or RS TDD1, the BS share the remaining part of the downlink sub-frame, except for the DL Header, DL Relay Zone of BS and UL Relay Zone of RS, through different combinations of OFDMA symbols and subchannels with different RSs, to prevent the interference from RS to SS/MSRS, the interference from RS to SS/MSBS, and the interference from BS to SS/MSRS.

In an uplink sub-frame of the physical layer frame structure of BS or RS TDD2, the BS share the remaining part of the uplink sub-frame, except for the DL Header RX, DL Relay Zone of BS and UL Relay Zone of RS, through different combinations of OFDMA symbols and subchannels with different RSs, to prevent the interference from SS/MSRS to RS, the interference from SS/MSBS to RS, and the interference from SS/MSRS to BS.

In the invention, the physical layer frame structures of BS and RS may be further defined as follows:

1. A downlink header, i.e. DL Header, is arranged in the downlink sub-frame DLBS (frequency f1) in the physical layer frame structure of BS, defined as the beginning of the downlink sub-frame, to define combinations of OFDMA symbols and subchannels for transmitting user synchronization information and combinations of OFDMA symbols and subchannels for transmitting indication information indicating the positions and utilization method (i.e. profile) of the combinations of OFDMA symbols and subchannels of uplink and downlink sub-frames of the physical layer frame structure of BS.

The synchronization information and indication information include the preamble, FCH, DL-MAP, UL-MAP as defined in an existing 802.16 OFDMA (or SOFDMA) frame. RS and BS keep frame synchronization with each other in transmission and reception.

2. In the advanced relay mode, a downlink header, i.e. DL Header, is arranged in the downlink sub-frame DLRS in the physical layer frame structure of TDD1 (frequency f1) of RS, defined as the beginning of the downlink sub-frame, to define combinations of OFDMA symbols and subchannels for transmitting user synchronization information and combinations of OFDMA symbols and subchannels for transmitting indication information indicating the positions and utilization method (i.e. profile) of the combinations of OFDMA symbols and subchannels in uplink and downlink sub-frames of the physical layer frame structure of TDD1 and TDD2 of RS.

Similarly, the synchronization information and indication information include the preamble, FCH, DL-MAP, UL-MAP as defined in an existing 802.16 OFDMA (or SOFDMA) frame. SS/MSRS and RS keep frame synchronization with each other in transmission and reception.

3. In the advanced relay mode, the DL Header of RS TDD1 lags behind that of BS in time. During the time period of DL Header of RS TDD1, no combination of OFDMA symbols and transmitting subchannels is arranged in the downlink sub-frame DLBS of BS, to prevent the interference from BS to SS/MSRS.

In the advanced relay mode, during the time period of DL Header of RS TDD1, no combination of OFDMA symbols and transmitting subchannels may be arranged in the downlink sub-frame DLRS of the physical layer frame structures of TDD1s of other RSs, to prevent the interference from BS to SS/MSRS. In special cases that the DL Headers of different RS TDD1s are overlapped in time, they are required to be overlapped with each other entirely, keep rigorously synchronized with each other, and contain the same contents, to prevent the interference from RS to SS/MSRS.

In the invention, the physical layer frame structures of BS and RS may be further defined as follows:

A downlink header receipt, i.e. DL Header RX, is arranged in the uplink sub-frame ULRS of the physical layer frame structure of the TDD1 (frequency f1) of RS, to define combinations of OFDMA symbols and subchannels for receiving the DL Header of BS. The two TDD radio transceivers of an RS achieve frequency and/or symbol synchronization with the BS according to the preamble received in the DL Header RX.

The DL Header of BS and the DL Header RX of RS are required to have a one-to-one correspondence with each other and to be rigorously synchronized with each other.

In the invention, the physical layer frame structures of BS and RS may be further defined as follows:

1. A Ranging Subchannel is arranged in the UL Relay Zone of the uplink sub-frame ULBS (frequency f2) of the physical layer frame structure of BS, to define the combination(s) of OFDMA symbols and BS ranging receiving subchannel for the initial access ranging, periodic ranging, and bandwidth request of SS/MSSBS.

2. In the advanced relay mode, a Ranging Subchannel is arranged in the uplink sub-frame ULRS of the physical layer frame structure of TDD2 (frequency f2) of RS, to define the combination(s) of OFDMA symbols and RS ranging transmitting subchannel for the initial access ranging, periodic ranging, and bandwidth request of SS/MSSRS.

The downlink sub-frame of an RS may not be overlapped with the uplink sub-frames of other RSs, and the uplink sub-frame of an RS may not be overlapped with the downlink sub-frames of other RSs, to prevent the interference from SS/MSRS to RS and the interference from SS/MSRS to SS/MSRS.

A time interval having a length of at least a TTG is required to be reserved from a downlink sub-frame DLRS of RS to an uplink sub-frame ULRS of RS. A time interval having a length of at least an RTG is required to be reserved from an uplink sub-frame ULRS of RS to a downlink sub-frame DLRS of RS.

In the invention, the above defined combinations of OFDMA symbols and subchannels or Zones are not necessarily included in each frame, except for the DL Header and Ranging Subchannel.

Figure 30:
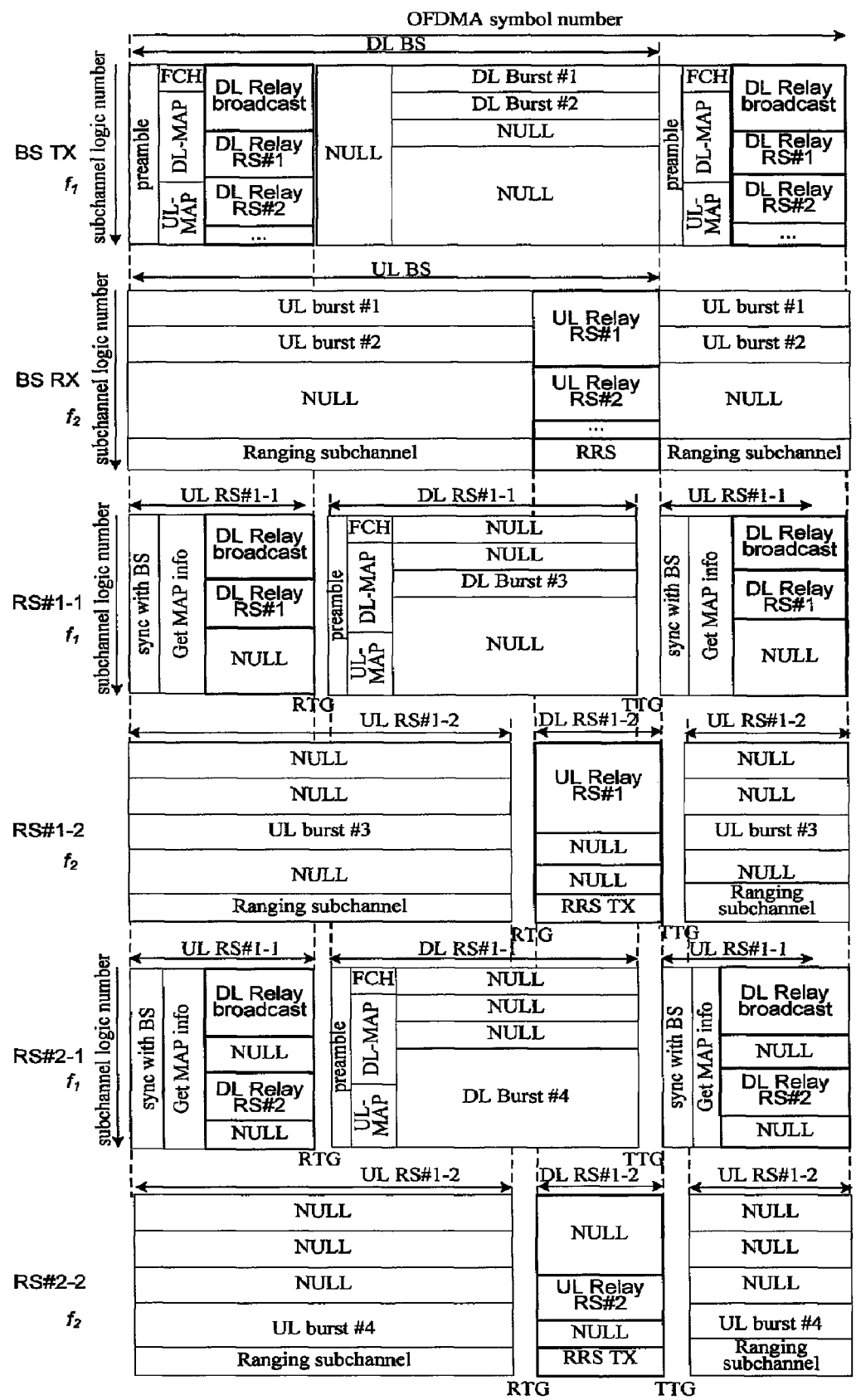
FIG. 30 is a schematic diagram illustrating the physical layer frame structure of the BS and RS in the advanced relay communication mode under the fourth application scenario.
Figure 31:
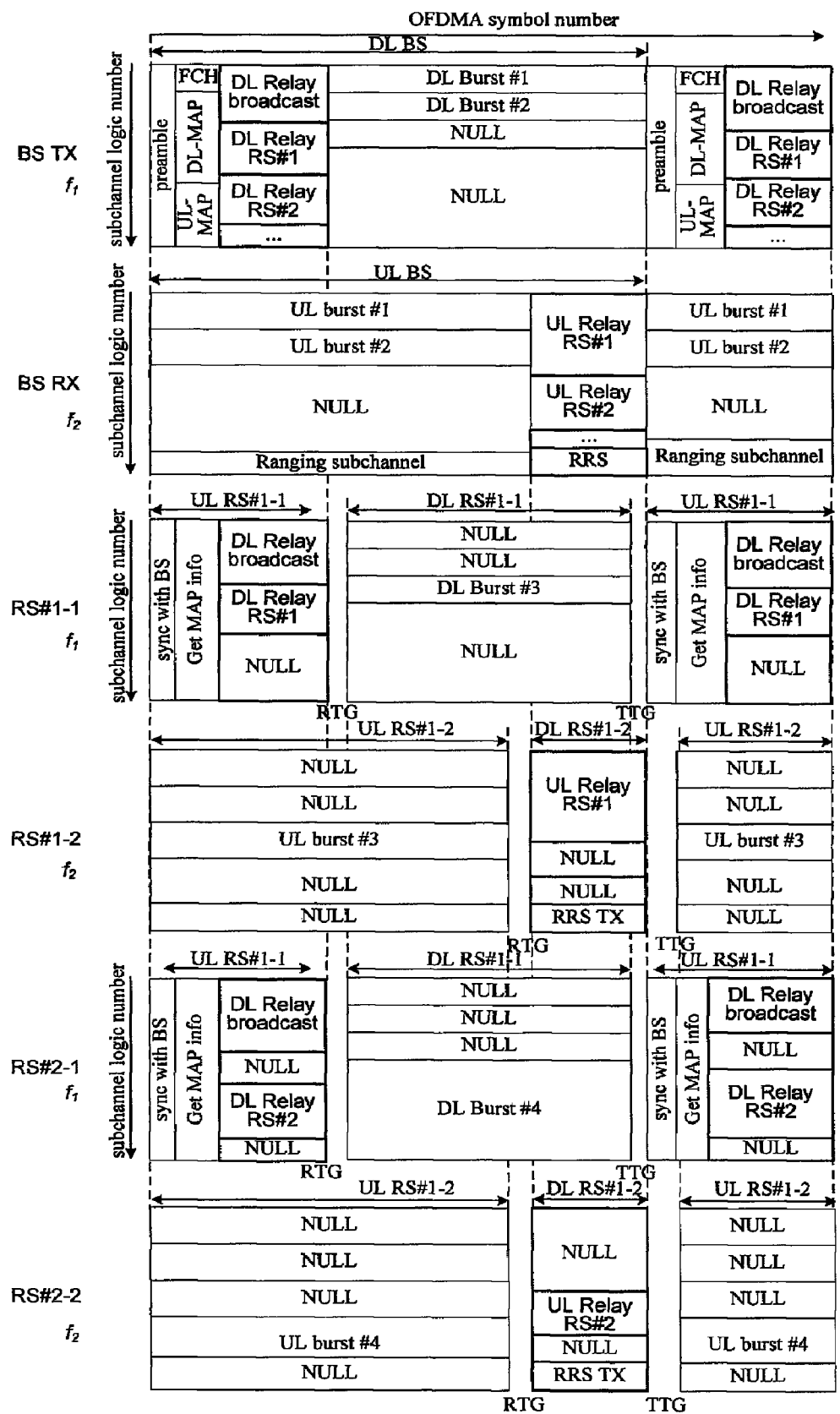
FIG. 31 is a schematic diagram illustrating the physical layer frame structure of the BS and RS in the simplified relay communication mode under the fourth application scenario.

FIG. 30 and FIG. 31 illustrate a particular embodiment of the physical layer frame structures of BS and RS based on the above physical layer frame structures according to the invention. FIG. 30 shows a schematic diagram of the physical layer frame structures of BS and RS in an advanced relay mode, and FIG. 31 shows a schematic diagram of the physical layer frame structures of BS and RS in a simplified relay mode. In FIGS. 30 and 31, the transmitting and receiving frequencies of BS and RS are shown in the leftmost of the Figures. The NULL or blank portions represent the parts in which no reception or transmission is arranged.

The portions represented by Preamble, DL-MAP, UL-MAP and FCH in the downlink sub-frame DLBS of BS and the downlink sub-frame DLRS of RS TDD1 are the DL Headers, and the portions represented by "sync with RS (synchronized with RS)" and "Get MAP info (get MAP information)" in the uplink sub-frame ULRS of RS TDD1 are the DL Header RX.

The DL Relay Zone (i.e. DL Relay broadcast, DL Relay R#1, #2, . . . ) of BS is arranged to follow the DL Header of the downlink sub-frame DLBS of BS. The UL Relay Zone (i.e. UL Relay R#1, #2, . . . , and RRS TX) of BS is arranged at the end of the uplink sub-frame ULBS of BS. During the time periods corresponding to the DL Relay Zone, an SS/MSBS or SS/MSRS does not arrange any combination of OFDMA symbols and transmitting subchannels, and an RS does not arrange any combination of OFDMA symbols and receiving subchannels. During the time periods corresponding to UL Relay Zone of BS, an RS does not arrange any combination of OFDMA symbols and transmitting subchannels.

PHY bursts are allocated with a set of adjacent subchannels and a set of OFDMA symbols. The BS and different RSs share the remaining portion of the downlink sub-frame by different combinations of OFDMA symbols and subchannels.

A relay communication process according to the invention is described with reference to a particular implementation example of relay communication. The relay communication process includes a downlink relay communication process and an uplink relay communication process, which are described below.

The downlink relay communication process of the relay communication process may be divided into two phases, i.e. a first phase including a communication process from BS to RS, and a second phase includes a communication process from RS to a subscriber station.

(I) The First Phase (BS→RS) of Downlink Relay,

In the first phase of downlink relay, the relay process in the advanced relay mode is same as that in the simplified relay mode, which is as follows:

1. BS transmits preamble in the first symbol of DL Header of the downlink sub-frame DLBS at frequency f1.

2. RS#1 receives the preamble in the DL Header of the downlink sub-frame DLBS of BS via the DL Header RX of RS TDD1 at frequency f1, to keep synchronized with BS.

3. BS transmits FCH, DL-MAP, and UL-MAP, after transmitting the preamble in DL Header of the downlink sub-frame DLBS at frequency f1.

4. RS#1 receives the FCH, DL-MAP, and UL-MAP transmitted in DL Header of the downlink sub-frame DLBS via the DL Header RX at frequency f1 of RS TDD1, to obtain the information about positions and utilization methods (profile) of the OFDMA symbols and subchannels in the uplink and downlink bursts of BS.

5. BS transmits a broadcast message(s) via the DL Relay broadcast of the DL Relay Zone in the downlink sub-frame DLBS of BS at frequency f1.

6. BS transmits downlink relay communication data, i.e. traffic data, to RS#1 in the DL Relay RS#1 of the DL Relay Zone in the downlink sub-frame DLBS of BS at frequency f1.

7. RS#1 receives the broadcast message transmitted in the DL Relay broadcast of the DL Relay Zone of the downlink sub-frame DLBS of BS, via the DL RB at frequency f1 of RS TDD1. The broadcast message may include a message to be relayed by RS#1.

8. RS#1 receives the downlink relay communication data, i.e. the traffic data, transmitted in the DL Relay RS#1 of the DL Relay Zone in the downlink sub-frame DLBS of BS, via the DL Relay Zone at frequency f1 of RS TDD1.

(II) The Second Phase (RS→MS/SS) of Downlink Relay

In the second phase of downlink relay, the processing in the advanced relay mode is different from that in the simplified relay mode.

The processing in the advanced relay mode is as follows:

1. RS#1 TX1 transmits preamble in the first symbol of the DL Header (at frequency f1) of the downlink sub-frame DLRS of RS#1 TDD1.

2. MS/SS receives the preamble transmitted in the DL Header of the downlink sub-frame DLRS of RS#1 TDD 1, to keep synchronized with RS#1.

3. RS#1 TDD1 transmits FCH, DL-MAP, and UL-MAP, after transmitting the preamble in DL Header of the downlink sub-frame DLRS at frequency f1. The FCH, DL-MAP, and UL-MAP of RS#1 may be transmitted by BS to RS#1 in the step 4 of the first phase.

4. MS/SS receives the FCH, DL-MAP, and UL-MAP transmitted in DL Header of the downlink sub-frame DLRS of RS#1 TDD1, to obtain the information about positions and utilization methods (profile) of OFDMA symbols and/or subchannels of the uplink and downlink bursts of RS#1 TDD1 and RS#1 TDD2.

5. RS#1 TDD1 transmits the downlink relay communication data, i.e. the traffic data, to MS/SS, in the time and frequency zones except for the DL Header in the downlink sub-frame DLRS at frequency f1. The downlink relay communication data is transmitted to RS#1 by BS in step 6 of the first phase.

6. MS/SS receives the downlink relay communication data, i.e. the traffic data, transmitted in the downlink sub-frame DLRS of RS#1 TDD1 in the corresponding time and frequency zones.

The processing in the simplified relay mode is as follows:

1. MS/SS receives the preamble transmitted in the DL Header of the downlink sub-frame DLBS of BS, to keep synchronized with BS.

2. MS/SS receives the FCH, DL-MAP, and UL-MAP transmitted in DL Header of the downlink sub-frame DLBS of BS, to obtain the information about positions and utilization methods (profile) of OFDMA symbols and subchannels of the uplink and downlink bursts of BS and RS#1.

3. RS#1 TDD1 transmits the downlink relay communication data, i.e. the traffic data, to MS/SS, in the time and frequency zones except for the DL Header in the downlink sub-frame DLRS at frequency f1. The downlink relay communication data is transmitted to RS#1 by BS in step 6 of the first phase.

4. MS/SS receives the downlink relay communication data, i.e. the traffic data, transmitted in the downlink sub-frame DLRS of RS#1 TDD1 in the corresponding time and frequency zones.

Similarly, the uplink relay communication process also includes two phases, i.e. a first phase including a communication process from a subscriber station to RS, and a second phase includes a communication process from RS to BS.

(I) The First Phase (MS/SS→RS) of Uplink Relay

The processing in the first phase of uplink relay in the advanced relay mode is as follows.

1. MS/SS receives the FCH, DL-MAP, and UL-MAP transmitted in DL Header (at frequency f1) of the downlink sub-frame DLRS of RS#1 TDD 1, to obtain the information about positions and utilization methods (profile) of OFDMA symbols and/or subchannels of the uplink and downlink bursts of RS#1 TDD1 and RS#1 TDD2.

2. MS/SS transmits uplink communication data, i.e. the traffic data, to RS#1, in the uplink sub-frame ULRS of RS TDD2 at frequency f2.

3. RS#1 TDD2 receives the uplink communication data, i.e. the traffic data, transmitted in the uplink sub-frame ULRS by MS/SS in the corresponding time and frequency zones at frequency f2.

The processing in the first phase of uplink relay in the simplified relay mode is as follows.

1. MS/SS receives the FCH, DL-MAP, and UL-MAP transmitted in DL Header of the downlink sub-frame DLBS of BS, to obtain the information about positions and utilization methods (profile) of OFDMA symbols and subchannels of the uplink and downlink bursts of BS, RS#1 TDD1 and RS#1 TDD2.

2. MS/SS transmits uplink communication data, i.e. the traffic data, to RS#1, at frequency f2 in the uplink sub-frame ULRS of RS TDD2.

3. RS#1 TDD2 receives the uplink communication data, i.e. the traffic data, transmitted in the uplink sub-frame ULRS by MS/SS, in the corresponding time and frequency zones at frequency f2.

(II) The Second Phase of the Uplink Relay (RS→BS)

In the second phase of the uplink relay, the processing in the advanced relay mode is the same as that in the simplified relay mode. The second phase of the uplink relay is as follows.

1. RS#1 TDD1 receives the FCH, DL-MAP, and UL-MAP transmitted in DL Header (at frequency f1) of the downlink sub-frame DLBS, to obtain the information about positions and utilization methods (profile) of OFDMA symbols and subchannels of the uplink and downlink bursts of BS.

2. RS#1 TDD2 transmits the uplink relay communication data, i.e. the traffic data, to BS, in UL Relay RS#1 of UL Relay Zone in the downlink sub-frame DLRS of RS at frequency f2. The uplink relay communication data is transmitted to RS#1 by MS/SS in step 2 of the first phase of uplink relay.

3. BS receives the uplink communication data, i.e. the traffic data in the step 2 in UL Relay RS#1 of UL Relay Zone in the uplink sub-frame ULBS of BS at frequency f2.

The Fifth Application Scenario: each RS is provided with two OFDMA-TDD radio transceivers corresponding to BS and MS respectively, and the RS transfers information by use of the combination of OFDMA symbols and relay sub channel(s).

Figure 32:
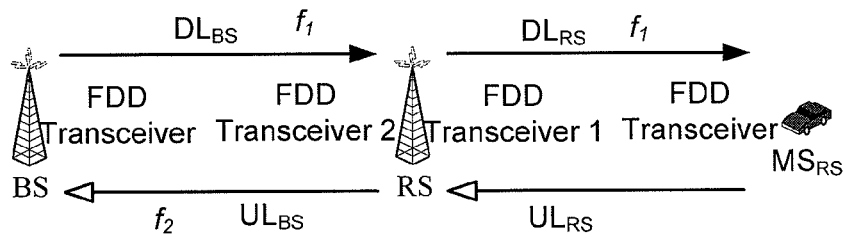
FIG. 32 is a schematic diagram illustrating an advanced relay communication mode of BS and RS under a fifth application scenario.

FIG. 32 illustrates an advanced-mode relay communication mode between RS, and BS and MS/SS. As shown in FIG. 32, an RS and a BS, an MS/SS communicate with each other by OFDMA-TDD. The BS and RS employ a frequency f2 for downlink communication, and a frequency f1 for uplink communication. An MS/SS accesses a BS through the wireless relay of an RS. An RS accesses the BS as an MS/SS.

As shown in FIG. 32, each RS has two sets of FDD radio transceivers, e.g. FDD radio transceiver 1 and FDD radio transceiver 2 in FIG. 32. In the first set FDD radio transceiver, the transmitter TX1 operates at the frequency f1, and the receiver RX1 operates at the frequency f2. In the second set FDD radio transceiver, the transmitter TX2 operates at the frequency f2, and the receiver RX2 operates at the frequency f1.

In addition, as shown in FIG. 32, DLBS represents a downlink sub-frame of the physical layer frame structure of BS, from BS to SS/MSBS or RS, and ULBS represents an uplink sub-frame of the physical layer frame structure of BS, from SS/MSBS or RS to BS, for which the SS/MSBS, the second set FDD radio transceiver of RS and BS are required to keep frame synchronization with each other in transmission and reception. DLRS represents a downlink sub-frame of the physical layer frame structure of RS, from RS to SS/MSRS. ULRS represents an uplink frame of the physical layer frame structure of RS, from SS/MSRS to RS, for which SS/MSRS and the first set FDD radio transceiver of the RS are required to keep frame synchronization with each other in transmission and reception.

Figure 33:
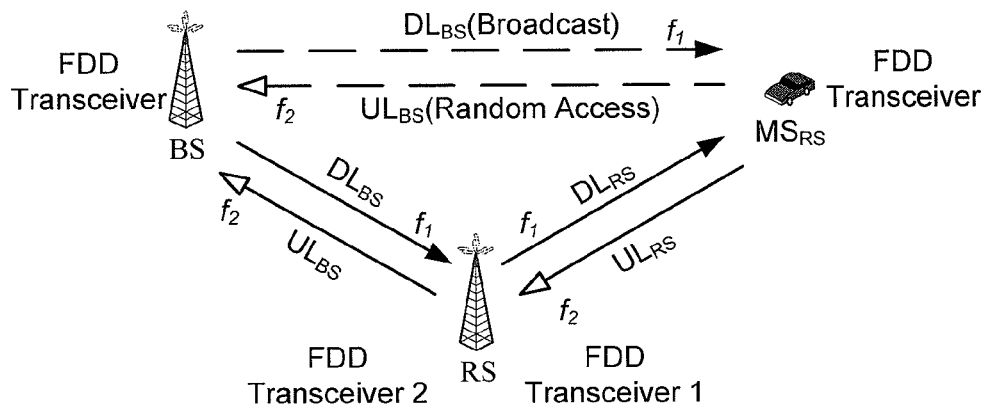
FIG. 33 is a schematic diagram illustrating a simplified relay communication mode of BS and RS under the fifth application scenario.

FIG. 33 illustrates a simplified relay communication mode of RS, BS, and MS/SS according to the invention. Each RS has two sets of FDD radio transceivers. In the first set FDD radio transceiver, the transmitter TX1 operates at the frequency f1, and the receiver RX1 operates at the frequency f2. In the second set FDD radio transceiver, the transmitter TX2 operates at the frequency f2, and the receiver RX2 operates at the frequency f1. Furthermore, as shown in FIG. 33, DLBS represents a downlink sub-frame of the physical layer frame structure of BS, from BS to SS/MSBS or RS, and ULBS represents an uplink sub-frame of the physical layer frame structure of BS, from SS/MSBS or RS to BS, for which the SS/MSBS or SS/MSRS, the second set FDD radio transceiver of RS, and BS are required to keep frame synchronization with each other in transmission and reception. DLRS represents a downlink sub-frame of the physical layer frame structure of RS, from RS to SS/MSRS, ULRS represents an uplink sub-frame of the physical layer frame structure of RS, from SS/MSRS to RS. The downlink Broadcast Bursts of DLBS, such as Preamble, FCH, DL-MAP, and UL-MAP, are directly transmitted to MS/SS by BS, without the relay of RS. The initial access ranging, periodic ranging and bandwidth request of MS/SS are directly transmitted to BS by MS/SS via the ranging subchannel of ULBS, without the relay of RS. Other downlink bursts of DLBS, such as data packets or message packets except for DL-MAP and UL-MAP, can not be directly transmitted to MS/SS by BS, but are required to be relayed by RS. Other uplink timeslots of ULBS, except for the initial access ranging, periodic ranging and bandwidth request of MS/SS, can not be directly transmitted to BS by MS/SSRS, but are required to be relayed by RS.

A relay communication system including BS, RS, and SS/MS according to the invention is provided. The relay communication system may employ the two relay communication mode, i.e. an advanced relay mode and a simplified relay mode.

Figure 34:
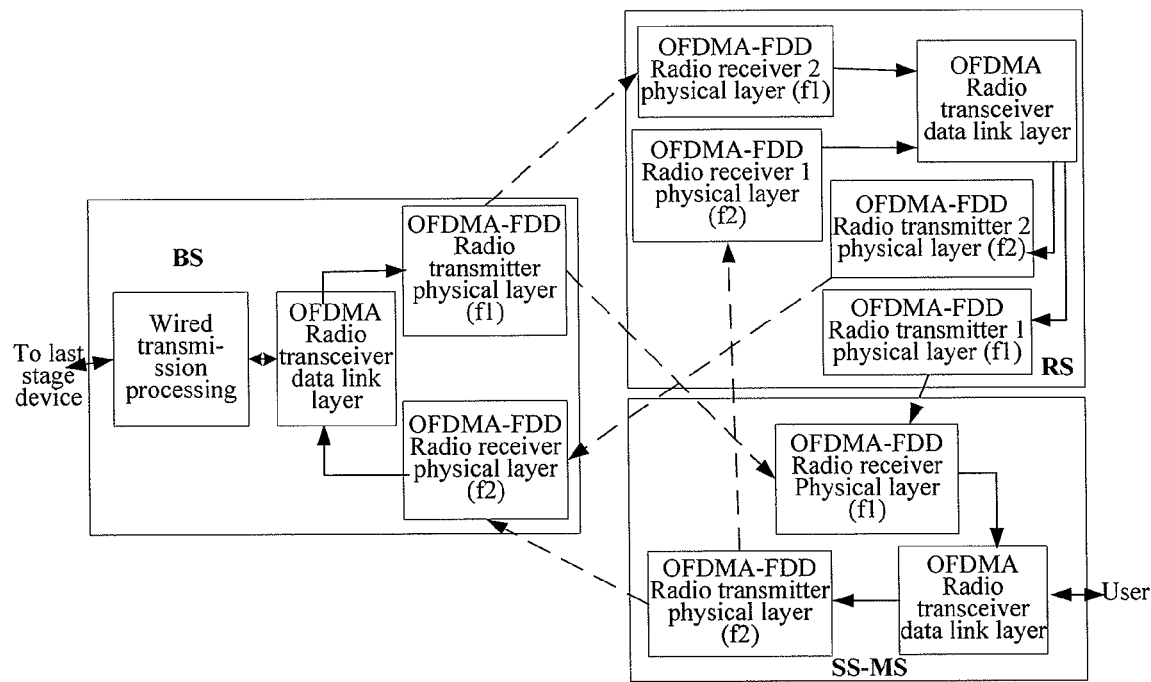
FIG. 34 is a schematic diagram illustrating the structure of a system under the fifth application scenario according to the invention.

As shown in FIG. 34, the BS includes:

a wired transmission processing unit, capable of establishing communication with an upper stage apparatus (such as a base station controller) or with a set of base stations, and exchanging information with the base station controller or the set of base stations;

an OFDMA-FDD radio transceiver, adapted to communicate wirelessly with an RS or SS/MS by OFDMA-FDD. The OFDMA-FDD radio transceiver includes an OFDMA-FDD radio transmitter physical layer unit, an OFDMA-FDD radio receiver physical layer unit, and an OFDMA-FDD radio transceiver data link layer unit.

The OFDMA-FDD radio transmitter physical layer unit (frequency f1) is adapted to communicate with the data link layer unit of the OFDMA-FDD radio transceiver and wirelessly with a physical layer unit of OFDMA-FDD radio receiver 2 of the RS capable of communicating with the BS or wirelessly with the OFDMA-FDD radio receiver physical layer unit of SS/SS capable of communicating with the BS. In the simplified relay mode, the OFDMA-FDD radio transmitter physical layer unit employs, for the downlink sub-frame header broadcast of DLBS (such as Preamble, FCH, DL-MAP, UL-MAP), a channel encoding and modulation scheme (such as Binary Phase Shift Keying, BPSK) more reliable than that for other transmission data, or employs a higher transmission power than for other transmission data. The BS directly transmits the downlink sub-frame header broadcast of DLBS to the MS/SS without the relay of RS.

The OFDMA-FDD radio receiver physical layer unit (frequency f2) is adapted to communicate with the data link layer unit of the OFDMA-FDD radio transceiver and wirelessly with a physical layer unit of OFDMA-FDD radio transmitter 2 of the RS capable of communicating with the BS or wirelessly with an OFDMA-FDD radio transmitter physical layer unit of SS/MS capable of communicating with the BS.

The OFDMA-FDD radio transceiver data link layer unit is adapted to perform an OFDMA-FDD radio transceiver data link layer processing on the data received from the OFDMA-FDD radio receiver physical layer unit or the wired transmission processing unit, and forward the processed data to the wired transmission processing unit or the OFDMA-FDD radio transmitter physical layer unit.

As shown in FIG. 34, the RS includes:

OFDMA-FDD radio transceivers 1 and 2, adapted to communicate wirelessly with a BS or SS/MS by OFDMA-FDD techniques. The OFDMA-FDD radio transceiver includes physical layer units of the OFDMA-FDD radio transmitters 1 and 2, physical layer units of the OFDMA-FDD radio receivers 1 and 2, and an OFDMA-FDD radio transceiver data link layer unit.

The physical layer unit of OFDMA-FDD radio transmitter 2 (frequency f2), i.e. the second OFDMA-FDD radio transmitter physical layer unit, is adapted to communicate with the data link layer unit of the OFDMA-FDD radio transceivers and wirelessly with the OFDMA-FDD radio receiver physical layer unit of the BS capable of communicating with the RS.

The physical layer unit of OFDMA-FDD radio transmitter 1 (frequency f1), i.e. the first OFDMA-FDD radio transmitter physical layer unit, is adapted to communicate with the data link layer unit of the OFDMA-FDD radio transceivers and wirelessly with the OFDMA-FDD radio receiver physical layer unit of the SS/MS capable of communicating with the RS.

The physical layer unit of the OFDMA-FDD radio receiver 2 (frequency f1), i.e. the second OFDMA-FDD radio receiver physical layer unit, is adapted to communicate with the data link layer unit of the OFDMA-FDD radio transceivers and wirelessly with the OFDMA-FDD radio transmitter physical layer unit of the BD capable of communicating with the RS.

The physical layer unit of the OFDMA-FDD radio receiver 1 (frequency f2), i.e. the first OFDMA-FDD radio receiver physical layer unit, is adapted to communicate with the data link layer unit of the OFDMA-FDD radio transceivers and wirelessly with the OFDMA-FDD radio transmitter physical layer unit of the SS/MS capable of communicating with the RS.

The OFDMA-FDD radio transmitter 1 and the OFDMA-FDD radio receiver 1 constitutes the OFDMA-FDD radio transceiver 1, i.e. the first OFDMA-FDD radio transceiver. The OFDMA-FDD radio transmitter 2 and the OFDMA-FDD radio receiver 2 constitutes the OFDMA-FDD radio transceiver 2, i.e. the second OFDMA-FDD radio transceiver.

As shown in FIG. 34, the SS/MS includes:

an OFDMA-FDD radio transceiver, adapted to communicate wirelessly with an RS or BS in an OFDMA-FDD manner. The OFDMA-FDD radio transceiver includes an OFDMA-FDD radio transmitter physical layer unit, an OFDMA-FDD radio receiver physical layer unit, and an OFDMA radio transceiver data link layer unit.

The OFDMA-FDD radio transmitter physical layer unit is adapted to communicate with the OFDMA radio transceiver data link layer unit and wirelessly with the physical layer unit of the OFDMA-FDD radio receiver 1 of the RS capable of communicating with the SS/MS or wirelessly with the OFDMA-FDD radio receiver physical layer unit of the BS capable of communicating with the SS/MS. In the simplified relay mode, the OFDMA-FDD radio transmitter physical layer unit employs, for the uplink random access timeslots (or referred to Contention Slots) of ULBS, such as initial ranging contention slots and bandwidth request contention slots, or initial access ranging, periodic ranging, bandwidth request of MS/SS, a channel encoding and modulation scheme (such as Binary Phase Shift Keying, BPSK) more reliable than that for other transmission data, or employs a higher transmission power than for other transmission data, over the ranging subchannel of ULBS. The MS/SS directly transmits the initial access ranging, periodic ranging, bandwidth request of MS/SS to the BS without the relay of RS.

The OFDMA-FDD radio receiver physical layer unit is adapted to communicate wirelessly with the OFDMA radio transceiver data link layer unit and with the physical layer unit of the OFDMA-FDD radio transmitter 1 of the RS capable of communicating with the SS/MS or the OFDMA-FDD radio transmitter physical layer unit of BS capable of communicating with the SS/MS.

The OFDMA radio transceiver data link layer unit is adapted to perform an OFDMA radio transceiver data link layer processing to the data received from the OFDMA-FDD radio receiver physical layer unit or a user, and forward the processed data to the user or the OFDMA-FDD radio transmitter physical layer unit.

In the invention, in FDD communication mode, there may be the interference as shown in the 4 cases of FIG. 18 (a)-(d) in the network system communication. In the Figure, TX represents a transmitting model, and RX represents a receiving model.

To implement the relay communication based on RS, the physical layer frame structures of BS and RS are required to be arranged appropriately, thereby implementing the reliable relay communication and eliminating various interferences possibly occurring in the communication.

Particular embodiments of the physical layer frame structures of BS and RS according to the invention are described below.

To implement the relay communication based on RS, the physical layer frame structures of BS and RS may be defined as follows.

1. A downlink relay zone, DL Relay Zone, is arranged in the downlink sub-frame DLBS (frequency f1) in the physical layer frame structure of BS by TDM technique, to define the combinations of OFDMA symbols and downlink relay subchannels of BS to be transferred by BS to RS.

In the invention, in the case of multiple RSs, the multiple RSs share the DL Relay Zone through different combinations of OFDMA symbols and subchannels.

2. A downlink relay zone, DL Relay Zone, is arranged in the physical layer frame structure of the second set radio receiver RX2 of frequency f1 of RS by TDM technique, to define the combinations of OFDMA symbols and downlink relay subchannels in the DL Relay Zone of BS received by RS.

In the case of multiple RSs, the multiple RSs share the DL Relay Zone through different combinations of OFDMA symbols and subchannels. The RX2 of each RS receives only the BS relay data in corresponding combination(s) of OFDMA symbols and subchannels in DL Relay Zone, and does not receive other combination(s) of OFDMA symbols and subchannels for other RSs.

3. An uplink relay zone, UL Relay Zone, is arranged in the uplink sub-frame ULBS of frequency f2 in the physical layer frame structure of BS by TDM, to define the combinations of OFDMA symbols and uplink relay subchannels of BS transferred by BS to RS.

In the case of multiple RSs, the multiple RSs share the UL Relay Zone through different combinations of OFDMA symbols and subchannels.

4. An uplink relay zone, UL Relay Zone, is arranged in the physical layer frame structure of the second set radio transmitter TX2 (frequency f2) of RS, to define the combinations of OFDMA symbols and relay subchannels in the UL Relay Zone of BS from RS to BS.

In the case of multiple RSs, the multiple RSs share the UL Relay Zone through different combinations of OFDMA symbols and subchannels. The TX2 of each RS receives only the BS relay data in corresponding combination(s) of OFDMA symbols and subchannels in UL Relay Zone, and does not receive in other combination(s) of OFDMA symbols and subchannels for other RSs.

During the time period corresponding to the UL Relay Zone of BS, an SS/MSBS or SS/MSRS does not arrange any combination of OFDMA symbols and transmitting subchannels, and an RS may not arrange any combination of OFDMA symbols and receiving subchannels, to prevent the interference from SS/MSBS to RS and the interference from SS/MSRS to BS. In addition, during the time period corresponding to the DL Relay Zone of BS, RS may not arrange any combination of OFDMA symbols and transmitting subchannels, to prevent self-interference from RS to RS.

To facilitate the transport of broadcast messages between BS and RS, the physical layer frame structures of BS and RS may be further defined as follows:

1. A downlink relay broadcast subchannel, i.e. DL Relay Broadcast Subchannel, is arranged in the DL Relay Zone of the downlink sub-frame DLBS (frequency f1) of the physical layer frame structure of BS, to define the combinations of OFDMA symbols and downlink subchannels to be broadcasted by BS to RS. The information to be broadcasted includes the DCD, UCD, FPC, and CLK_CMP broadcast messages defined in the 802.16 standard.

2. A downlink relay broadcast subchannel, i.e. DL Relay Broadcast Subchannel, is arranged in the DL Relay Zone of the physical layer frame structure of the second set radio receiver RX2 (frequency f1) of RS, to define the combinations of OFDMA symbols and uplink subchannels of RS for receiving the downlink relay broadcast timeslot of BS, to receive the DCD, UCD, FPC, and CLK_CMP broadcast messages defined in the 802.16 standard.

In the invention, the physical layer frame structures of BS and RS may be further defined as follows:

1. A Relay Ranging Subchannel (RRS) is arranged in the UL Relay Zone of the uplink sub-frame ULBS (frequency f2) of the physical layer frame structure of BS, to define the combination(s) of OFDMA symbols and BS relay ranging receiving subchannel for the initial access ranging, periodic ranging, and bandwidth request of RS. The relay ranging subchannel (RRS) may also be used as the ranging subchannel for the initial access ranging, periodic ranging, bandwidth request of SS/MSSBS.

2. A Relay Ranging TX Subchannel (RRS TX) is arranged in the DL Relay Zone of the physical layer frame structure of the second radio transmitter TX2 (frequency f2) of RS, to define the combination(s) of OFDMA symbols and RS relay ranging transmitting subchannel for the initial access ranging, periodic ranging, and bandwidth request of RS.

The Relay Ranging Subchannel of BS has a one-to-one correspondence in frequency and time with the Relay Ranging TX Subchannel of RS TX2, and is in rigorous synchronization with the Relay Ranging TX Subchannel of RS TX2.

In a downlink sub-frame of the physical layer frame structure of BS or RS TX1, the BS share the remaining part of the downlink sub-frame, except for the DL Header, DL Relay Zone of BS and UL Relay Zone of RS TX1, through different combinations of OFDMA symbols and subchannels with different RSs, to prevent the interference from RS to SS/MSRS, the interference from RS to SS/MSBS, and the interference from BS to SS/MSRS.

In an uplink sub-frame of the physical layer frame structure of BS or RS RX1, the BS share the remaining part of the uplink sub-frame, except for the UL Relay Zone of BS and the period corresponding to the UL Relay Zone of BS in the UL Relay Zone of RS RX 1, through different combinations of OFDMA symbols and subchannels with different RSs, to prevent the interference from SS/MSRS to RS, the interference from SS/MSBS to RS, and the interference from SS/MSRS to BS.

In the invention, the physical layer frame structures of BS and RS may be further defined as follows:

1. A downlink header, i.e. DL Header, is arranged in the downlink sub-frame DLBS (frequency f1) of the physical layer frame structure of BS, defined as the beginning of the downlink sub-frame, to define combinations of OFDMA symbols and subchannels for transmitting user synchronization information and combinations of OFDMA symbols and subchannels for transmitting indication information indicating the positions and utilization method (i.e. profile) of the combinations of OFDMA symbols and subchannels of uplink and downlink sub-frames of the physical layer frame structure of BS.

The synchronization information and indication information include the preamble, FCH, DL-MAP, UL-MAP information defined in an existing 802.16 OFDMA (or SOFDMA) frame, so that SS/MSBS, RS and BS keep frame synchronization with each other in transmission and reception.

2. In the advanced relay mode, a downlink header, i.e. DL Header, is arranged in the downlink sub-frame DLRS in the physical layer frame structure of the first set radio transmitter (frequency f1) of RS, arranged at the beginning of the downlink sub-frame, to define combinations of OFDMA symbols and subchannels for transmitting user synchronization information and combinations of OFDMA symbols and subchannels for transmitting indication information indicating the positions and utilization method (i.e. profile) of the combinations of OFDMA symbols and subchannels in uplink and downlink sub-frames of the physical layer frame structure of the first set radio transmitter of RS.

Similarly, the synchronization information and indication information include the preamble, FCH, DL-MAP, UL-MAP defined in an existing 802.16 OFDMA (or SOFDMA) frame, so that SS/MSRS and RS keep frame synchronization with each other in transmission and reception.

In the invention, in the advanced relay mode, the DL Header of RS TX1 lags behind that of BS in time. During the time period of DL Header of RS TX1, no combination of OFDMA symbols and transmitting subchannels is arranged in the downlink sub-frame DLBS of BS, to prevent the interference from BS to SS/MSRS.

In the advanced relay mode, during the time period of DL Header of RS TX1, no combination of OFDMA symbols and transmitting subchannels may be arranged in the downlink sub-frame DLRS in the physical layer frame structures of TX1s of other RSs, to prevent the interference from BS to SS/MSRS.

In special cases that the DL Headers of different RS TX1s are overlapped in time, they are required to be overlapped with each other entirely, keep rigorously synchronized with each other, and contain the same contents, to prevent the interference from RS to SS/MSRS.

In the invention, the physical layer frame structures of BS and RS may be further defined as follows:

A downlink header receipt, i.e. DL Header RX, is arranged in the physical layer frame structure of the second set radio receiver RX2 (frequency f1) of RS, to define combinations of OFDMA symbols and subchannels for receiving the DL Header of BS. The two sets of radio transceivers of an RS achieve frequency and/or symbol synchronization with the BS according to the preamble received in the DL Header RX.

The DL Header of BS and the DL Header RX of RS are required to have a one-to-one correspondence with each other and to be rigorously synchronized with each other.

In the invention, the physical layer frame structures of BS and RS may be further defined as follows:

1. A Ranging Subchannel is arranged in the UL Relay Zone of the uplink sub-frame ULBS (frequency f2) of the physical layer frame structure of BS, to define the combination(s) of OFDMA symbols and BS ranging receiving subchannel for the initial access ranging, periodic ranging, and bandwidth request of SS/MSSBS.

2. In the advanced relay mode, a Ranging Subchannel is arranged in the uplink sub-frame ULRS of the physical layer frame structure of the first set radio receiver RX1 (frequency f2) of RS, to define the combination(s) of OFDMA symbols and RS ranging transmitting subchannel for the initial access ranging, periodic ranging, and bandwidth request of SS/MSSRS.

In the invention, the above defined combinations of OFDMA symbols and subchannels or Zones are not necessarily included in each frame, except for the DL Header and Ranging Subchannel.

Figure 35:
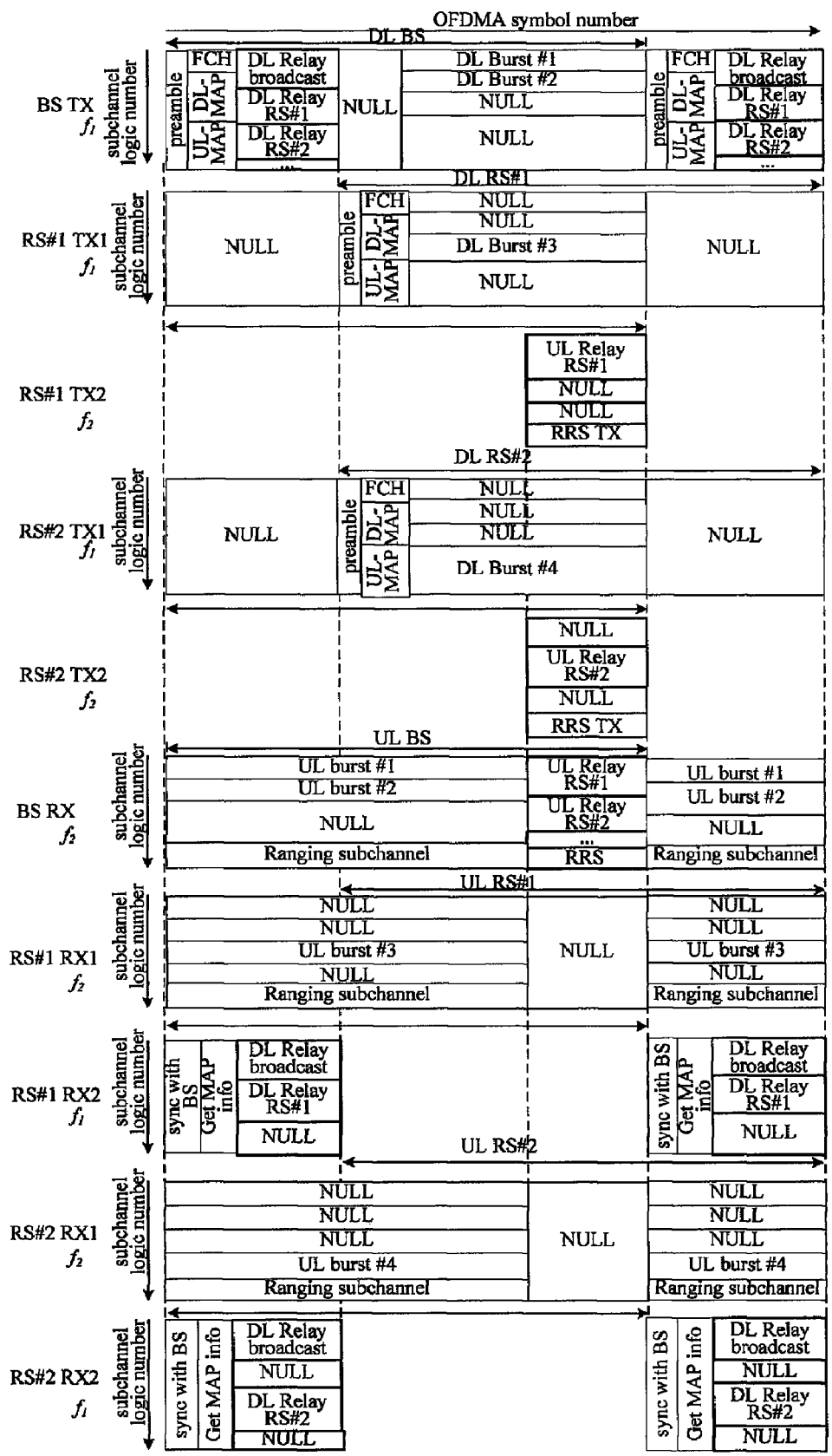
FIG. 35 is a first schematic diagram illustrating the physical layer frame structure of the BS and RS under the fifth application scenario.
Figure 36:
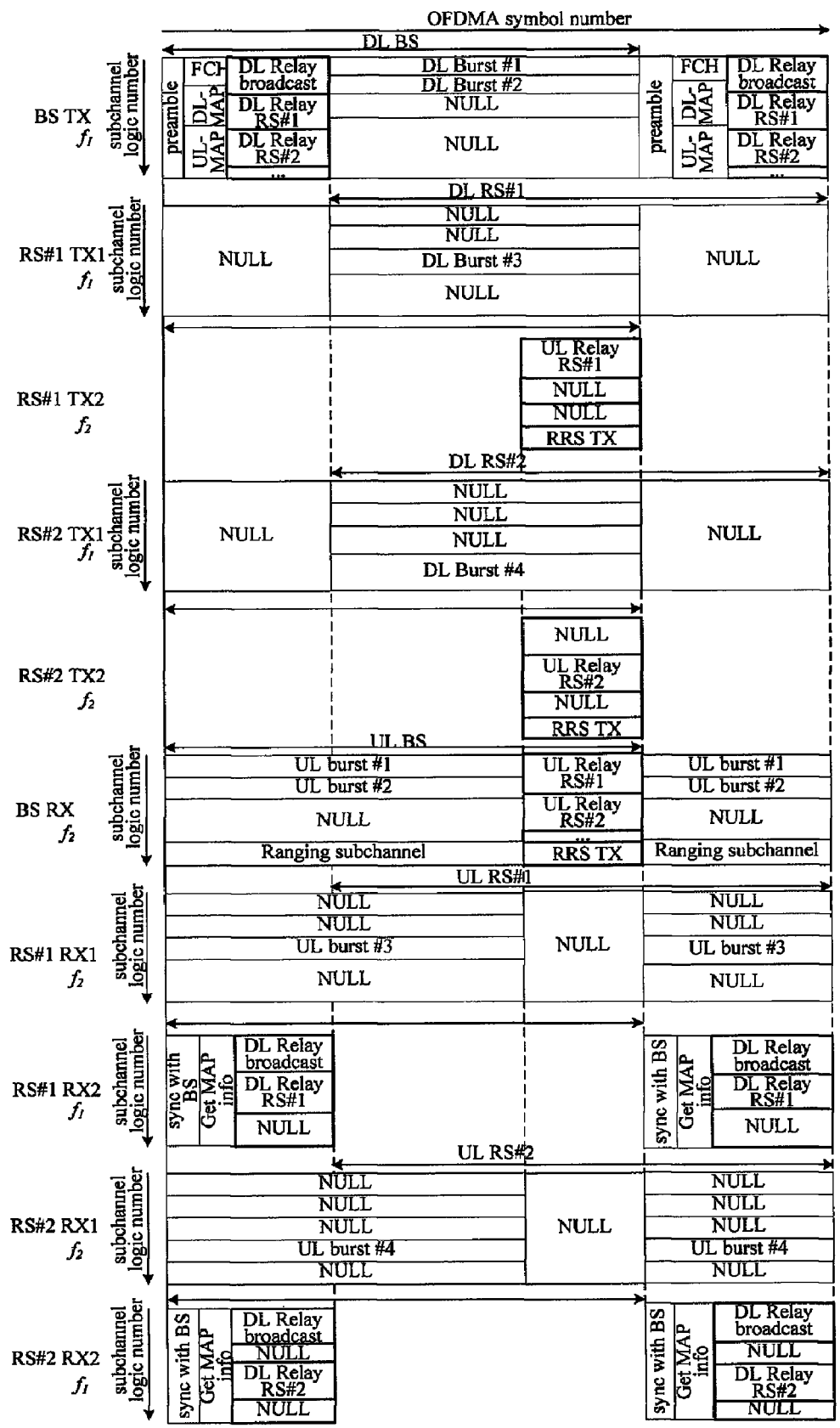
FIG. 36 is a schematic diagram illustrating the physical layer frame structure of the BS and RS under the fifth application scenario.

FIG. 35 and FIG. 36 illustrate a particular embodiment of the physical layer frame structures of BS and RS based on the above physical layer frame structures according to the invention. FIG. 35 shows a schematic diagram of the physical layer frame structures of BS and RS in an advanced relay mode, and FIG. 36 shows a schematic diagram of the physical layer frame structures of BS and RS in a simplified relay mode.

In FIGS. 35 and 36, the transmitting and receiving frequencies of BS and RS are shown in the leftmost of the Figures. The NULL or blank portions represent the parts in which no reception or transmission is arranged.

The particular frame structures in FIGS. 35 and 36 are described as follows.

The portions represented by Preamble, DL-MAP, UL-MAP and FCH in the downlink sub-frame DLBS of BS and the downlink sub-frame DLRS of RS TX1 are the DL Headers, and the portions represented by white vertical slim blocks in the uplink sub-frame ULRS of RS RX2 are the DL Header RX.

The DL Relay Zone (i.e. DL Relay broadcast, DL Relay R#1, #2, . . . ) of BS is arranged to follow the DL Header of the downlink sub-frame DLBS of BS. The UL Relay Zone (i.e. UL Relay R#1, #2, . . . , and RRS TX) of BS is arranged at the end of the uplink sub-frame ULBS of BS. During the time periods corresponding to the UL Relay Zone of BS, an SS/MSBS or SS/MSRS does not arrange any combination of OFDMA symbols and transmitting subchannels, and an RS does not arrange any combination of OFDMA symbols and receiving subchannels. During the time periods corresponding to DL Relay Zone of BS, an RS does not arrange any combination of OFDMA symbols and transmitting subchannels.

PHY bursts are allocated with a set of adjacent subchannels and a set of OFDMA symbols. The BS and different RSs share the remaining portion of the downlink sub-frame by different combinations of OFDMA symbols and subchannels.

A particular implementation example of relay communication process based on the above physical layer frame structures of BS and RS according to the invention is provided. The relay communication process includes a downlink relay communication process from a BS to a subscriber station, and an uplink relay communication process from the subscriber station to the BS.

The downlink relay communication process of the relay communication process is first described. The downlink relay communication process includes two phases, i.e. a first phase including a communication process from BS to RS, and a second phase includes a communication process from RS to a subscriber station.

(I) The First Phase of Downlink Relay (BS→RS),

In the first phase of downlink relay, the processing in the advanced relay mode is same as that in the simplified relay mode, which is as follows:

1. BS transmits preamble in the first symbol of DL Header of the downlink sub-frame DLBS at frequency f1.

2. RS#1 receives the preamble in the DL Header of the downlink sub-frame DLBS of BS in the DL Header RX of RS RX2 at frequency f1, to keep synchronized with BS.

3. BS transmits FCH, DL-MAP, and UL-MAP information, after transmitting the preamble in DL Header of the downlink sub-frame DLBS at frequency f1.

4. RS#1 receives the FCH, DL-MAP, and UL-MAP information transmitted in DL Header of the downlink sub-frame DLBS in the DL Header RX at frequency f1 of RS RX2, to obtain the information about positions and utilization methods (profile) of the OFDMA symbols and subchannels in the uplink and downlink bursts of BS.

5. BS transmits a broadcast message(s) by using the DL Relay broadcast of the DL Relay Zone in the downlink sub-frame DLBS of BS at frequency f1.

6. BS transmits downlink relay communication data, i.e. traffic data, to RS#1 in the DL Relay RS#1 of the DL Relay Zone in the downlink sub-frame DLBS of BS at frequency f1.

7. RS#1 receives the broadcast message transmitted in the DL Relay broadcast of the DL Relay Zone of the downlink sub-frame DLBS of BS, in the DL RB at frequency f1 of RS RX2. The broadcast message may include a message to be relayed by RS#1.

8. RS#1 receives the downlink relay communication data, i.e. the traffic data, transmitted in the DL Relay RS#1 of the DL Relay Zone in the downlink sub-frame DLBS of BS, in the DL Relay Zone at frequency f1 of RS RX2.

(II) The Second Phase of Downlink Relay (RS→MS/SS)

The processing in the advanced relay mode in the second phase of downlink relay is as follows:

1. RS#1 TX1 transmits preamble in the first symbol of the DL Header (at frequency f1) of the downlink sub-frame DLRS.

2. MS/SS receives the preamble transmitted in the DL Header of the downlink sub-frame DLRS of RS#1 TX1, to keep synchronized with RS#1.

3. RS#1 TX1 transmits FCH, DL-MAP, and UL-MAP, after transmitting the preamble in DL Header of the downlink sub-frame DLRS at frequency f1. The FCH, DL-MAP, and UL-MAP of RS#1 may be transmitted by BS to RS#1 in the step 4 of the first phase of downlink relay.

4. MS/SS receives the FCH, DL-MAP, and UL-MAP transmitted in DL Header of the downlink sub-frame DLRS of RS#1 TX1, to obtain the information about positions and utilization methods (profile) of OFDMA symbols and/or subchannels of the uplink and downlink bursts of RS#1 TX1.

5. RS#1 TX1 transmits the downlink relay communication data, i.e. the traffic data, to MS/SS, in the time and frequency zones, except for the DL Header and DL Relay Zone, in the downlink sub-frame DLRS at frequency f1. The downlink relay communication data is transmitted to RS#1 by BS in step 6 of the first phase of downlink relay.

6. MS/SS receives the downlink relay communication data, i.e. the traffic data, transmitted in the downlink sub-frame DLRS of RS#1 TX1 in the corresponding time and frequency zones.

The processing in the simplified relay mode in the second phase of downlink relay is as follows:

1. MS/SS receives the preamble transmitted in the DL Header of the downlink sub-frame DLBS of BS, to keep synchronized with BS.

2. MS/SS receives the FCH, DL-MAP, and UL-MAP information transmitted in DL Header of the downlink sub-frame DLBS of BS, to obtain the information about positions and utilization methods (profile) of OFDMA symbols and sub-channels of the uplink and downlink bursts of BS and RS#1.

3. RS#1 TX1 transmits the downlink relay communication data, i.e. the traffic data, to MS/SS, in the time and frequency zones, except for the DL Header and DL Relay Zone, in the downlink sub-frame DLRS at frequency f1. The downlink relay communication data is transmitted to RS#1 by BS in step 6 of the first phase.

4. MS/SS receives the downlink relay communication data, i.e. the traffic data, transmitted in the downlink sub-frame DLRS of RS#1 TX1 in the corresponding time and frequency zones.

The uplink relay communication process is described below. Similarly, the uplink relay communication process also includes two phases, i.e. a first phase including a communication process from a subscriber station to RS, and a second phase includes a communication process from RS to BS.

(I) The First Phase of Uplink Relay (MS/SS→RS)

The processing in the first phase of uplink relay in the advanced relay mode is as follows.

1. MS/SS receives the FCH, DL-MAP, and UL-MAP transmitted in DL Header (at frequency f1) of the downlink sub-frame DLRS of RS#1 TX1, to obtain the information about positions and utilization methods (profile) of OFDMA symbols and/or subchannels of the uplink and downlink bursts of RS#1 TX1.

2. MS/SS transmits uplink communication data, i.e. the traffic data, to RS#1, in the uplink sub-frame ULRS (except for the time and frequency zones corresponding to UL Relay Zone of BS) of RS RX1 at frequency f2.

3. RS#1 RX1 receives the uplink communication data, i.e. the traffic data, transmitted in the uplink sub-frame ULRS by MS/SS in the corresponding time and frequency zones at frequency f2.

The processing in the first phase of uplink relay in the simplified relay mode is as follows.

1. MS/SS receives the FCH, DL-MAP, and UL-MAP transmitted in DL Header of the downlink sub-frame DLBS of BS, to obtain the information about positions and utilization methods (profile) of OFDMA symbols and subchannels of the uplink and downlink bursts of BS and RS#1 TX1.

2. MS/SS transmits uplink communication data, i.e. the traffic data, to RS#1, at frequency f2 in the uplink sub-frame ULRS (except for the time and frequency zones corresponding to UL Relay Zone of BS) of RS RX1.

3. RS#1 RX1 receives the uplink communication data, i.e. the traffic data, transmitted in the uplink sub-frame ULRS by MS/SS, via the corresponding time and frequency zones at frequency f2.

(II) The Second Phase of the Uplink Relay (RS→BS)

In the second phase of the uplink relay, the processing in the advanced relay mode is the same as that in the simplified relay mode. The second phase of the uplink relay is as follows.

1. RS#1 RX2 receives the FCH, DL-MAP, and UL-MAP transmitted in DL Header (at frequency f1) of the downlink sub-frame DLBS, to obtain the information about positions and utilization methods (profile) of OFDMA symbols and subchannels of the uplink and downlink bursts of BS.

2. RS#1 TX2 transmits the uplink relay communication data, i.e. the traffic data, to BS, in UL Relay RS#1 of UL Relay Zone in the downlink sub-frame DLRS of RS at frequency f2. The uplink relay communication data is transmitted to RS#1 by MS/SS in step 2 of the first phase of uplink relay.

3. BS receives the uplink communication data, i.e. the traffic data in Step 2, in UL Relay RS#1 of UL Relay Zone in the uplink sub-frame ULBS of BS at frequency f2.

The Sixth Application Scenario: each RS includes a single FDD radio transceiver, and the RS transfers information via relay timeslots.

FIGS. 16, 17 and 2 illustrate a relay communication method and system including RS, BS, and MS/SS. FIG. 16 illustrates the case of single RS for downlink, FIG. 17 illustrates the case of single RS for uplink, and FIG. 2 illustrates the case of multiple RSs. In the communication system model, FDD/TDM/TDMA technique is employed to implement communication between an RS, a BS and an MS/SS.

A frequency f1 is employed for downlink communication of BS and uplink communication of RS, and a frequency f2 is employed for uplink communication of BS and downlink communication of RS. An RS accesses a BS as an MS/SS, and an MS/SS accesses a BS via the wireless relay of an RS. In the FDD mode, there may be interferences as shown in the four cases illustrated in FIGS. 37 (a)-(d) in the network system communication. In the FIG. 37, TX represents a transmitting module, and RX represents a receiving module.

For convenience in description, in FIGS. 2, 16 and 17, the coverage of a BS and an RS is divided into 3 regions including:

1. Region 1: downlink covered by only the BS, in which there is no interference from an RS to an MS/SS (e.g. an MSBS in FIG. 16) of the BS;

2. Region 3, downlink covered by only an RS, in which there is no interference from the BS to an MS/SS (e.g. an MSRS in FIG. 16) of the RS;

3. Region 2: downlink covered by both of the BS and an RS, in which there are interference from the RS to an MSBS and the interference from the BS to an MSRS. In FIG. 16, the overlapped region covered by both the BS and RS1 is the region 2 of RS1, and the overlapped region covered by both the BS and BS2 is the region 2 of RS2.

The coverage of an RS and a BS in the three communication system models as shown in FIGS. 2, 16 and 17 may be also divided into 3 regions including:

1. Region 11: uplink covered by only a BS, in which there is no interference from an MS/SS to the BS;

2. Region 33, uplink covered by only an RS, in which there is no interference from an MSRS to the RS;

3. Region 22: uplink covered by both of the BS and the RS, in which there are interference from an MSBS to the RS and the interference from an MSRS to the BS. In FIG. 17, the overlapped region covered by both the BS and RS1 is the region 22 of RS1, and the overlapped region covered by both the BS and BS2 is the region 22 of RS2.

Figure 38:
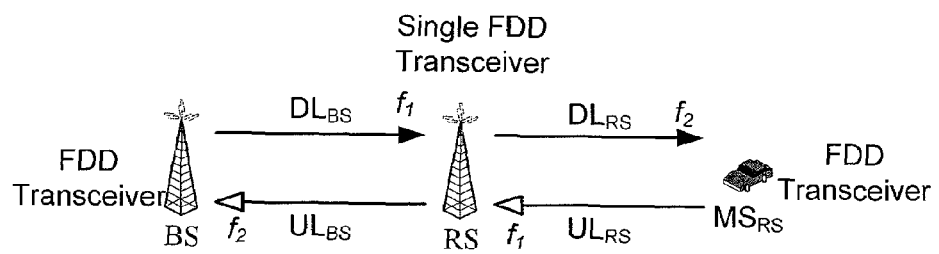
FIG. 38 is a schematic diagram illustrating an advanced relay communication mode of BS and RS, MS/SS under a sixth application scenario.

FIG. 38 illustrates an advanced relay communication mode of RS, BS, and MS/SS according to the invention. In the advanced relay communication mode, an RS and a BS, an MS/SS communicate with each other by FDD/TDM/TDMA. The frequency f1 is employed for downlink communication of BS and uplink communication of RS, and the frequency f2 is employed for uplink communication of BS and downlink communication of RS. An RS accesses a BS as an MS/SS, and an MS/SS accesses a BS via the wireless relay of an RS.

As shown in FIG. 38, an RS requires only one FDD radio transceiver. DLBS represents a downlink frame of the physical layer frame structure of BS, from BS to SS/MSBS or RS, and ULBS represents an uplink frame of the physical layer frame structure of BS, from SS/MSBS or RS to BS, for which the SS/MSBS and BS are required to keep frame synchronization with each other in transmission and reception. DLRS represents a downlink frame of the physical layer frame structure of RS, from RS to SS/MSRS (a subscriber station within the coverage of RS). ULRS represents an uplink frame of the physical layer frame structure of RS, from SS/MSRS to RS, for which the SS/MSRS and the RS are required to keep frame synchronization with each other in transmission and reception.

Figure 39:
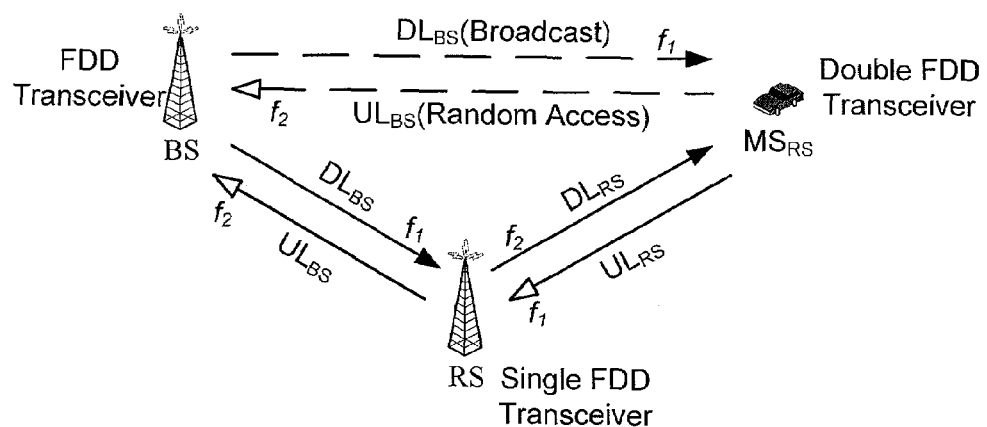
FIG. 39 is a schematic diagram illustrating a simplified relay communication mode of BS and RS, MS/SS under the sixth application scenario.

FIG. 39 illustrates a simplified relay communication mode of RS, BS, and MS/SS. In the simplified relay communication mode, the frequency f1 is employed for downlink communication of BS and uplink communication of RS, and the frequency f2 is employed for uplink communication of BS and downlink communication of RS. An RS requires only one FDD radio transceiver. DLBS represents a downlink frame of the physical layer frame structure of BS, from BS to SS/MSBS or RS, and ULBS represents an uplink frame of the physical layer frame structure of BS, from SS/MSBS or RS to BS, for which the SS/MSBS or SS/MSRS and BS are required to keep frame synchronization with each other in transmission and reception. DLRS represents a downlink frame of the physical layer frame structure of RS, from RS to SS/MSRS. ULRS represents an uplink frame of the physical layer frame structure of RS, from SS/MSRS to RS. The downlink Broadcast Bursts of DLBS, such as Preamble, FCH, DL-MAP, and UL-MAP, are directly transmitted to MS/SSRS by BS, without the relay of RS. The uplink Random Access timeslots (or referred to as Contention Slots) of ULBS, such as initial ranging contention timeslot and bandwidth request contention timeslot, are directly transmitted to BS by MS/SS, without the relay of RS. Other downlink bursts of DLBS, such as data packets or message packets except for DL-MAP and UL-MAP, can not be directly transmitted to MS/SSRS by BS, but are required to be relayed by RS. Other uplink timeslots of ULBS, except for initial ranging contention timeslot and bandwidth request contention timeslot, can not be directly transmitted to BS by MS/SSRS, but are required to be relayed by RS.

Figure 40:
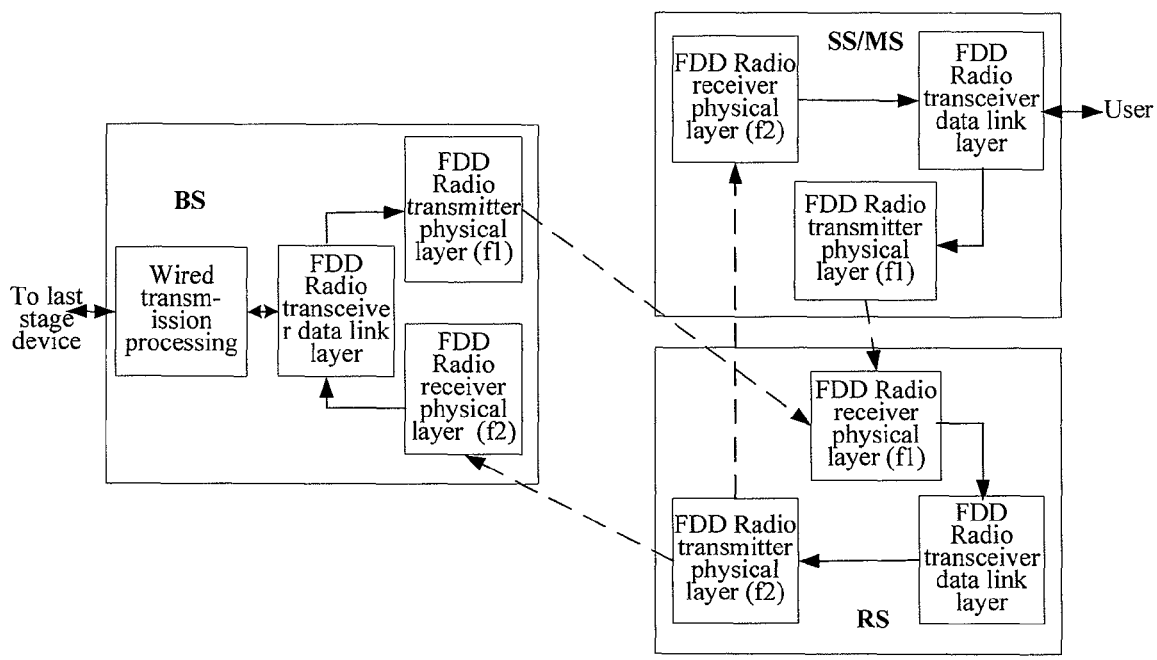
FIG. 40 is a schematic diagram illustrating the functional structure of a relay communication system of BS and RS, MS/SS under the sixth application scenario.

FIG. 40 shows a relay communication system including BS, RS, and SS/MS according to the invention.

In the relay communication system as shown in FIG. 40, the BS includes:

a wired transmission processing unit, capable of establishing communication with an upper stage apparatus (such as a base station controller) or with a set of base stations, and exchanging information with the base station controller or the set of base stations;

an FDD radio transceiver, adapted to communicate wirelessly with an RS or SS/MS in a FDD manner. The FDD radio transceiver includes an FDD radio transmitter physical layer unit, an FDD radio receiver physical layer unit, and an FDD radio transceiver data link layer unit.

The FDD radio transmitter physical layer unit (frequency 1) is adapted to communicate with the data link layer unit of the FDD radio transceiver and wirelessly with an FDD radio receiver physical layer unit of the RS or SS/MSBS capable of communicating with the BS.

The FDD radio receiver physical layer unit (frequency f2) is adapted to communicate with the data link layer unit of the FDD radio transceiver and wirelessly with an FDD radio transmitter physical layer unit of the RS or SS/MSBS capable of communicating with the BS.

The FDD radio transceiver data link layer unit is adapted to perform an FDD radio transceiver data link layer processing on the data received from the FDD radio receiver physical layer unit, and forward the processed data to the wired transmission processing unit.

As shown in FIG. 40, the RS includes:

an FDD radio transceiver, adapted to communicate wirelessly with a BS or SS/MS in an FDD manner. The FDD radio transceiver includes an FDD radio transmitter physical layer unit, an FDD radio receiver physical layer unit, and an FDD radio transceiver data link layer unit.

The FDD radio transmitter physical layer unit (frequency f2) is adapted to communicate with the data link layer unit of the FDD radio transceiver of the RS and wirelessly with the FDD radio receiver physical layer unit of the BS or SS/MS capable of communicating with the RS.

The FDD radio receiver physical layer unit (frequency f1) is adapted to communicate with the data link layer unit of the FDD radio transceiver of the RS and wirelessly with the FDD radio transmitter physical layer unit of the BS or SS/MS capable of communicating with the RS.

The FDD radio transceiver data link layer unit is adapted to perform an FDD radio transceiver data link layer processing on the data received from the FDD radio receiver physical layer unit, and forward the processed data to the FDD radio transmitter physical layer unit.

The SS/MS includes:

an FDD radio transceiver, adapted to communicate wirelessly with an RS or BS in an FDD manner. The FDD radio transceiver includes an FDD radio transmitter physical layer unit, an FDD radio receiver physical layer unit, and an FDD radio transceiver data link layer unit.

The FDD radio transmitter physical layer unit (frequency f1) is adapted to communicate with the data link layer unit of the FDD radio transceiver and wirelessly with the FDD radio receiver physical layer unit of the RS capable of communicating with the SS/MS.

The FDD radio receiver physical layer unit (frequency f2) is adapted to communicate with the data link layer unit of the FDD radio transceiver and wirelessly with the FDD radio transmitter physical layer unit of the RS capable of communicating with the SS/MS.

The FDD radio transceiver data link layer unit is adapted to perform an FDD radio transceiver data link layer processing on the data received from the FDD radio receiver physical layer unit or a user, and forward the processed data to the user or the FDD radio transmitter physical layer unit.

To implement the relay communication based on RS, the physical layer frame structures of BS and RS are required to be arranged appropriately, thereby ensuring a reliable relay communication, and effectively preventing various possible interferences as shown in FIG. 7.

To implement the relay communication based on RS, 3 implementation solutions of the physical layer frame structures of BS and RS according to the invention are provided. The examples of the 3 implementation solutions are described below.

In implementation solution 1, the physical layer frame structures of BS and RS may be defined as follows:

1. A downlink relay zone, DL Relay Zone, is arranged in the downlink frame DLBS of frequency f1 of the physical layer frame structure of BS, to define BS downlink relay data timeslots from BS to RS. In the case of multiple RSs as shown in FIG. 6, the multiple RSs share the DL Relay Zone by TDM.

2. A downlink relay zone, DL Relay Zone, is arranged in the physical layer frame structure of the FDD radio receiver RX (frequency f1) of RS, to define the relay data timeslots in the DL Relay Zone of BS received by RS. In the case of multiple RSs as shown in FIG. 6, the multiple RSs share the DL Relay Zone by TDM.

3. An uplink relay zone, UL Relay Zone, is arranged in the uplink frame ULBS of frequency f2 of the physical layer frame structure of BS, to define BS uplink relay data timeslots from RS to BS. In the case of multiple RSs as shown in FIG. 6, the multiple RSs share the UL Relay Zone by TDM.

4. An uplink relay zone, UL Relay Zone, is arranged in the physical layer frame structure of the FDD radio transmitter TX (frequency f2) of RS, to define the relay data timeslots in the UL Relay Zone of BS from RS to BS. In the case of multiple RSs as shown in FIG. 6, the multiple RSs share the UL Relay Zone by TDM.

5. The timeslots and frequency of the DL Relay Zone of BS have a one-to-one correspondence with those in the DL Relay Zone of RS RX, and the timeslots and frequency of the UL Relay Zone of BS have a one-to-one correspondence with those in the UL Relay Zone of RS TX.

6. During the time period corresponding to the UL Relay Zone of BS, an SS/MSBS may not arrange any transmitting timeslot to prevent the interference from SS/MSBS to RS and the interference from SS/MSRS to BS. During the time period corresponding to the DL Relay Zone of BS, an SS/MSRS may not arrange any transmitting timeslot to prevent the interference from SS/MSRS to RS.

7. A downlink relay broadcast timeslot, i.e. DL Relay Broadcast Slot (DL RB), is arranged in the DL Relay Zone of the downlink sub-frame DLBS (frequency f1) of the physical layer frame structure of BS, to define the downlink timeslots broadcasted by BS to RS, to broadcast the DCD, UCD, FPC, and CLK_CMP broadcast messages defined in the 802.16 standard.

8. A downlink relay broadcast receiving timeslot, i.e. DL Relay Broadcast RX Slot (DL RB RX), is arranged in the DL Relay Zone in the ULRS of the physical layer frame structure of the second set radio receiver RX (frequency f1) of RS, to define the uplink timeslots of RS for receiving the downlink broadcast timeslots of BS, to receive the DCD, UCD, FPC, and CLK_CMP broadcast messages defined in the 802.16 standard.

9. A downlink interference timeslot, i.e. DL Interference Slot, is arranged in the downlink frame DLBS (frequency f1) of the physical layer frame structure of BS, to define the BS downlink data timeslots of the downlink coverage of BS, i.e. "region 2".

10. A downlink interference timeslot, i.e. DL Interference Slot, is arranged in the downlink frame DLRS of the physical layer frame structure of the FDD radio transmitter TX (frequency f2) of RS, to define the RS downlink data timeslots of the downlink coverage of RS, i.e. "region 2". In the case of multiple RSs as shown in FIG. 6, the multiple RSs share the DL Interference Slot by TDM, to prevent the interference from RS to SS/MSRS.

11. The DL Interference Slot of BS may not be overlapped with that of RS TX in timeslots, to prevent the interference from SS/MSBS to SS/MSRS.

12. A downlink header timeslot, i.e. DL Header Slot, is arranged in the downlink frame DLBS (frequency f1) of the physical layer frame structure of BS, as the beginning of the downlink timeslot, to define timeslots for transmitting user synchronization information and timeslots for transmitting indication information indicating the positions and utilization method (i.e. profile) of the timeslots of uplink and downlink frames of the physical layer frame structure of BS. The synchronization information and indication information include the preamble, FCH burst, and one or more downlink Bursts of an existing 802.16 OFDM or SC (Single Carrier) frame. The downlink Burst is specified by DLFP (Downlink Frame Prefix) and subsequently follows FCH (Frame Control Header), and includes DL-MAP and UL-MAP. Furthermore, SS/MSBS, RS and BS keep frame synchronization with each other in transmission and reception.

13. In the advanced relay mode, a downlink header timeslot, i.e. DL Header Slot, is arranged in the DLRS of the downlink frame DLRS in the physical layer frame structure of the TX (frequency f2) of RS, as the beginning of the downlink timeslot, to define timeslots for transmitting user synchronization information and timeslots for transmitting indication information indicating the positions and utilization method (i.e. profile) of the timeslots of uplink and downlink frames of the physical layer frame structure of RS. The synchronization information and indication information include the preamble, FCH burst, and one or more downlink Bursts of an existing 802.16 OFDM or SC (Single Carrier) frame. The downlink Burst is specified by DLFP (Downlink Frame Prefix) and subsequently follows FCH, and includes DL-MAP and UL-MAP. Furthermore, SS/MSRS and RS keep frame synchronization with each other in transmission and reception.

14. In the advanced relay mode, the DL Header Slot of RS TX lags behind that of BS in time with the DL Header Slot of BS.

15. In the advanced relay mode, the DL Header Slot of an RS TX may not be overlapped with the DL Header Slot and DL Interference Slot of the downlink frame DLRSs in the physical layer frame structure of other RS TX, to prevent the interference from RS to SS/MSRS. In special cases that the DL Header Slots of different RSs are overlapped in time, they are required to be overlapped with each other entirely, keep rigorously synchronized with each other, and contain the same contents, to prevent the interference from RS to SS/MSRS.

16. A downlink header receiving timeslot, i.e. DL Header RX Slot, is arranged in the physical layer frame structure of the RX (frequency f1) of RS, to define timeslots for receiving the DL Header Slot of BS.

17. The DL Header Slot of BS and the DL Header RX Slot of RS are required to be overlapped entirely with each other and to be rigorously synchronized with each other.

18. An uplink interference timeslot, i.e. UL Interference Slot, is arranged in the uplink frame ULBS (frequency f2) in the physical layer frame structure of BS, to define the BS uplink data timeslots of the uplink coverage of BS, i.e. "region 22".

19. An uplink interference timeslot, i.e. UL Interference Slot, is arranged in the uplink frame ULRS in the physical layer frame structure of RX (frequency f1) of RS, to define the RS uplink data timeslots of the uplink coverage of RS, i.e. "region 22". In the case of multiple RSs as shown in FIG. 6, the multiple RSs share the UL Interference Slot by TDM, to prevent the interference from SS/MSRS to RS.

20. The DL Interference Slot of BS may not be overlapped with the UL Interference Slot of RS RX in timeslots, to prevent the interference from SS/MSRS to SS/MSBS.

21. An uplink contention timeslot, i.e. UL Contention Slot, is arranged in the uplink frame ULBS (frequency f2) in the physical layer frame structure of BS. The UL Contention Slot includes the initial ranging contention timeslot and bandwidth request contention timeslot in an existing 802.16 OFDM (or SC) frame.

22. In the advanced relay mode, an uplink contention timeslot, i.e. UL Contention Slot, is also defined in the uplink frame ULRS in the physical layer frame structure of the RX (frequency f1) of RS. The UL Contention Slot of RS also includes the initial ranging contention timeslot and bandwidth request contention timeslot in an existing 802.16 OFDM (or SC) frame.

23. An uplink contention transmitting timeslot, i.e. UL Contention TX Slot, is arranged in the physical layer frame structure of the TX (frequency f2) of RS, to define the timeslots to be transmitted by RS for contending for timeslots within the UL Contention Slot of BS.

24. The UL Contention Slot of BS and the UL Contention TX Slot of RS TX2 are required to be overlapped with each other entirely in time and frequency, and keep rigorously synchronized with each other.

25. In the above defined physical layer frame structures, the above defined Slots or Zones are not necessarily included in each frame, except for the DL Header Slot and UL Contention Slot.

Figure 41:
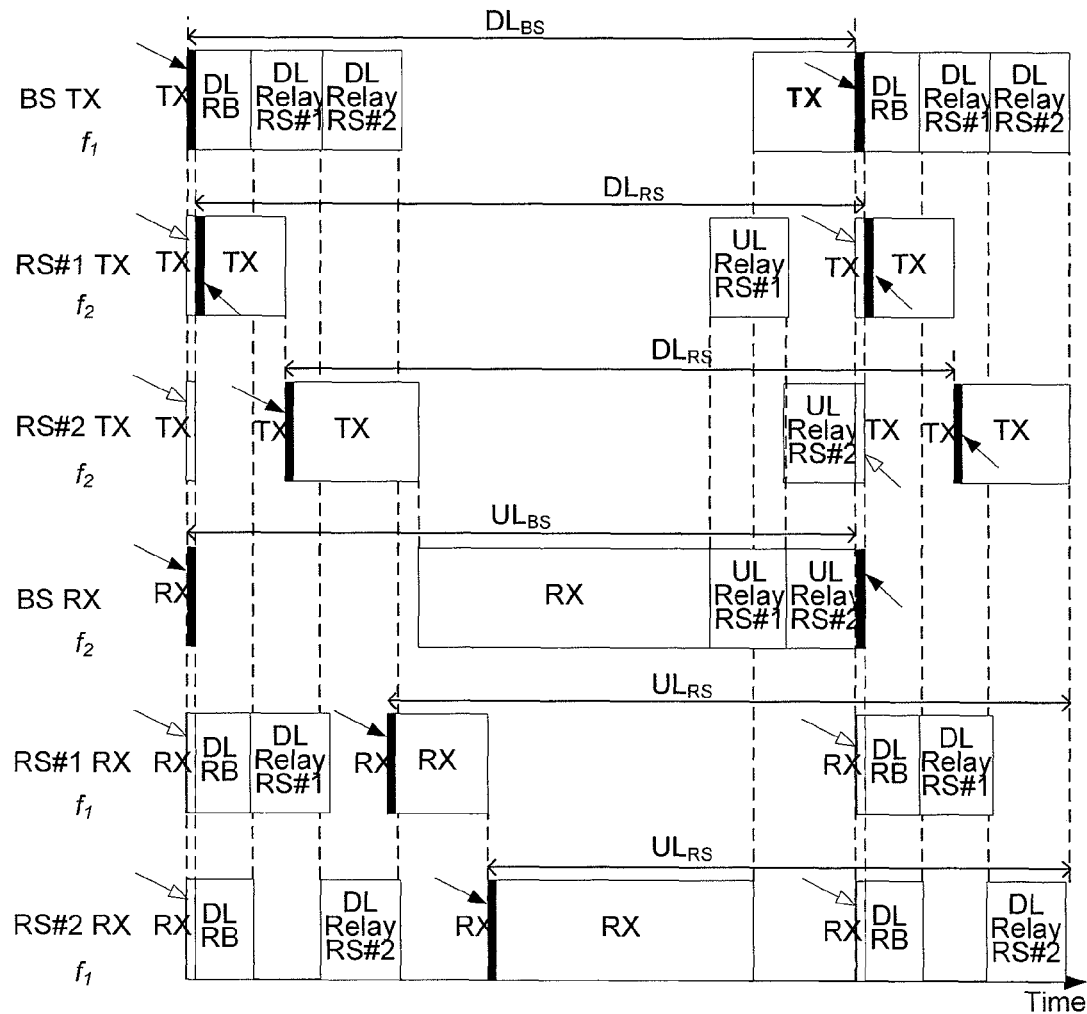
FIG. 41 is a schematic diagram illustrating the physical layer frame structure of the BS and RS in an advanced relay communication mode in solution 1 under the sixth application scenario.
Figure 42:
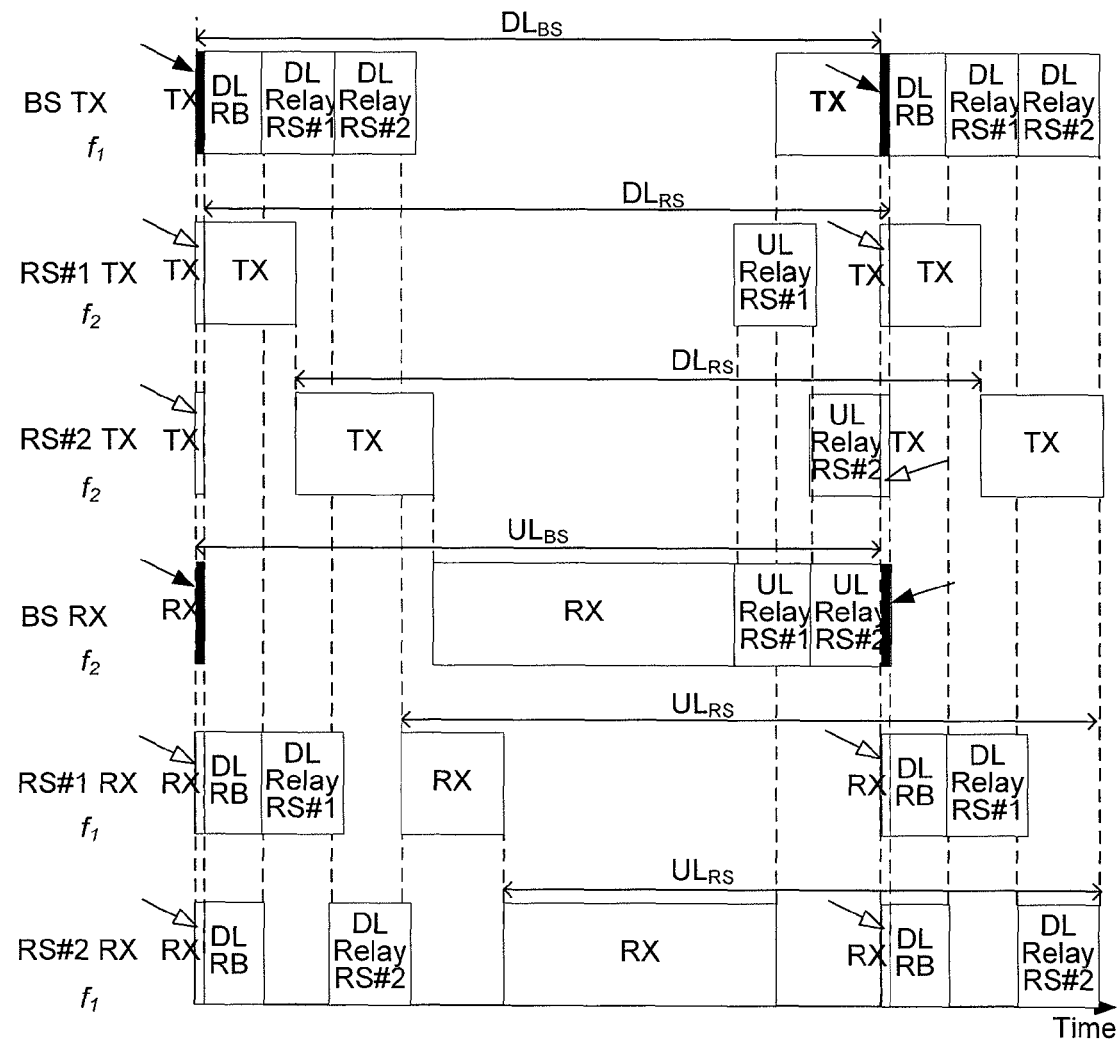
FIG. 42 is a schematic diagram illustrating the physical layer frame structure of the BS and RS in a simplified relay communication mode in solution 1 under the sixth application scenario.

FIGS. 41 and 42 illustrate a particular embodiment of the physical layer frame structures of BS and RS according to the above described physical layer frame structure schemes according to the invention. FIG. 41 is a schematic diagram showing the physical layer frame structures of BS and RS in an advanced relay mode, and FIG. 42 is a schematic diagram showing the physical layer frame structures of BS and RS in a simplified relay mode. In FIGS. 41 and 42, the transmitting and receiving frequencies of RS and BS are represented by the frequencies as shown at the leftmost of the Figures.

The particular frame structures as shown in FIGS. 41 and 42 are described below.

The black timeslots indicated by black arrows in downlink frame DLBS of BS and downlink frame DLRS of RS TX represent DL Header Slots. The black timeslots indicated by black arrows in uplink frame ULBS of BS and uplink frame ULRS of RS RX represent UL Contention Slots. The white timeslot TX indicated by white arrow in RS TX represents a UL Contention TX Slot. The white timeslot RX indicated by white arrow of RS RX is a DL Header RX Slot.

The timeslot "TX" in downlink frame DLBS of BS is a DL Interference Slot (BS downlink coverage of region 2). The timeslot "RX" in uplink frame ULBS of BS is a UL Interference Slot (B uplink coverage of region 22). The timeslot "TX" in downlink frame DLRS of RS TX is a DL Interference Slot (for RS downlink coverage of region 2). The timeslot "RX" in uplink frame ULRS of RS RX is a UL Interference Slot (RS uplink coverage of region 22).

The DL Relay Zone of BS follows the DL Header Slot of the downlink frame DLBS of BS, and the UL Relay Zone of BS follows the UL Contention Slot of the uplink frame ULBS of BS. The timeslots of DL Relay Zone of BS have a one-to-one correspondence with those of DL Relay Zone of RS RX, and the timeslots of UL Relay Zone of BS have a one-to-one correspondence with those of UL Relay Zone of RS TX. During the time periods corresponding to the UL Relay Zone of BS, an SS/MSBS does not arrange any transmitting timeslot. During the time periods corresponding to the DL Relay Zone of BS, an SS/MSRS does not arrange any transmitting timeslot.

The DL Interference Slot of BS may not be overlapped with the UL Interference Slot of RS RX in timeslots, and the UL Interference Slot of BS may be not overlapped with the DL Interference Slot of RS TX in timeslots.

In the case of multiple RSs as shown in FIG. 6, the multiple RSs share, by TDM, the DL Relay Zone (i.e. DL RB, DL Relay R#1, #2, . . . , etc. in FIG. 6), UL Relay Zone (i.e. UL Relay R#1, #2, . . . etc.), DL Interference Slot and UL Interference Slot.

In implementation solution 2, the physical layer frame structures of BS and RS may be defined as follows:

Compared with the features 1-25 described above in the implementation solution 1, the implementation solution 2 is different from the implementation solution 1 in one feature which is as follows.

14. In the advanced relay mode, the DL Header Slot of RS TX lags behind that of BS in time, and is not overlapped with that of BS. The DL Header Slot of RS TX is required to be within the time period corresponding to a DL Non-Interference Slot of the uplink frame ULBS in the physical layer frame structure of BS.

In addition, the implementation solution 2 has 6 additional features as follows, compared with the implementation solution 1.

26. A downlink non-interference timeslot, i.e. DL Non-Interference Slot, is arranged in the downlink frame DLBS (frequency f1) of the physical layer frame structure of BS, to define the BS downlink data timeslots of the downlink coverage "region 1" of BS.

27. A downlink non-interference timeslot, i.e. DL Non-Interference Slot, is arranged in the downlink frame DLRS of the physical layer frame structure of the TX (frequency f2) of RS, to define the RS downlink data timeslots of the downlink coverage "region 3" of RS.

28. The UL Non-Interference Slot of BS may be overlapped with the DL Non-Interference Slot of RS TX in timeslots.

29. An uplink non-interference timeslot, i.e. UL Non-Interference Slot, is arranged in the uplink frame ULBS (frequency f2) of the physical layer frame structure of BS, to define the BS uplink data timeslots of the uplink coverage "region 11" of BS.

30. An uplink non-interference timeslot, i.e. UL Non-Interference Slot, is arranged in the uplink frame ULRS of the physical layer frame structure of the FDD radio receiver RX (frequency f1) of RS, to define the RS uplink data timeslots of the uplink coverage "region 33" of RS.

31. The DL Non-Interference Slot of BS may be overlapped with the UL Non-Interference Slot of RS RX in timeslots.

Figure 43:
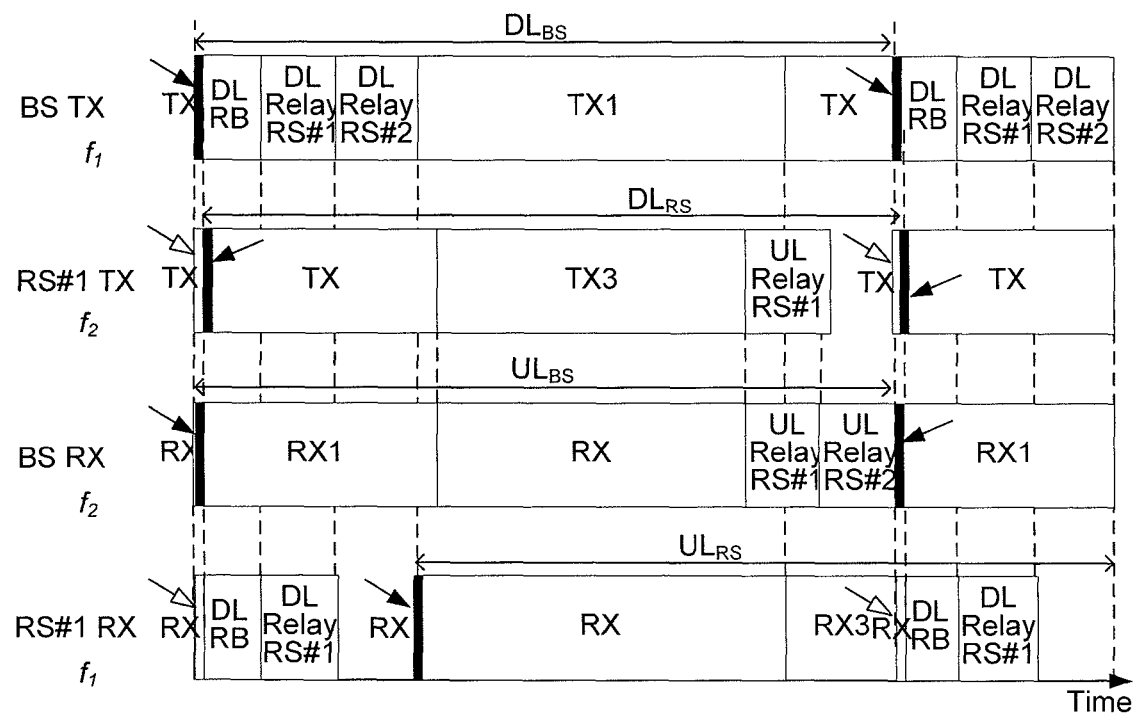
FIG. 43 is a schematic diagram illustrating the physical layer frame structure of the BS and RS in an advanced relay communication mode in solution 2 under the sixth application scenario.

FIG. 43 illustrates a particular embodiment of the physical layer frame structures of BS and RS in the advanced relay mode according to the above physical layer frame structures in the implementation solution 2. In FIG. 43, the transmitting and receiving frequencies of RS and BS are represented by the frequencies as shown at the leftmost of the Figure.

The particular frame structures as shown in FIG. 43 are described below.

The black timeslots indicated by black arrows in downlink frame DLBS of BS and downlink frame DLRS of RS TX represent DL Header Slots. The black timeslots indicated by black arrows in uplink frame ULBS of BS and uplink frame ULRS of RS RX represent UL Contention Slots. The white timeslot "TX" indicated by white arrow in RS TX represents a UL Contention TX Slot. The white timeslot "RX" indicated by white arrow in RS RX is a DL Header RX Slot.

In downlink frame DLBS of BS, the timeslot TX is a DL Non-Interference Slot (the downlink coverage "region 1" of BS), the timeslot TX is a DL Interference Slot (the downlink coverage "region 2" of BS). In uplink frame ULBS of BS, the timeslot RX is a UL Non-Interference Slot (the uplink coverage "region 11" of BS), the timeslot RX is a UL Interference Slot (the uplink coverage "region 22" of BS). In downlink frame DLRS of RS TX, the timeslot TX3 is a DL Non-Interference Slot (the downlink coverage "region 3" of RS), the timeslot TX is a DL Interference Slot (the downlink coverage "region 2" of RS). In uplink frame ULRS of RS RX, the timeslot RX3 is a UL Non-Interference Slot (the uplink coverage "region 33" of RS), the timeslot RX is a UL Interference Slot (the uplink coverage "region 22" of RS).

The DL Relay Zone of BS follows the DL Header Slot of the downlink frame DLBS of BS, and the UL Relay Zone of BS follows the UL Contention Slot of the uplink frame ULBS of BS. The timeslots of DL Relay Zone of BS have a one-to-one correspondence with those of DL Relay Zone of RS RX, and the timeslots of UL Relay Zone of BS have a one-to-one correspondence with those of UL Relay Zone of RS TX. During the time periods corresponding to the UL Relay Zone of BS, an SS/MSBS does not arrange any transmitting timeslot. During the time periods corresponding to the DL Relay Zone of BS, an SS/MSRS does not arrange any transmitting timeslot.

The DL Interference Slot of BS is not overlapped with the UL Interference Slot of RS RX in timeslots, and the UL Interference Slot of BS is not overlapped with the DL Interference Slot of RS TX in timeslots.

The physical layer frame structures in the simplified relay mode are different from those in the advance relay mode in that: there are not the DL Header Slot in the downlink sub-frame DLRS of RS TX and the UL Contention Slot in the uplink sub-frame ULRS of RS RX as shown in FIG. 43.

In the implementation solution 3, the physical layer frame structures of BS and RS may be defined as follows.

Compared with the features 1-31 in the implementation solution 2, the implementation solution 3 are different in the following 4 features:

9. A downlink interference timeslot, i.e. DL Interference Slot, is arranged in the downlink frame DLBS (frequency f1) in the physical layer frame structure of BS, to define the BS downlink data timeslots of the downlink coverage "region 2".

10. A downlink interference timeslot, i.e. DL Interference Slot, is arranged in the downlink frame DLRS of the physical layer frame structure of the FDD radio transmitter TX (frequency f2) of RS, to define the RS downlink data timeslots of the downlink coverage "region 2" of RS. In the case of multiple RSs as shown in FIG. 6, the multiple RSs share the DL Interference Slot by TDM, to prevent the interference from RS to SS/MSRS.

18. An uplink interference timeslot, i.e. UL Interference Slot, is arranged in the uplink frame ULBS (frequency f2) of the physical layer frame structure of BS, to define the BS uplink data timeslots of the uplink coverage "region 22" of BS.

19. An uplink interference timeslot, i.e. UL Interference Slot, is arranged in the uplink frame ULRS of the physical layer frame structure of RX (frequency f1) of RS, to define the RS uplink data timeslots of the uplink coverage "region 22" of RS. In the case of multiple RSs as shown in FIG. 2, the multiple RSs share the UL Interference Slot by TDM, to prevent the interference from SS/MSRS to RS.

Figure 44:
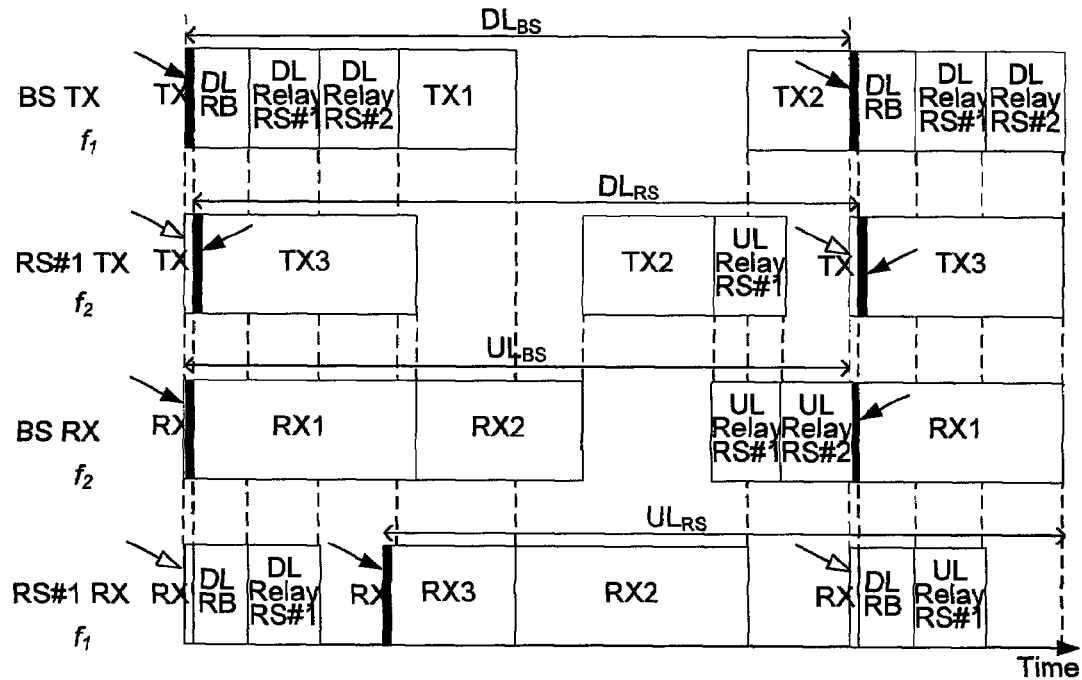
FIG. 44 is a schematic diagram illustrating the physical layer frame structure of the BS and RS in a simplified relay communication mode in solution 2 under the sixth application scenario.

FIG. 44 illustrates a particular embodiment of the physical layer frame structures of BS and RS in the advanced relay mode according to the implementation solution 3 of the physical layer frame structures. In FIG. 44, the transmitting and receiving frequencies of RS and BS are represented by the frequencies as shown at the leftmost of the Figure.

The black timeslots indicated by black arrows in downlink frame DLBS of BS and downlink frame DLRS of RS TX represent DL Header Slots. The black timeslots indicated by black arrows in uplink frame ULBS of BS and uplink frame ULRS of RS RX represent UL Contention Slots. The white timeslot "TX" indicated by white arrow in RS TX represents a UL Contention TX Slot. The white timeslot "RX" indicated by white arrow in RS RX is a DL Header RX Slot.

In downlink frame DLBS of BS, the timeslot TX is a DL Non-Interference Slot (the downlink coverage "region 1" of BS), the timeslot TX is a DL Interference Slot (the downlink coverage "region 2" of BS). In uplink frame ULBS of BS, the timeslot RX is a UL Non-Interference Slot (the uplink coverage "region 11" of BS), the timeslot RX is a UL Interference Slot (the uplink coverage "region 22" of BS). In downlink frame DLRS of RS TX, the timeslot TX3 is a DL Non-Interference Slot (the downlink coverage "region 3" of RS), the timeslot TX is a DL Interference Slot (the downlink coverage "region 2" of RS). In uplink frame ULRS of RS RX, the timeslot RX3 is a UL Non-Interference Slot (the uplink coverage "region 33" of RS), the timeslot RX is a UL Interference Slot (the uplink coverage "region 22" of RS).

The DL Relay Zone of BS follows the DL Header Slot of the downlink frame DLBS of BS, and the UL Relay Zone of BS follows the UL Contention Slot of the uplink frame ULBS of BS. The timeslots of DL Relay Zone of BS have a one-to-one correspondence with those of DL Relay Zone of RS RX, and the timeslots of UL Relay Zone of BS have a one-to-one correspondence with those of UL Relay Zone of RS TX. During the time periods corresponding to the UL Relay Zone of BS, an SS/MSBS does not arrange any transmitting timeslot. During the time periods corresponding to the DL Relay Zone of BS, an SS/MSRS does not arrange any transmitting timeslot.

The DL Interference Slot of BS is not overlapped with the UL Interference Slot of RS RX in timeslots, and the UL Interference Slot of BS is not overlapped with the DL Interference Slot of RS TX in timeslots. The UL Non-Interference Slot of BS is overlapped with the DL Non-Interference Slot of RS TX in timeslots as much as possible, and the DL Non-Interference Slot of BS is overlapped with the UL Non-Interference Slot of RS RX in timeslots as much as possible.

The physical layer frame structures in the simplified relay mode are different from those in the advance relay mode in that: there are not the DL Header Slot in the downlink sub-frame DLRS of RS TX and the UL Contention Slot in the uplink sub-frame ULRS of RS RX as shown in FIG. 44.

The invention further provides a processing flow of the relay communication system based on the above physical layer frame structures of BS and RS. The processing flow includes a downlink relay communication process from BS to a subscriber station, and an uplink relay communication process from a subscriber station to BS.

First, the downlink relay communication process from BS to a subscriber station is described. The downlink relay communication process includes two phases, i.e. a first phase including a communication process from BS to RS, and a second phase includes a communication process from RS to the subscriber station.

(I) The First Phase of Downlink Relay (BS→RS)

In the first phase of downlink relay, the relay process in the advanced relay mode is same as that in the simplified relay mode, which is as follows:

1. BS transmits preamble in the DL Header of the downlink sub-frame DLBS at frequency f1.

2. RS#1 receives the preamble in the DL Header of the downlink sub-frame DLBS of BS in the DL Header RX of the uplink sub-frame ULRS at frequency f1 of RS RX, to keep synchronized with BS.

3. BS transmits FCH, DL-MAP, and UL-MAP information, after transmitting the preamble in DL Header of the downlink sub-frame DLBS at frequency f1.

4. RS#1 receives the FCH, DL-MAP, and UL-MAP transmitted in DL Header of the downlink sub-frame DLBS in the DL Header RX of the uplink sub-frame ULRS at frequency f1 of RS RX, to obtain the information about positions and utilization methods (profile) of timeslots of the uplink and downlink bursts of BS.

5. BS transmits a broadcast message(s) in the DL Relay broadcast of the DL Relay Zone in the downlink sub-frame DLBS of BS at frequency f1.

6. BS transmits downlink relay communication data, i.e. traffic data, to RS#1 in the DL Relay RS#1 of the DL Relay Zone in the downlink sub-frame DLBS of BS at frequency f1.

7. RS#1 receives the broadcast message transmitted in the DL Relay broadcast of the DL Relay Zone of the downlink sub-frame DLBS of BS, in the DL RB at frequency f1 of RS RX. The broadcast message may include a message to be relayed by RS#1.

8. RS#1 receives the downlink relay communication data, i.e. the traffic data, transmitted in the DL Relay RS#1 of the DL Relay Zone in the downlink sub-frame DLBS of BS, in the DL Relay Zone at frequency f1 of RS RX.

(II) The Second Phase of Downlink Relay (RS→MS/SS)

The processing in the advanced relay mode is as follows:

1. RS#1 TX transmits preamble in the DL Header (at frequency f2) of the downlink sub-frame DLRS.

2. MS/SS receives the preamble transmitted in the DL Header of the downlink sub-frame DLRS of RS#1 TX, to keep synchronized with RS#1.

3. RS#1 TX transmits FCH, DL-MAP, and UL-MAP, after transmitting the preamble in DL Header of the downlink sub-frame DLRS at frequency f2. The FCH, DL-MAP, and UL-MAP of RS#1 may be transmitted by BS to RS#1 in the step 4 of the first phase of downlink relay).

4. MS/SS receives the FCH, DL-MAP, and UL-MAP transmitted in DL Header of the downlink sub-frame DLRS of RS#1 TX, to obtain the information about positions and utilization methods (profile) of timeslots of the uplink and downlink bursts of RS#1.

5. RS#1 TX transmits the downlink relay communication data, i.e. the traffic data, to MS/SS, in the time and frequency zones except for the DL Header and DL Relay Zone in the downlink sub-frame DLRS at frequency f2. The downlink relay communication data is transmitted to RS#1 TX by BS in step 6 of the first phase of downlink relay.

6. MS/SS receives the downlink relay communication data, i.e. the traffic data, transmitted in the downlink sub-frame DLRS of RS#1 TX via the corresponding time and frequency zones.

The processing in the simplified relay mode is as follows:

1. MS/SS receives the preamble transmitted in the DL Header of the downlink sub-frame DLBS of BS, to keep synchronized with BS.

2. MS/SS receives the FCH, DL-MAP, and UL-MAP transmitted in DL Header of the downlink sub-frame DLBS of BS, to obtain the information about positions and utilization methods (profile) of timeslots of the uplink and downlink bursts of BS and RS#1.

3. RS#1 TX transmits the downlink relay communication data, i.e. the traffic data, in the time and frequency zones except for the DL Header and DL Relay Zone in the downlink sub-frame DLRS at frequency f2. The downlink relay communication data is transmitted to RS#1 TX by BS in step 6 of the first phase of downlink relay.

4. MS/SS receives the downlink relay communication data, i.e. the traffic data, transmitted in the downlink sub-frame DLRS of RS#1 TX, in the corresponding time and frequency zones.

The uplink relay communication process is described below. Similarly, the uplink relay communication process also includes two phases, i.e. a first phase including a communication process from a subscriber station to RS, and a second phase includes a communication process from RS to BS.

(I) The First Phase (MS/SS→RS) of Uplink Relay

The processing in the advanced relay mode in first phase of uplink relay is as follows.

1. MS/SS receives the FCH, DL-MAP, and UL-MAP transmitted in DL Header (at frequency f2) of the downlink sub-frame DLRS of RS#1 TX, to obtain the information about positions and utilization methods (profile) of timeslots of the uplink and downlink bursts of RS#1 TX.

2. MS/SS transmits uplink communication data, i.e. the traffic data, to RS#1, in timeslot(s) except for the DL Header RX and UL Relay Zone in the uplink sub-frame ULRS of RS at frequency f1.

3. RS#1 RX receives the uplink communication data, i.e. the traffic data, transmitted in the uplink sub-frame ULRS by MS/SS in the corresponding timeslot(s) at frequency f1.

The processing in the simplified relay mode in first phase of uplink relay is as follows.

1. MS/SS receives the FCH, DL-MAP, and UL-MAP transmitted in DL Header of the downlink sub-frame DLBS of BS, to obtain the information about positions and utilization methods (profile) of timeslots of the uplink and downlink bursts of BS and RS#1.

2. MS/SS transmits uplink communication data, i.e. the traffic data, to RS#1, at frequency f1 in timeslot(s) except for the DL Header RX and UL Relay Zone in the uplink sub-frame ULRS of RS#1 RX.

3. RS#1 RX receives the uplink communication data, i.e. the traffic data, transmitted in the uplink sub-frame ULRS by MS/SS, in the corresponding timeslot(s) at frequency f1.

(II) The Second Phase of the Uplink Relay (RS→BS)

In the second phase of the uplink relay, the processing in the advanced relay mode is the same as that in the simplified relay mode. The second phase of the uplink relay is as follows.

1. RS#1 RX receives the FCH, DL-MAP, and UL-MAP transmitted in DL Header of the downlink sub-frame DLBS, in the DL Header RX Slot (at frequency f1) of the uplink sub-frame ULRS of RS, to obtain the information about positions and utilization methods (profile) of timeslots of the uplink and downlink bursts of BS.

2. RS#1 TX transmits the uplink relay communication data, i.e. the traffic data, to BS, in UL Relay RS#1 of UL Relay Zone in the downlink sub-frame DLRS of RS at frequency f2. The uplink relay communication data is transmitted to RS#1 by MS/SS in step 2 of the first phase.

3. BS receives the uplink communication data, i.e. the traffic data in the step 2 in UL Relay RS#1 of UL Relay Zone in the uplink sub-frame ULBS of BS at frequency f2.

Moreover, in the relay communication process according to the invention, the relay communication between BS, RS and SS/MS is based on the OFDM technology, to improve the capability of the communication system for preventing multipath disturbance.

The Seventh Application Scenario: each RS includes a single FDD radio transceiver, and the RS transfers information in relay timeslots. Each subscriber station includes two FDD radio transceivers corresponding to BS and RS respectively.

A wireless relay communication OFDMA system and method according to the invention is provided. FIG. 36 illustrates an advanced relay communication mode between RS, BS, and MS/SS. FDD/TDM/TDMA technique is employed to implement communication between an RS, a BS and an MS/SS. A frequency f1 is employed for downlink communication of BS and uplink communication of RS, and a frequency f2 is employed for uplink communication of BS and downlink communication of RS. Each RS requires only one FDD radio transceiver. An RS accesses a BS as an MS/SS, and an MS/SS accesses a BS via the wireless relay of an RS.

Figure 37:
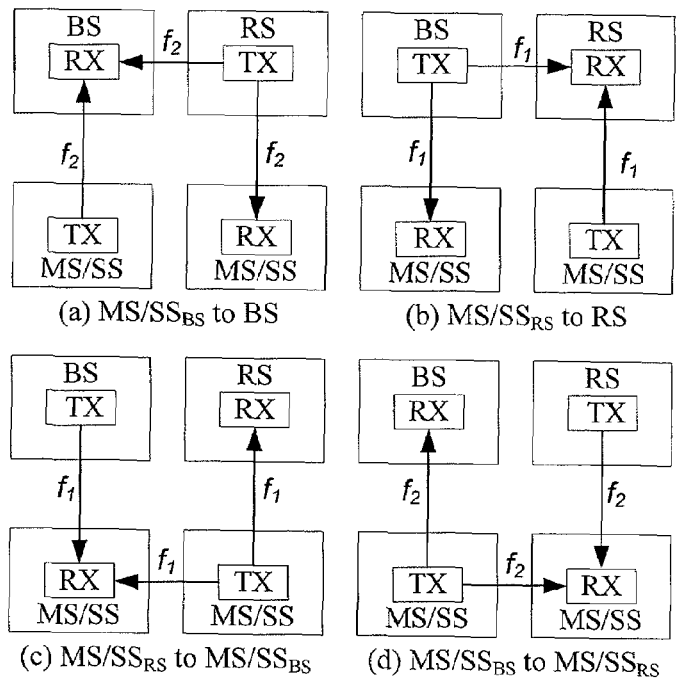
FIG. 37 is a schematic diagram illustrating a co-frequency interference mode possibly existing in a single-FDD-based communication system according to the invention.

FIG. 37 illustrates a simplified relay communication mode of RS, BS, and MS/SS according to the invention. The frequency f1 is employed for downlink communication of BS and uplink communication of RS, and the frequency f2 is employed for uplink communication of BS and downlink communication of RS. Each RS requires only one FDD radio transceiver.

The downlink Broadcast Bursts of DLBS, such as Preamble, FCH, DL-MAP, and UL-MAP, are directly transmitted to MS/SSRS by BS, without the relay of RS. The initial access ranging, periodic ranging and bandwidth request of MS/SS are directly transmitted to BS by MS/SS via the Ranging Subchannel of ULBS, without the relay of RS. Other downlink bursts of DLBS, such as data packets or message packets except for DL-MAP and UL-MAP, can not be directly transmitted to MS/SS by BS, but are required to be relayed by RS. Other uplink timeslots of ULBS, except for the initial access ranging, periodic ranging and bandwidth request messages of MS/SS, can not be directly transmitted to BS by MS/SS, but are required to be relayed by RS.

In the FDD mode, there may be interferences as shown in 4 cases of FIG. 18 (*a*)-(*d*) in the above advanced and simplified relay mode. IN the Figure, TX represents a transmitting module, and RX represents a receiving module.

Figure 45:
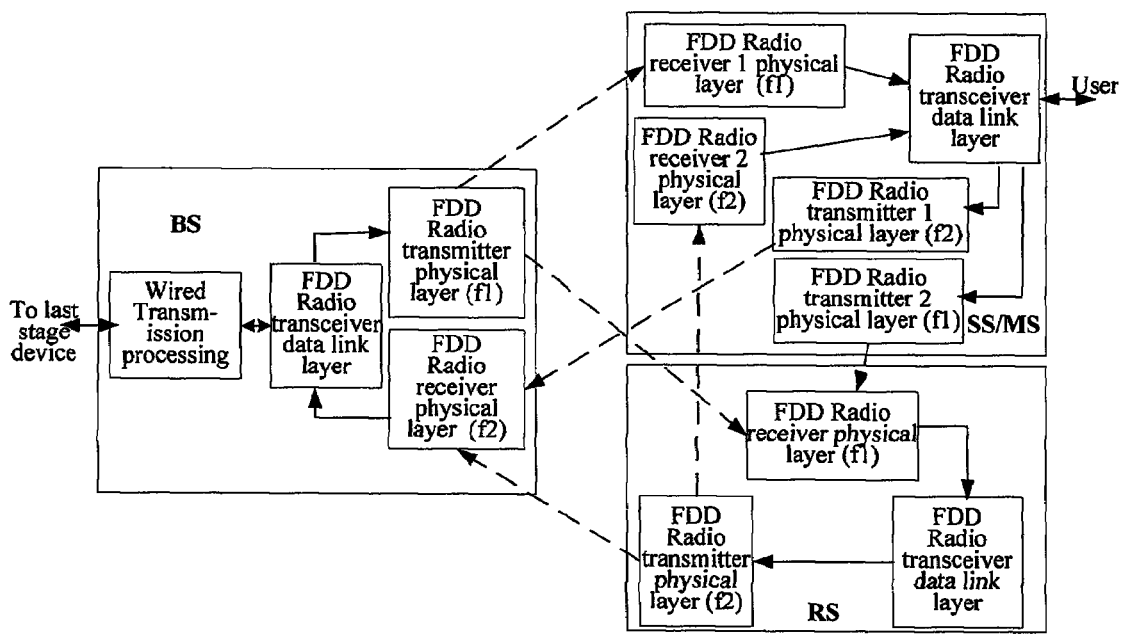
FIG. 45 is a schematic diagram illustrating the functional structure of a relay communication system of BS and RS, MS/SS under a seventh application scenario.

FIG. 45 shows the structure of a wireless relay communication OFDMA system including BS, RS, and SS/MS according to the invention.

In the system as shown in FIG. 45, the BS includes:

a wired transmission processing unit, capable of establishing communication with an upper stage apparatus (such as a base station controller) or with a set of base stations, and exchanging information with the base station controller or the set of base stations;

an FDD radio transceiver, adapted to communicate wirelessly with an RS or SS/MS in a FDD manner. The FDD radio transceiver includes an FDD radio transmitter physical layer unit, an FDD radio receiver physical layer unit, and an FDD radio transceiver data link layer unit.

The FDD radio transmitter physical layer unit (frequency 1) is adapted to communicate with the data link layer unit of the FDD radio transceiver and wirelessly with an FDD radio receiver physical layer unit of the RS capable of communicating with the BS or wirelessly with a physical layer unit of FDD radio receiver 1 of SS/MS capable of communicating with the BS. In the simplified relay mode, the FDD radio transmitter physical layer unit employs, for the downlink sub-frame header broadcast of DLBS (such as Preamble, FCH, DL-MAP, UL-MAP), a channel encoding and modulation scheme (such as Binary Phase Shift Keying, BPSK) more reliable than that for other transmission data, or employs a higher transmission power than for other transmission data. The BS directly transmits the downlink sub-frame header broadcast of DLBS to the MS/SS without the relay of RS.

The FDD radio receiver physical layer unit (frequency f2) is adapted to communicate with the data link layer unit of the FDD radio transceiver and wirelessly with an FDD radio transmitter physical layer unit of the RS capable of communicating with the BS or wirelessly with a physical layer unit of FDD radio transmitter 1 of SS/MS capable of communicating with the BS.

The FDD radio transceiver data link layer unit is adapted to perform an FDD radio transceiver data link layer processing on the data received from the FDD radio receiver physical layer unit, forward the processed data to the wired transmission processing unit, and perform an FDD radio transceiver data link layer processing on the data received from the wired transmission processing unit, forward the processed data to the FDD radio transmitter physical layer unit.

As shown in FIG. 45, the SS/MS includes:

an FDD radio transceiver, adapted to communicate wirelessly with an RS or BS in an FDD manner. The FDD radio transceiver includes physical layer units of FDD radio transmitters 1 and 2, physical layer units of FDD radio receivers 1 and 2, and an FDD radio transceiver data link layer unit.

The physical layer unit of the FDD radio transmitter 1 (frequency f2) is adapted to communicate with the data link layer unit of the FDD radio transceiver and wirelessly with the FDD radio receiver physical layer unit of the BS capable of communicating with the SS/MS. In the simplified relay mode, the physical layer unit of FDD radio transmitter 1 employs, for the uplink random access timeslots (or referred to Contention Slots) of ULBS, such as initial ranging contention slots and bandwidth request contention slots, or initial access ranging, periodic ranging, bandwidth request of MS/SS, a channel encoding and modulation scheme (such as Binary Phase Shift Keying, BPSK) more reliable than that for other transmission data, or employs a higher transmission power than for other transmission data, over the ranging subchannel of ULBS. The MS/SS directly transmits the initial access ranging, periodic ranging, bandwidth request of MS/SS to the BS without the relay of RS.

The physical layer unit of the FDD radio transmitter 2 (frequency f1) is adapted to communicate wirelessly with the data link layer of the FDD radio transceiver and with the FDD radio receiver physical layer unit of the RS capable of communicating with the SS/MS.

The physical layer unit of the FDD radio receiver 1 (frequency f1) is adapted to communicate with the data link layer unit of the FDD radio transceiver and wirelessly with the FDD radio transmitter physical layer unit of the BS capable of communicating with the SS/MS.

The physical layer unit of the FDD radio receiver 2 (frequency f2) is adapted to communicate with the data link layer unit of the FDD radio transceiver and wirelessly with the FDD radio transmitter physical layer unit of the RS capable of communicating with the SS/MS.

The FDD radio transceiver data link layer unit is adapted to perform an FDD radio transceiver data link layer processing on the data received from the physical layer units of FDD radio receivers 1 and/or 2, and forward the processed data to the user or the physical layer unit of the FDD radio transmitters 1 and/or 2.

The RS includes:

an FDD radio transceiver, adapted to communicate wirelessly with a BS or SS/MS in an FDD manner. The FDD radio transceiver includes an FDD radio transmitter physical layer unit, an FDD radio receiver physical layer unit, and an FDD radio transceiver data link layer unit.

The FDD radio transmitter physical layer unit is adapted to communicate with the data link layer unit of the FDD radio transceiver of the RS, with the FDD radio transceiver data link layer unit of the RS, and wirelessly with the FDD radio receiver physical layer unit of the BS capable of communicating with the RS or wirelessly with the physical layer unit of FDD radio receiver 2 of SS/MS capable of communicating with the RS.

The FDD radio receiver physical layer unit is adapted to communicate with the data link layer unit of the FDD radio transceiver of the RS, wirelessly with the FDD radio transmitter physical layer unit of the RS, and wirelessly with the FDD radio transmitter physical layer unit of the BS capable of communicating with the RS or with the physical layer unit of FDD radio transmitter 2 of SS/MS capable of communicating with the RS.

The FDD radio transceiver data link layer unit is adapted to perform an FDD radio transceiver data link layer processing to the data received from the FDD radio receiver physical layer unit, forward the processed data to a user, and perform an FDD radio transceiver data link layer processing to the data received from the user, forward the processed data to the FDD radio transmitter physical layer unit.

To implement the relay communication OFDMA system, the physical layer frame structures of BS and RS are required to be arranged appropriately, thereby ensuring a reliable relay communication, and effectively preventing various possible interferences as shown in FIG. 7.

In implementation solution 1, the physical layer frame structures of BS and RS may be defined as follows:

1. A downlink relay zone, DL Relay Zone, is arranged in the downlink frame DLBS of frequency f1 of the physical layer frame structure of BS by using TDM technique, to define combinations of OFDMA symbols and BS downlink relay subchannels to be transferred by BS to RS. In the case of multiple RSs, the multiple RSs share the DL Relay Zone through different combinations of OFDMA symbols and subchannels.

2. A downlink relay zone, DL Relay Zone, is arranged in the uplink sub-frame ULRS of the physical layer frame structure of the FDD radio receiver RX (frequency f1) of RS by TDM, to define the combinations of OFDMA symbols and BS downlink relay subchannels in the DL Relay Zone of BS received by RS. In the case of multiple RSs, the multiple RSs share the DL Relay Zone through different combinations of OFDMA symbols and subchannels. The RX of each RS receives only the BS relay data in the corresponding combination(s) of OFDMA symbols and subchannels in DL Relay Zone, and does not receive the BS relay data in the combination(s) of OFDMA symbols and subchannels for other RS(s).

3. An uplink relay zone, UL Relay Zone, is arranged in the uplink frame ULBS of frequency f2 of the physical layer frame structure of BS by TDM, to define combinations of OFDMA symbols and BS uplink relay subchannels from RS to BS. In the case of multiple RSs, the multiple RSs share the UL Relay Zone through different combinations of OFDMA symbols and subchannels.

4. An uplink relay zone, UL Relay Zone, is arranged in the downlink sub-frame DLRS of the physical layer frame structure of the FDD radio transmitter TX (frequency f2) of RS, to define the combinations of OFDMA symbols and relay subchannels in the UL Relay Zone of BS from RS to BS. In the case of multiple RSs, the multiple RSs share the UL Relay Zone through different combinations of OFDMA symbols and subchannels. The TX of each RS transfers only the BS relay data in the corresponding combination(s) of OFDMA symbols and subchannels in UL Relay Zone, and does not transfer the BS relay data in the combination(s) of OFDMA symbols and subchannels for other RS(s).

5. During the time period corresponding to the UL Relay Zone of BS, an SS/MSBS may not arrange any combination of OFDMA symbols and transmitting subchannels to prevent the interference from SS/MSBS to RS. During the time period corresponding to the DL Relay Zone of BS, an SS/MSRS may not arrange any combination of OFDMA symbols and transmitting subchannels to prevent the interference from SS/MSRS to RS.

6. A downlink relay broadcast subchannel, i.e. DL Relay Broadcast Subchannel, is arranged in the DL Relay Zone in the downlink sub-frame DLBS (frequency f1) of the physical layer frame structure of BS, to define the combinations of OFDMA symbols and downlink subchannels to be broadcasted by BS to RS, to broadcast the DCD, UCD, FPC, and CLK_CMP broadcast messages defined in the 802.16 standard.

7. A downlink relay broadcast subchannel, i.e. DL Relay Broadcast Subchannel, is arranged in the DL Relay Zone of the physical layer frame structure of the radio receiver RX (frequency f1) of RS, to define the combinations of OFDMA symbols and RS uplink subchannels for receiving the downlink broadcast of BS, to receive the DCD, UCD, FPC, and CLK_CMP broadcast messages defined in the 802.16 standard.

8. A Relay Ranging Subchannel (RRS) is arranged in the UL Relay Zone of the uplink sub-frame ULBS (frequency f2) of the physical layer frame structure of BS, to define the combination(s) of OFDMA symbols and BS relay ranging receiving subchannel for the initial access ranging, periodic ranging, and bandwidth request of RS. The relay ranging subchannel (RRS) may be used as the ranging subchannel for the initial access ranging, periodic ranging, bandwidth request of SS/MSSBS.

9. A Relay Ranging TX Subchannel (RRS TX) is arranged in the DL Relay Zone of the physical layer frame structure of RS TX (frequency f2), to define the combination(s) of OFDMA symbols and RS relay ranging transmitting subchannel for the initial access ranging, periodic ranging, and bandwidth request of RS.

10. The Relay Ranging Subchannel of BS has a one-to-one correspondence in frequency and time with the Relay Ranging TX Subchannel of RS, and is in rigorous synchronization with the Relay Ranging TX Subchannel of RS.

11. In an uplink sub-frame of the physical layer frame structure of BS or a downlink sub-frame of the physical layer frame structure of RS TX, the receiver of BS share the remaining part of the downlink sub-frame of RS of the uplink sub-frame of BS, except for the DL Header, DL Relay Zone of BS and the time period of BS corresponding to DL Relay Zone of RS, through different combinations of OFDMA symbols and subchannels with different RS TXs, to prevent the interference from SS/MSBS to SS/MSRS.

12. In a downlink sub-frame of the physical layer frame structure of BS or an uplink sub-frame of the physical layer frame structure of RS RX, the transmitter of BS share the remaining part of the downlink sub-frame of BS or the uplink sub-frame of RS, except for the DL Header, DL Header RX, and DL Relay Zone, through different combinations of OFDMA symbols and subchannels with different RS RXs, to prevent the interference from SS/MSRS to SS/MSBS.

13. A downlink header, DL Header, is arranged in downlink sub-frame DLBS (frequency f1) of the physical layer frame structure of BS, as the beginning of the downlink sub-frame, to define the combinations of OFDMA symbols and subchannels for transmitting subscriber synchronization information, and the combination(s) of OFDMA symbols and subchannels for transmitting indication information, indicating the positions and utilization method (i.e. profile) of the combinations of OFDMA symbols and subchannels of uplink and downlink frames of the physical layer frame structure of BS. The DL header contains the preamble, FCH, DL-MAP, and UL-MAP of the existing 802.16 OFDMA (or SOFDMA) frame. The SS/MSBS, RS and BS keep frame synchronization with each other in transmission and reception.

14. In the advanced relay mode, a downlink header DL Header is arranged in downlink sub-frame DLRS of the physical layer frame structure of RS TX (frequency f2), as the beginning of the downlink sub-frame, to define the combinations of OFDMA symbols and subchannels for transmitting subscriber synchronization information, and the combination(s) of OFDMA symbols and subchannels for transmitting indication information, indicating the positions and utilization method (i.e. profile) of the combinations of OFDMA symbols and subchannels of uplink and downlink frames of the physical layer frame structure of BS. The DL header contains the preamble, FCH, DL-MAP, and UL-MAP of the existing 802.16 OFDMA (or SOFDMA) frame. The SS/MSBS and RS keep frame synchronization with each other in transmission and reception.

15. In the advanced relay mode, the DL Header of RS lags behind the DL Header of BS in time. During the time period of the DL Header of an RS TX, the receiver of BS may not arrange any combination of OFDMA symbols and transmitting subchannels.

16. During the time period of the DL Header of an RS TX, no combination of OFDMA symbols and transmitting subchannels may be arranged in the downlink sub-frames DLRS of other RS TXs, to prevent the interference from RS to SS/MSRS. In special cases that the DL Headers of different RSs are overlapped in time, the DL Headers of the different RSs are required to be overlapped entirely, be rigorously synchronized with each other, and contain the same contents, so as to prevent the interference from RS to SS/MSRS.

17. A downlink header receipt, DL Header RX, is arranged in uplink sub-frame ULRS of the physical layer frame structure of the FDD radio receiver RX (frequency f1) of RS, to define the combinations of OFDMA symbols and subchannels to receive the DL Header of BS.

18. The DL Header of BS has a one-to-one correspondence in frequency and time with the DL Header RX of RS RX, and is in rigorous synchronization with the DL Header RX of RS RX.

19. A Ranging Subchannel is arranged in uplink sub-frame ULBS (frequency f2) of the physical layer frame structure of BS, to define the combinations of OFDMA symbols and BS ranging receiving subchannels for the initial access ranging, periodic ranging, and bandwidth request of SS/MSSBS.

20. In the advanced relay mode, a Ranging Subchannel is arranged in uplink sub-frame ULRS of the physical layer frame structure of the FDD radio receiver RX (frequency f1) of RS, to define the combinations of OFDMA symbols and RS ranging receiving subchannels for the initial access ranging, periodic ranging, and bandwidth request of SS/MSSRS.

21. The above defined DL Header and Ranging Subchannel are configured at each frame, and the other combinations of OFDMA symbols and subchannels or Zones defined above are selectively configured in each frame.

Figure 46:
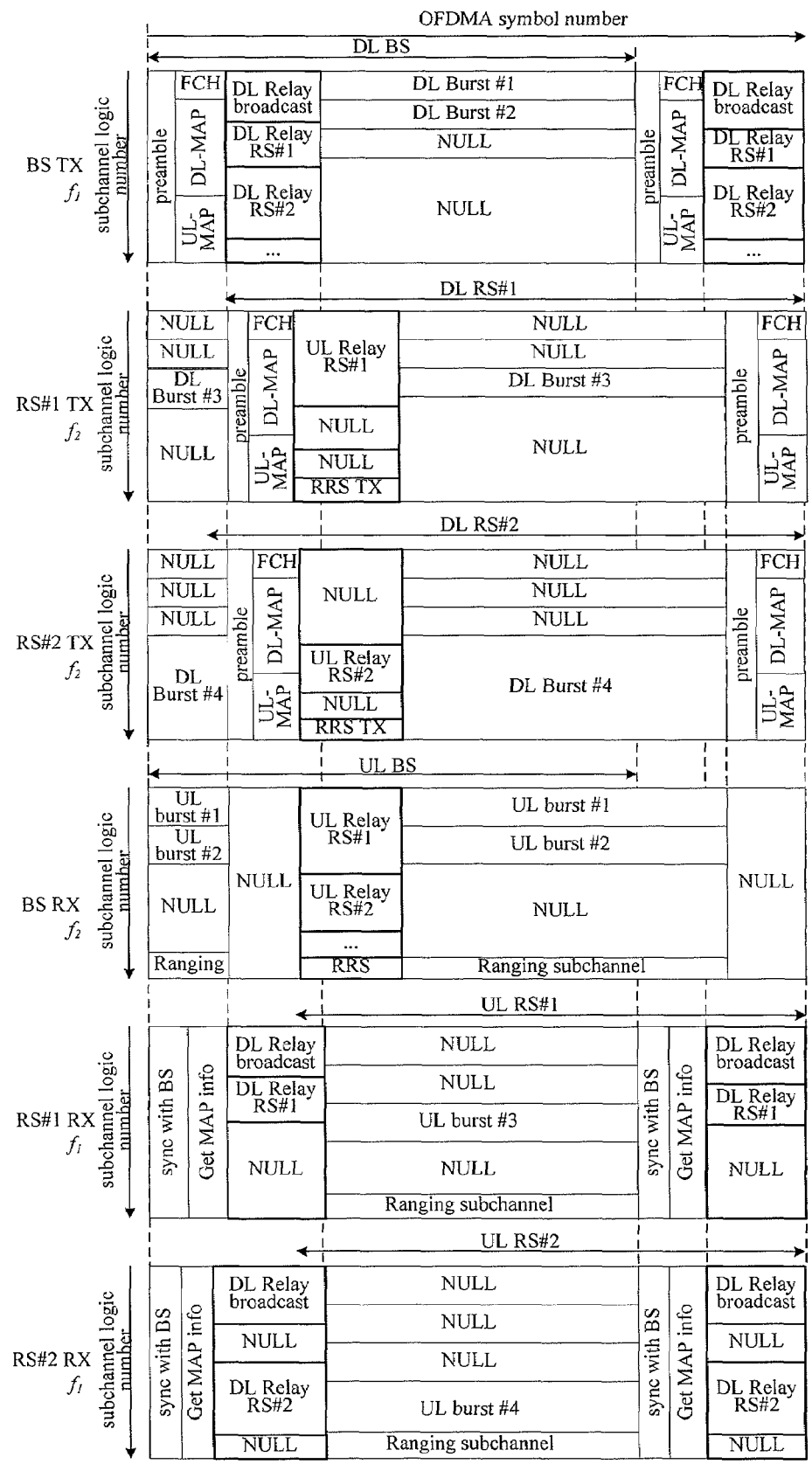
FIG. 46 is a schematic diagram illustrating the physical layer frame structure of the BS and RS in an advanced relay communication mode under the seventh application scenario.
Figure 47:
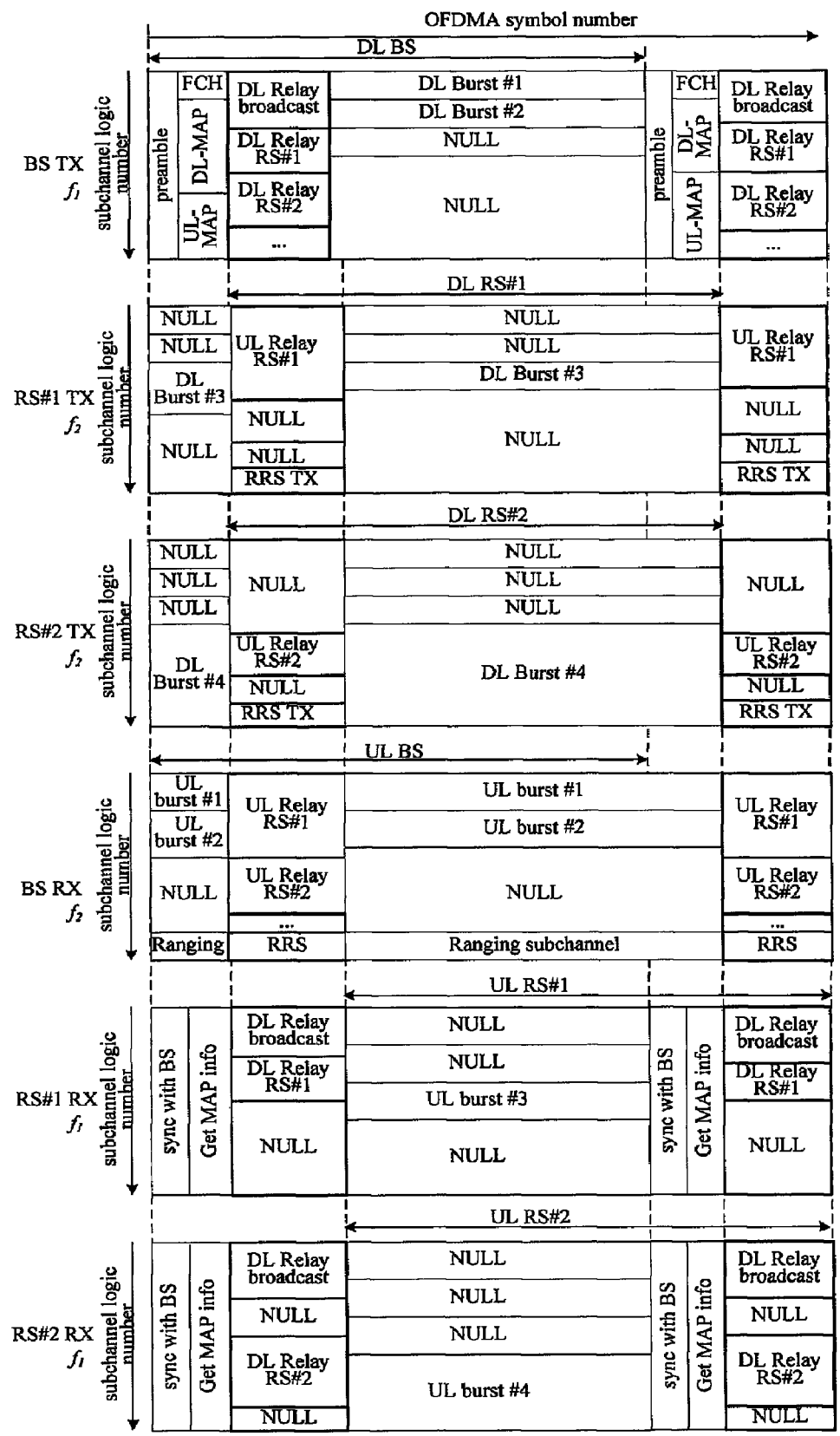
FIG. 47 is a schematic diagram illustrating the physical layer frame structure of the BS and RS in a simplified relay communication mode under the seventh application scenario.

FIGS. 46 and 47 illustrate a particular embodiment of the physical layer frame structures of BS and RS according to the above described physical layer frame structure schemes according to the invention. FIG. 46 is a schematic diagram showing the physical layer frame structures of BS and RS in an advanced relay mode, and FIG. 47 is a schematic diagram showing the physical layer frame structures of BS and RS in a simplified relay mode. In FIGS. 46 and 47, the transmitting and receiving frequencies of RS and BS are represented by the frequencies as shown at the leftmost of the Figures, and the blank or "NULL" portions do not contain any receiving or transmitting parts.

The particular frame structures as shown in FIGS. 46 and 47 are described below.

The portion represented by "white vertical bar" including Preamble, DL-MAP, UL-MAP and FCH in the downlink sub-frame DLBS of BS is the DL Header, and the portion represented by "white vertical bar" including "sync with RS (synchronized with RS)" and "Get MAP info (get MAP information)" in the uplink sub-frame ULRS of RS RX are the DL Header RX.

The DL Relay Zone (i.e. DL Relay broadcast, DL Relay R#1, #2, . . . ) of BS is arranged to follow the DL Header of the downlink sub-frame DLBS of BS. The UL Relay Zone (i.e. UL Relay R#1, #2, . . . , and RRS TX) of BS is arranged in the middle of the uplink sub-frame ULBS of BS. During the time period corresponding to the DL Relay Zone, an SS/MSBS does not arrange any combination of OFDMA symbols and transmitting subchannels. During the time period corresponding to UL Relay Zone of BS, an SS/MSRS does not arrange any combination of OFDMA symbols and transmitting subchannels.

PHY bursts are allocated with a set of adjacent subchannels and a set of OFDMA symbols. In an uplink sub-frame of BS or a downlink sub-frame of RS TX, except for DL Header, UL Relay Zone and the time period of BS corresponding to DL Header of RS RX, the BS receiver and different RS RXs share the remaining portion of the uplink sub-frame of BS or the downlink sub-frame of RS TX by different combinations of OFDMA symbols and subchannels. In a downlink sub-frame of BS or an uplink sub-frame of RS RX, except for DL Header, DL Header RX and UL Relay Zone, the BS transmitter and different RS RXs share the remaining portion of the downlink sub-frame of BS or the uplink sub-frame of RS RX by different combinations of OFDMA symbols and subchannels.

The invention provides a relay processing flow of the wireless relay communication OFDMA system based on the physical layer frame structures of BS and RS described above. The relay processing flow includes a downlink relay communication process from a BS to a subscriber station and an uplink relay communication process from the subscriber station to the BS.

The downlink relay communication process is firstly described below. The downlink relay communication process includes two phases, i.e. a first phase including a communication process from BS to RS, and a second phase includes a communication process from RS to a subscriber station.

(I) The First Phase of Downlink Relay (BS→RS),

In the first phase of downlink relay, the relay process in the advanced relay mode is same as that in the simplified relay mode, which is as follows:

1. BS transmits preamble in the first symbol of DL Header of the downlink sub-frame DLBS at frequency f1.

2. RS#1 receives the preamble in the DL Header of the downlink sub-frame DLBS of BS in the DL Header RX of RS RX at frequency f1, to keep synchronized with BS.

3. BS transmits FCH, DL-MAP, and UL-MAP, after transmitting the preamble in DL Header of the downlink sub-frame DLBS at frequency f1.

4. RS#1 receives the FCH, DL-MAP, and UL-MAP transmitted in DL Header of the downlink sub-frame DLBS in the DL Header RX of RS RX at frequency f1, to obtain the information about positions and utilization methods (profile) of the OFDMA symbols and subchannels in the uplink and downlink bursts of BS.

5. BS transmits a broadcast message(s) in the DL Relay broadcast of the DL Relay Zone in the downlink sub-frame DLBS of BS at frequency f1.

6. BS transmits downlink relay communication data, i.e. traffic data, to RS#1 in the DL Relay RS#1 of the DL Relay Zone in the downlink sub-frame DLBS of BS at frequency f1.

7. RS#1 receives the broadcast message transmitted in the DL Relay broadcast of the DL Relay Zone of the downlink sub-frame DLBS of BS, via the DL RB of RS RX at frequency f1. The broadcast message may include a message to be relayed by RS#1.

8. RS#1 receives the downlink relay communication data, i.e. the traffic data, transmitted in the DL Relay RS#1 of the DL Relay Zone in the downlink sub-frame DLBS of BS, via the DL Relay Zone of RS RX at frequency f1.

(II) The Second Phase of Downlink Relay (RS→MS/SS)

In the second phase of downlink relay, the processing in the advanced relay mode is as follows:

1. RS#1 TX transmits preamble in the DL Header (at frequency f2) of the downlink sub-frame DLRS of RS#1 TX.

2. MS/SS receives the preamble transmitted in the DL Header of the downlink sub-frame DLRS of RS#1 TX, to keep synchronized with RS#1.

3. RS#1 TX transmits FCH, DL-MAP, and UL-MAP, after transmitting the preamble in DL Header of the downlink sub-frame DLRS at frequency f2. The FCH, DL-MAP, and UL-MAP of RS#1 may be transmitted by BS to RS#1 in the step 4 of the first phase.

4. MS/SS receives the FCH, DL-MAP, and UL-MAP transmitted in DL Header of the downlink sub-frame DLRS of RS#1 TX, to obtain the information about positions and utilization methods (profile) of OFDMA symbols and/or subchannels of the uplink and downlink bursts of RS#1.

5. RS#1 TX transmits the downlink relay communication data, i.e. the traffic data, to MS/SS, in the time and frequency zones except for the DL Header and DL Relay Zone in the downlink sub-frame DLRS at frequency f2. The downlink relay communication data is transmitted to RS#1 by BS in step 6 of the first phase.

6. MS/SS receives the downlink relay communication data, i.e. the traffic data, transmitted in the downlink sub-frame DLRS of RS#1 TX via the corresponding time and frequency zones.

In the second phase of downlink relay, the processing in the simplified relay mode is as follows:

1. MS/SS receives the preamble transmitted in the DL Header of the downlink sub-frame DLBS of BS, to keep synchronized with BS.

2. MS/SS receives the FCH, DL-MAP, and UL-MAP information transmitted in DL Header of the downlink sub-frame DLBS of BS, to obtain the information about positions and utilization methods (profile) of OFDMA symbols and subchannels of the uplink and downlink bursts of BS and RS#1.

3. RS#1 TX transmits the downlink relay communication data, i.e. the traffic data, to MS/SS, in the time and frequency zones except for the DL Header and DL Relay Zone in the downlink sub-frame DLRS at frequency f2. The downlink relay communication data is transmitted to RS#1 by BS in step 6 of the first phase.

4. MS/SS receives the downlink relay communication data, i.e. the traffic data, transmitted in the downlink sub-frame DLRS of RS#1 TX via the corresponding time and frequency zones.

The uplink relay communication process is described below. The uplink relay communication process also includes two phases, i.e. a first phase including a communication process from a subscriber station to RS, and a second phase includes a communication process from RS to BS.

(I) The First Phase of Uplink Relay (MS/SS→RS)

The processing in the first phase of uplink relay in the advanced relay mode is as follows.

1. MS/SS receives the FCH, DL-MAP, and UL-MAP transmitted in DL Header (at frequency f2) of the downlink sub-frame DLRS of RS#1 TX, to obtain the information about positions and utilization methods (profile) of OFDMA symbols and/or subchannels of the uplink and downlink bursts of RS#1.

2 MS/SS transmits uplink communication data, i.e. the traffic data, to RS#1, in the time and frequency zones except for the time period corresponding to UL Relay Zone of BS in the uplink sub-frame ULRS of RS RX at frequency f1.

3. RS#1 RX receives the uplink communication data, i.e. the traffic data, transmitted in the uplink sub-frame ULRS by MS/SS in the corresponding time and frequency zones at frequency f1.

The processing in the first phase of uplink relay in the simplified relay mode is as follows.

1. MS/SS receives the FCH, DL-MAP, and UL-MAP transmitted in DL Header of the downlink sub-frame DLBS of BS, to obtain the information about positions and utilization methods (profile) of OFDMA symbols and subchannels of the uplink and downlink bursts of BS, and RS#1.

2. MS/SS transmits uplink communication data, i.e. the traffic data, to RS#1, in the time and frequency zones except for the time period corresponding to UL Relay Zone of BS in the uplink sub-frame ULRS of RS RX at frequency f1.

3. RS#1 RX receives the uplink communication data, i.e. the traffic data, transmitted in the uplink sub-frame ULRS by MS/SS, in the corresponding time and frequency zones at frequency f1.

(II) The Second Phase of the Uplink Relay (RS→BS)

In the second phase of the uplink relay, the processing in the advanced relay mode is the same as that in the simplified relay mode. The second phase of the uplink relay is as follows.

1. RS#1 RX receives the FCH, DL-MAP, and UL-MAP transmitted in DL Header (at frequency f1) of the downlink sub-frame DLBS, to obtain the information about positions and utilization methods (profile) of OFDMA symbols and subchannels of the uplink and downlink bursts of BS.

2. RS#1 TX transmits the uplink relay communication data, i.e. the traffic data, to BS, in UL Relay RS#1 of UL Relay Zone in the downlink sub-frame DLRS of RS at frequency f2. The uplink relay communication data is transmitted to RS#1 by MS/SS in step 2 of the first phase of uplink relay.

3. BS receives the uplink communication data, i.e. the traffic data in the step 2, in UL Relay RS#1 of UL Relay Zone in the uplink sub-frame ULBS of BS at frequency f2.

While some particular embodiments of the invention have been described above, the invention is not intended to be limited to these. Any variations and alterations, readily recognized by a person of ordinary skill in the art within the teaching of the invention, are intended to be compassed within the scope of the invention which is therefore defined by the following claims.

What is claimed is:

1. A system for wireless communication, the system comprising a Relay Station (RS), wirelessly coupled to a Base Station (BS), and to a subscriber station, wherein the RS is configured to receive downlink data from the BS arranged in a first downlink relay zone of a first downlink sub-frame and transmit the downlink data arranged in a second downlink relay zone of a second downlink sub-frame to the subscriber station; and the RS is further configured to receive uplink data from the subscriber station in a second uplink relay zone of a second uplink sub-frame and transmit the uplink data arranged in a first relay zone of a first uplink sub-frame to the BS;

wherein, the BS is configured to directly transmit Preamble, Frame Control Header (FCH), Downlink-MAP (DL-MAP), Uplink-MAP (UL-MAP) information to the subscriber station by a predetermined channel encoding and modulation mode, or by employing a predetermined transmission power;

wherein multiple timeslots or multiple subchannels defining combinations of Orthogonal Frequency Division Multiple, OFDM, symbols and subchannels are arranged in the downlink and uplink relay zones; and the relay data are transmitted and received based on corresponding timeslots or combination of OFDM symbols and subchannels at entity among the BS, the RS and the subscriber station;

wherein an uplink contention timeslot is arranged in the uplink sub-frame of the physical layer frame structure of the BS, an unlink contention timeslot is arranged in the uplink sub-frame of the physical layer frame structure of the RS, an uplink contention transmitting timeslot in the physical layer frame structure of the RS, the uplink contention timeslot of the BS comprising an initial ranging contention timeslot and a bandwidth request contention timeslot, and is configured in each frame;

the uplink contention timeslot of the RS arranged when the BS can not directly communicate with a subscriber station within coverage of the RS, comprising an initial ranging contention timeslot and a bandwidth request contention timeslot, if the RS is provided with two radio transceivers, the uplink contention timeslot is configured in physical layer frame structure of a radio transceiver corresponding to a subscriber station;

the uplink contention transmitting timeslot of the RS configured in each sub-frame, defining transmitting timeslot of the RS for contending for timeslots within the uplink contention timeslot of the BS, wherein the uplink contention transmitting timeslot of the RS is entirely overlapped and synchronized with the uplink contention transmitting timeslot of the BS; if the RS is provided with two radio transceivers, the uplink contention transmitting timeslot is arranged in physical layer frame structure of a radio transceiver corresponding to the BS.

2. The system according to claim 1, wherein
the Base Station, the RS, and the subscriber station communicate each other by Time Division Duplexing (TDD), Time Division Multiplexing/Time Division Multiple Access—Frequency Division Duplexing (TDM/TDMA-FDD), Orthogonal Frequency Division Multiple Access—Frequency Division Duplexing (OFDMA-FDD) or Frequency Division Duplexing (FDD).

3. A method for use in a wireless relay communication, comprising:
receiving, by a Relay Station (RS), downlink data from a Base Station (BS), arranged in a first downlink relay zone of a first downlink sub-frame and transmitting, by the RS, the downlink data arranged in a second downlink relay zone of a second downlink sub-frame to a subscriber station; and
receiving, by the RS, uplink data from the subscriber station in a second uplink relay zone of a second uplink sub-frame and transmitting, by the RS, the uplink data arranged in a first relay zone of a first uplink sub-frame to the BS;

wherein, directly transmitting, by the BS, Preamble, Frame Control Header (FCH), Downlink-MAP (DL-MAP), Uplink-MAP (UL-MAP) information to the subscriber station by a predetermined channel encoding and modulation mode, or by employing a predetermined transmission power;

wherein multiple timeslots or multiple subchannels defining combinations of Orthogonal Frequency Division Multiple, OFDM, symbols and subchannels are arranged in the downlink and uplink relay zones; and the relay data are transmitted and received based on corresponding timeslots or combination of OFDM symbols and subchannels at entity among the BS, the RS and the subscriber station;

wherein an uplink contention timeslot is arranged in the uplink sub-frame of the physical layer frame structure of the BS, an uplink contention timeslot is arranged in the uplink sub-frame of the physical layer frame structure of the RS, an uplink contention transmitting timeslot in the physical layer frame structure of the RS, the uplink contention timeslot of the BS comprising an initial ranging contention timeslot and a bandwidth request contention timeslot, and is configured in each frame;

the uplink contention timeslot of the RS arranged when the BS cannot directly communicate with a subscriber station within coverage of the RS, comprising an initial ranging contention timeslot and a bandwidth request contention timeslot, if the RS is provided with two radio transceivers, the uplink contention timeslot is configured in physical layer frame structure of a radio transceiver corresponding to a subscriber station;

the uplink contention transmitting timeslot of the RS configured in each sub-frame, defining transmitting timeslot of the RS for contending for timeslots within the uplink contention timeslot of the BS, wherein the uplink contention transmitting timeslot of the RS is entirely overlapped and synchronized with the uplink contention transmitting timeslot of the BS; if the RS is provided with two radio transceivers, the uplink contention transmitting timeslot is arranged in physical layer frame structure of a radio transceiver corresponding to the BS.

4. The method according to claim 3, wherein the downlink relay zone and the uplink relay zone in the downlink sub-frame and the uplink sub-frame of physical layer frame structure of a BS are arranged to multiple subscriber stations or multiple RSs by Time Division Multiplexing, TDM, respectively.

5. The method according to claim 3, wherein
the multiple timeslots in the downlink and uplink relay zones comprise a downlink relay broadcast timeslot.

6. The method according to claim 3, wherein each of the downlink or uplink sub-frames further comprises multiple timeslots including a interference timeslot and non-interference timeslot.

7. The method according to claim 3, wherein if there are multiple RSs,
a downlink sub-frame of an RS is not overlapped with uplink sub-frames of other RSs;
or a downlink header timeslot of an RS is not overlapped with downlink header timeslots and downlink interference timeslots of other RSs; or downlink header timeslots of different RSs are overlapped with each other entirely and contain same contents, a downlink header timeslot of an RS is not overlapped with downlink interference timeslots of other RSs.

8. The method according to claim 3, wherein if there are at least two RSs, during a time period of the downlink header of an RS, no combination of OFDMA symbols and transmitting subchannels is arranged in downlink frames of physical layer frame structures of other RSs; or the downlink header timeslot of the RS is not overlapped with downlink header timeslots or downlink interference timeslots of other RSs;

or, if there are at least two RSs, if downlink headers of different RSs are overlapped and synchronized entirely in time and contain same contents, or if downlink header timeslots of different RSs are overlapped and synchronized entirely in time and contain same contents, downlink header timeslot of an RS is not overlapped with downlink interference timeslots of other RSs.

9. A method for use in a wireless relay communication, comprising:

receiving, by a Relay Station (RS), downlink data from a Base Station (BS), arranged in a first downlink relay zone of a first downlink sub-frame and transmitting, by the RS, the downlink data arranged in a second downlink relay zone of a second downlink sub-frame to a subscriber station; and receiving, by the RS, uplink data from the subscriber station in a second uplink relay zone of a second uplink sub-frame and transmitting, by the RS, the uplink data arranged in a first relay zone of a first uplink sub-frame to the BS;

wherein, directly transmitting, by the BS, Preamble, Frame Control Header (FCH), Downlink-MAP (DL-MAP), Uplink-MAP (UL-MAP) information to the subscriber station by a predetermined channel encoding and modulation mode, or by employing a predetermined transmission power;

wherein, if the RS has two OFDMA-FDD radio transceivers, in the downlink sub-frame of physical layer frame structure of the BS or an OFDMA-FDD radio transceiver, corresponding to a subscriber station, of the RS, except for the downlink header, the downlink relay zone of the BS and a time period, corresponding to the downlink header, the downlink relay zone of the BS, of the OFDMA-FDD radio transceiver, corresponding to a subscriber station, of the RS, the BS and different RSs share the remaining portion of the downlink sub-frame through different combinations of OFDMA symbols and subchannels; and/or, in the uplink sub-frame of physical layer frame structure of the BS or an OFDMA-FDD radio transceiver, corresponding to a subscriber station, of the RS, except for the uplink relay zone of the BS and a time period, corresponding to the uplink relay zone of the BS, of the OFDMA-FDD radio transceiver, corresponding to a subscriber station, of the RS, the BS and different RSs share the remaining portion of the uplink sub-frame through different combinations of OFDMA symbols and subchannels;

if the RS has two TDD radio transceivers, in the downlink sub-frame of physical layer frame structure of the BS or a TDD radio transceiver, corresponding to a subscriber station, of the RS, except for the downlink header and the downlink relay zone of the BS, the BS and different RSs share the remaining portion of the downlink sub-frame through different combinations of OFDMA symbols and subchannels; and/or, in the uplink sub-frame of physical layer frame structure of the BS or an TDD radio transceiver, corresponding to a subscriber station, of the RS, except for the uplink relay zone of the BS, the BS and different RSs share the remaining portion of the uplink sub-frame through different combinations of OFDMA symbols and subchannels; and the downlink header and ranging subchannel are configured in each frame of the BS and the RS, the downlink relay zone, the uplink relay zone, the downlink relay broadcast subchannel, the relay ranging subchannel, the downlink header receipt are not configured to be in every frame.

* * * * *